(12) United States Patent
Gao et al.

(10) Patent No.: US 12,454,702 B2
(45) Date of Patent: *Oct. 28, 2025

(54) MINIGENE THERAPY

(71) Applicant: University of Massachusetts, Westborough, MA (US)

(72) Inventors: Guangping Gao, Worcester, MA (US); Hemant Khanna, Worcester, MA (US)

(73) Assignee: University of Massachusetts, Westborough, MA (US)

( * ) Notice: Subject to any disclaimer, the term of this patent is extended or adjusted under 35 U.S.C. 154(b) by 89 days.

This patent is subject to a terminal disclaimer.

(21) Appl. No.: 18/345,366

(22) Filed: Jun. 30, 2023

(65) Prior Publication Data

US 2024/0076692 A1  Mar. 7, 2024

Related U.S. Application Data

(63) Continuation of application No. 16/500,238, filed as application No. PCT/US2018/026230 on Apr. 5, 2018, now Pat. No. 11,739,346.

(60) Provisional application No. 62/481,727, filed on Apr. 5, 2017.

(51) Int. Cl.
| | |
|---|---|
| C12N 15/63 | (2006.01) |
| A61K 9/00 | (2006.01) |
| A61K 35/761 | (2015.01) |
| A61P 27/02 | (2006.01) |
| C07H 21/04 | (2006.01) |
| C07K 14/47 | (2006.01) |
| C12N 7/00 | (2006.01) |
| C12N 15/86 | (2006.01) |
| A01K 67/00 | (2006.01) |
| A61K 48/00 | (2006.01) |

(52) U.S. Cl.
CPC ............ *C12N 15/86* (2013.01); *A61K 9/0048* (2013.01); *A61K 35/761* (2013.01); *A61P 27/02* (2018.01); *C07K 14/47* (2013.01); *C12N 7/00* (2013.01); *A61K 48/00* (2013.01); *C12N 2750/14143* (2013.01)

(58) Field of Classification Search
CPC ....................... C12N 15/86; C12N 7/00; C12N 2750/14143; A61P 27/02

See application file for complete search history.

(56) References Cited

U.S. PATENT DOCUMENTS

| | | | |
|---|---|---|---|
| 5,478,745 A | 12/1995 | Samulski et al. | |
| 5,552,157 A | 9/1996 | Yagi | |
| 5,565,213 A | 10/1996 | Nakamori et al. | |
| 5,567,434 A | 10/1996 | Szoka, Jr. | |
| 5,738,868 A | 4/1998 | Shinkarenko | |
| 5,741,516 A | 4/1998 | Webb et al. | |
| 5,795,587 A | 8/1998 | Gao et al. | |
| 6,001,650 A | 12/1999 | Colosi | |
| 6,156,303 A | 12/2000 | Russell et al. | |
| 10,155,794 B2 | 12/2018 | Drivas et al. | |
| 10,253,312 B2 | 4/2019 | Maeder et al. | |
| 10,266,845 B2 | 4/2019 | Cronin et al. | |
| 11,739,346 B2 * | 8/2023 | Gao ..................... | A61K 35/761 |
| | | | 424/93.2 |
| 2003/0138772 A1 | 7/2003 | Gao et al. | |
| 2011/0117058 A1 | 5/2011 | Auricchio | |
| 2016/0076054 A1 | 3/2016 | Auricchio et al. | |
| 2016/0185832 A1 | 6/2016 | Drivas et al. | |
| 2016/0194374 A1 | 7/2016 | Wijnholds et al. | |
| 2017/0275615 A1 | 9/2017 | Wu et al. | |
| 2017/0348387 A1 | 12/2017 | Aguirre et al. | |
| 2018/0369412 A1 | 12/2018 | Bennett et al. | |
| 2019/0002916 A1 | 1/2019 | Kalatzis et al. | |
| 2019/0062385 A1 | 2/2019 | Drivas et al. | |
| 2020/0056204 A1 | 2/2020 | Gao et al. | |
| 2022/0233720 A1 | 7/2022 | Gao et al. | |

FOREIGN PATENT DOCUMENTS

| | | |
|---|---|---|
| CN | 105408352 A | 3/2016 |
| WO | WO 1998/010088 A1 | 3/1998 |
| WO | WO 2009/121536 A1 | 10/2009 |
| WO | WO 2014/170480 A1 | 10/2014 |
| WO | WO 2015/009575 A1 | 1/2015 |
| WO | WO 2016/033338 A1 | 3/2016 |
| WO | WO 2018/026976 A1 | 2/2018 |
| WO | WO 2018/187552 A1 | 10/2018 |
| WO | WO 2019/006182 A1 | 1/2019 |
| WO | WO 2019/077159 A1 | 4/2019 |

OTHER PUBLICATIONS

Extended European Search Report for Application No. EP 18781286.2, mailed Mar. 11, 2021.
International Search Report and Written Opinion for Application No. PCT/US2018/026230, mailed Jul. 23, 2018.
International Preliminary Report on Patentability for Application No. PCT/US2018/026230, mailed Oct. 17, 2019.
Baye et al., The N-terminal region of centrosomal protein 290 (CEP290) restores vision in a zebrafish model of human blindness. Hum Mol Genet. Apr. 15, 2011;20(8):1467-77. doi: 10.1093/hmg/ddr025. Epub Jan. 21, 2011.
Boshart et al., A very strong enhancer is located upstream of an immediate early gene of human cytomegalovirus. Cell. 1985;41(2):521-530. doi:10.1016/s0092-8674(85)80025-8.
Boye et al., Natural history of cone disease in the murine model of Leber congenital amaurosis due to CEP290 mutation: determining the timing and expectation of therapy. PLoS One. Mar. 26, 2014;9(3):e92928. doi: 10.1371/journal.pone.0092928.

(Continued)

*Primary Examiner* — Quang Nguyen
(74) *Attorney, Agent, or Firm* — Wolf, Greenfield & Sacks, P.C.

(57) ABSTRACT

Aspects of the disclosure relate to compositions and methods useful for treating ocular ciliopathies, for example Leber congenital amaurosis (LCA). In some embodiments, the disclosure provides isolated nucleic acids comprising a transgene encoding a CEP290 protein fragment, and methods of treating ocular ciliopathies using the same.

8 Claims, 19 Drawing Sheets

Specification includes a Sequence Listing.

(56) References Cited

OTHER PUBLICATIONS

Chu et al., SV40 DNA transfection of cells in suspension: analysis of the efficiency of transcription and translation of T-antigen. Gene. 1981;13:197-202.
De Felipe et al., Use of the 2A sequence from foot-and-mouth disease virus in the generation of retroviral vectors for gene therapy. Gene Ther. 1999;6(2):198-208. doi:10.1038/sj.gt.3300811.
Den Hollander et al., Mutations in the CEP290 (NPHP6) gene are a frequent cause of Leber congenital amaurosis. Am J Hum Genet. 2006;79(3):556-561. doi:10.1086/507318.
Fisher et al., Transduction with recombinant adeno-associated virus for gene therapy is limited by leading-strand synthesis. J Virol. Jan. 1996; 70(1): 520-532.
Furler et al., Recombinant AAV vectors containing the foot and mouth disease virus 2A sequence confer efficient bicistronic gene expression in cultured cells and rat substantia nigra neurons. Gene Therapy. Jun. 22, 2001;8:864-873.
Genbank Accession No. NP_079390.3. Jan. 5, 2020. 4 pages.
Gossen et al., Tight control of gene expression in mammalian cells by tetracycline-responsive promoters. Proc Natl Acad Sci U S A. 1992;89(12):5547-5551. doi:10.1073/pnas.89.12.5547.
Graham et al., A new technique for the assay of infectivity of human adenovirus 5 DNA. Virology. 1973;52(2):456-467. doi:10.1016/0042-6822(73)90341-3.
Halpin et al., Self-processing 2A-polyproteins—a system for co-ordinate expression of multiple proteins in transgenic plants. Plant J. 1999;17(4):453-459. doi:10.1046/j.1365-313x.1999.00394.x.
Harvey et al., Inducible control of gene expression: prospects for gene therapy. Curr Opin Chem Biol. 1998;2(4):512-518. doi:10.1016/s1367-5931(98)80128-2.
Klump et al., Retroviral vector-mediated expression of HoxB4 in hematopoietic cells using a novel coexpression strategy. Gene Therapy. Jun. 22, 2001;8:811-817. doi: https://doi.org/10.1038/sj.gt.3301447.
Magari et al., Pharmacologic control of a humanized gene therapy system implanted into nude mice. J Clin Invest. Dec. 1, 1997; 100(11): 2865-2872. doi: 10.1172/JCI119835.
Mattion et al., Foot-and-mouth disease virus 2A protease mediates cleavage in attenuated Sabin 3 poliovirus vectors engineered for delivery of foreign antigens. J Virol. Nov. 1996; 70(11): 8124-8127.
McCarty et al., Self-complementary AAV vectors; advances and applications. Mol Ther. 2008;16(10):1648-1656. doi:10.1038/mt.2008.171.
Mookherjee et al., A CEP290 C-Terminal Domain Complements the Mutant CEP290 of Rd16 Mice in Trans and Rescues Retinal Degernation. Cell Rep. Oct. 16, 2018;25(3):611-623.e6. doi: 10.1016/j.celrep.2018.09.043.
NCBI Reference Sequence No. NM_025114.2. 2006. 4 pages.
NCBI Reference Sequence No. NM_025114.3. Jul. 5, 2019. 9 pages.
No et al., Ecdysone-inducible gene expression in mammalian cells and transgenic mice. Proc Natl Acad Sci U S A. Apr. 16, 1996; 93(8): 3346-3351. doi: 10.1073/pnas.93.8.3346.
Plantier et al., A factor VIII minigene comprising the truncated intron I of factor IX highly improves the in vitro production of factor VIII. Thromb Haemost. 2001;86(2):596-603.
Ryan et al., Foot-and-mouth disease virus 2A oligopeptide mediated cleavage of an artificial polyprotein. EMBO J. Feb. 15, 1994; 13(4): 928-933.
Tsang et al., CP110 suppresses primary cilia formation through its interaction with CEP290, a protein deficient in human ciliary disease. Dev Cell. Aug. 2008;15(2):187-97. doi: 10.1016/j.devcel.2008.07.004.
Wang et al., Ligand-inducible and liver-specific target gene expression in transgenic mice. Nat Biotechnol. Mar. 1, 1997;15:239-243. doi: https://doi.org/10.1038/nbt0397-239.
Wang et al., Positive and negative regulation of gene expression in eukaryotic cells with an inducible transcriptional regulator. Gene Therapy. 1997;4:432-441. https://doi.org/10.1038/sj.gt.3300402.
Wright et al., Identification of factors that contribute to recombinant AAV2 particle aggregation and methods to prevent its occurrence during vector purification and formulation. Mol Ther. 2005;12(1):171-178. doi:10.1016/j.ymthe.2005.02.021.
Xiao et al., Rescue of the albino phenotype by introducing a functional tyrosinase minigene into Kunming albino mice. World J Gastroenterol. Jan. 14, 2007; 13(2): 244-249. EPub Jan. 14, 2007. doi: 10.3748/wjg.v13.i2.244.
Zhang et al., Gene Therapy Using a miniCEP290 Fragment Delays Photoreceptor Degeneration in a Mouse Model of Leber Congenital Amaurosis. Hum Gene Ther. Jan. 2018;29(1):42-50. doi: 10.1089/hum.2017.049. Epub Jul. 5, 2017.
U.S. Appl. No. 17/612,653, filed Nov. 19, 2021, Gao et al.
EP 18781286.2, Mar. 11, 2021, Extended European Search Report.
PCT/US2018/026230, Jul. 23, 2018, International Search Report and Written Opinion.
PCT/US2018/026230, Oct. 17, 2019, International Preliminary Report on Patentability.

\* cited by examiner

MINIGENE THERAPY

RELATED APPLICATIONS

This application is a continuation under 35 U.S.C. § 120 of U.S. Application Ser. No. 16/500,238, filed Oct. 2, 2019, which is a National Stage Application of PCT/US2018/026230, filed Apr. 5, 2018, which claims the benefit under 35 U.S.C. § 119(e) of the filing date of U.S. Provisional Application Ser. No. 62/481,727, filed on Apr. 5, 2017, entitled "CEP290 MINIGENE THERAPY", the entire contents of each application which are incorporated by reference herein.

GOVERNMENT SUPPORT

This invention was made with government support under grant numbers EY022372, EY029050, NS076991, AI100263, and HL131471, awarded by the National Institutes of Health. The government has certain rights in the invention.

REFERENCE TO AN ELECTRONIC SEQUENCE LISTING

The contents of the electronic sequence listing (U012070089US02-SEQ-KZM.xml; Size: 29,135 bytes; and Date of Creation: Jun. 30, 2023) is herein incorporated by reference in its entirety.

BACKGROUND

Ciliopathies represent a group of diseases and disorders characterized by abnormal cilial formation or function. For example ocular ciliopathies may lead to retinal degeneration, reduced visual acuity, and/or blindness. CEP290-associated Leber congenital amaurosis (LCA) is one of the most common and severe forms of retinal degenerative diseases. However, no treatment or cure currently exists. Generally, the large size of cilia-associated genes, for example the CEP290 gene (~8 kb), has limited the development of successful therapy using conventional Adeno-associated Viral (AAV) vector-mediated gene delivery approaches. Use of genome editing (such as CRISPR/Cas9 approach) and antisense oligonucleotides can have off-target effects and are typically applicable to only one type of mutation in a cilia-associated gene. Accordingly, novel compositions and methods for treating ciliopathies are needed.

SUMMARY

Aspects of the disclosure relate to compositions and methods useful for delivering minigenes to a subject. Accordingly, the disclosure is based, in part, on gene therapy vectors, such as viral (e.g., rAAV) vectors, comprising one or more gene fragments encoding a therapeutic gene product, such as a protein or peptide (e.g., a minigene), and optionally one or more inhibitory nucleic acids that target an endogenous gene variant (e.g., mutant) that is associated with a disease or disorder (e.g., a gene associated with a ciliopathy). In some embodiments, the one or more inhibitory nucleic acids do not silence gene expression of the gene product encoded by the minigene. In some embodiments, methods are provided for treating ciliopathies (e.g., ocular ciliopathies), for example disorders and diseases characterized by a mutation or deletion of a cilia-associated gene, such as the CEP290 gene which is associated with Leber congenital amaurosis (LCA).

Accordingly, in some aspects, the disclosure relates to a viral vector comprising an expression cassette comprising a first isolated nucleic acid sequence encoding a therapeutic minigene and a second isolated nucleic acid sequence encoding one or more inhibitory nucleic acids, wherein the expression cassette is flanked by viral replication sequences, and wherein the one or more inhibitory nucleic acids do not bind to the isolated nucleic acid encoding the therapeutic minigene.

The disclosure is based, in part, on the unexpected discovery that AAV-mediated delivery of CEP290 gene fragments (e.g. encoding CEP290 protein fragments) lacking the "M region" to cells (e.g., ocular cells) of a subject having a disease or disorder characterized by a mutation or deletion of the CEP290 gene restores or improves cilial length and rescues or improves photoreceptor function. This discovery is surprising in view of previous disclosures, for example US 2016/0185832, which describes that the "M region" of the CEP290 gene is necessary to mediate microtubule localization and cilium formation. In some embodiments, the Examples section of this disclosure describes domains (e.g., fragments) of CEP290 protein that retain function in photoreceptors and can be delivered using the conventional AAV vectors.

Accordingly, in some aspects, the disclosure provides an isolated nucleic acid comprising: a first region comprising a first adeno-associated virus (AAV) inverted terminal repeat (ITR), or a variant thereof; and, a second region comprising a transgene encoding a CEP290 protein fragment, wherein the CEP290 protein fragment does not comprise amino acid positions 1695 to 1966 of SEQ ID NO: 1.

In some aspects, the disclosure provides an isolated nucleic acid comprising: a first region comprising a first adeno-associated virus (AAV) inverted terminal repeat (ITR), or a variant thereof; and, a second region comprising a transgene encoding a CEP290 protein fragment, wherein the CEP290 protein fragment comprises at least 500 contiguous amino acids of SEQ ID NO: 1. In some embodiments, the at least 500 contiguous amino acids comprises or consists of a sequence selected from SEQ ID NOs: 2, 3 and 4.

In some embodiments, the second region does not comprise amino acid positions 1695 to 1966 of SEQ ID NO: 1. In some embodiments, the transgene comprises no more than 1120 contiguous amino acids of SEQ ID NO: 1.

In some embodiments, the transgene comprises amino acid positions 580 to 1695 of SEQ ID NO: 1. In some embodiments, the CEP290 protein fragment encoded by the transgene comprises a sequence set forth in SEQ ID NO: 2. In some embodiments, the CEP290 protein fragment encoded by the transgene comprises amino acid positions 580 to 1180 of SEQ ID NO: 1, or amino acid positions 1181 to 1695 of SEQ ID NO: 1. In some embodiments, the CEP290 protein fragment encoded by the transgene comprises or consists of a sequence set forth in SEQ ID NO: 3 or 4.

In some embodiments, the transgene comprises or consists of a nucleic acid sequence selected from SEQ ID NO: 5, 6 and 7.

In some embodiments, the transgene further comprises one or more inhibitory nucleic acids, such as dsRNA, siRNA, shRNA, miRNA, artificial miRNA (amiRNA), etc. In some embodiments, the one or more inhibitory nucleic acids inhibit expression of endogenously-expressed CEP290 in a subject but do not inhibit expression of a CEP290 protein fragment encoded by the transgene.

In some embodiments, the transgene further comprises a promoter. In some embodiments, the promoter is a chicken beta-actin (CBA) promoter or a tissue-specific promoter. In some embodiments, the tissue specific promoter is an eye-specific promoter, optionally a retinoschisin promoter, K12 promoter, a rhodopsin promoter, a rod-specific promoter, a cone-specific promoter, a rhodopsin kinase promoter (e.g., GRK1 promoter), or interphotoreceptor retinoid-binding protein proximal (IRBP) promoter. In some embodiments, the promoter is an RNA pol II promoter or an RNA pol III promoter.

In some embodiments, the isolated nucleic acid further comprises a third region comprising a second adeno-associated virus (AAV) inverted terminal repeat (ITR), or a variant thereof.

In some embodiments, the first region and/or the third region is an AAV1 ITR, AAV2 ITR, AAV5 ITR, AAV6 ITR, AAV6.2 ITR, AAV7 ITR, AAV8 ITR, AAV9 ITR, AAV10 ITR, AAV 11 ITR, or a variant thereof. In some embodiments, the first region and/or the third region is an AAV2 ITR or a variant thereof.

In some aspects, the disclosure provides a vector comprising an isolated nucleic acid as described by the disclosure. In some embodiments, the vector is a plasmid.

In some aspects, the disclosure provides a host cell comprising an isolated nucleic acid, or a vector as described by the disclosure.

In some aspects, the disclosure provides a recombinant adeno-associated virus (rAAV) comprising: a capsid protein; and, an isolated nucleic acid as described by the disclosure. In some embodiments, the capsid protein is AAV8 capsid protein or AAV5 capsid protein. In some embodiments, the capsid protein comprises the sequence set forth in SEQ ID NO: 9.

In some embodiments, the rAAV is a self-complementary AAV (scAAV).

In some embodiments, the rAAV is formulated for delivery to the eye.

In some aspects, the disclosure provides a composition comprising an rAAV as described by the disclosure, and a pharmaceutically acceptable excipient.

In some aspects, the disclosure provides methods for treating a disease or disorder (e.g., a monogenic disease, a ciliopathy, etc.) in a subject in need thereof, the methods comprising administering to a subject having the disease or disorder (e.g. a monogenic disease, a ciliopathy, etc.) a therapeutically effective amount of an isolated nucleic acid, or a rAAV as described by the disclosure.

In some embodiments, the methods further comprise the step of administering to the subject one or more inhibitory nucleic acids (e.g., one or more expression constructs encoding one or more inhibitory nucleic acids). In some embodiments, the one or more inhibitory nucleic acids inhibit expression of one or more genes associated with the disease or disorder (e.g., monogenic disease, ciliopathy, etc.). In some embodiments, the one or more inhibitory nucleic acids do not inhibit expression of a transgene encoded by an isolated nucleic acid or rAAV as described by the disclosure.

In some aspects, the disclosure provides a method for treating an ocular ciliopathy in a subject in need thereof, the method comprising administering to a subject having an ocular ciliopathy a therapeutically effective amount of an isolated nucleic acid, or a rAAV as described by the disclosure.

In some embodiments, the ocular ciliopathy is associated with a mutation of the CEP290 gene in the subject or a deletion of the CEP290 gene in the subject. In some embodiments, the mutation or deletion of CEP290 gene results in retinal degeneration, photoreceptor degeneration, retinal dysfunction, and/or loss of vision.

In some embodiments, the ocular ciliopathy is Leber congenital amaurosis (LCA), Joubert syndrome, Bardet-Biedl syndrome, Meckel syndrome, Usher syndrome, Nephronophthisis, or Senior-Løken syndrome. In some embodiments, the ocular ciliopathy is Leber congenital amaurosis (LCA).

In some embodiments, the mutation in the CEP290 gene is an intronic mutation, a nonsense mutation, a frameshift mutation, a missense mutation, or any combination thereof.

In some embodiments, the subject is human and the CEP290 gene mutation occurs at position c.2991+1655, optionally wherein the mutation is A1655G.

In some embodiments, the administration results in delivery of the isolated nucleic acid or rAAV to the eye of the subject. In some embodiments, the administration is via injection, optionally subretinal injection or intravitreal injection. In some embodiments, the administration is topical administration to the eye of the subject. In some embodiments, an isolated nucleic acid or rAAV as described by the disclosure is administered more than once to a subject (e.g., 2, 3, 4, 5, or more times). In some embodiments, the administrations are spaced more than 4 weeks apart.

In some embodiments, the method further comprises administering one or more inhibitory nucleic acids to the subject, wherein the one or more inhibitory nucleic acids does not bind to a nucleic acid sequence encoding amino acid residues 580 to 1180 of SEQ ID NO: 1, or 1181 to 1695 of SEQ ID NO: 1.

BRIEF DESCRIPTION OF DRAWINGS

FIG. 7A shows Cep290$^{rd16}$ mice subretinally injected at P0/P1 stage with indicated miniCEP290s or GFP, and analyzed by ERG at 3 weeks post injection. Age-matched uninjected WT or Cep290$^{rd16}$ (littermates) mice were used as controls for ERG. The ERG a-wave is represented by arrows while b-wave vis depicted using arrowheads. Data represent analysis of at least 6 mice. ***: p<0.0001; ns: not significant. FIG. 7B shows scotopic a-wave and b-wave amplitude for mice subretinally injected at P0/P1 stage with indicated miniCEP290s or GFP, and analyzed by ERG at 3 weeks post injection.

FIG. 8A shows Cep290$^{rd16}$ retinas injected with indicated miniCEP290$^{580-1180}$ or GFP stained with DAPI. FIG. 8B shows Cep290$^{rd16}$ retinas injected with indicated miniCEP290$^{580-1180}$ or GFP assessed by ultrathin sectioning. ONL (outer nuclear layer) is marked with vertical lines. WT retinal section is shown for comparison. INL: inner nuclear layer. FIG. 8C shows improved expression of RDS detected in the miniCEP290$^{580-1180}$ injected Cep290$^{rd16}$ mice. GFP staining marks the injected regions. FIG. 8D shows retinal cryosections of Cep290$^{rd16}$ mice injected with the indicated miniCEP290s were stained with GFP (injected regions), rhodopsin (RHO; rod-specific; or M-opsin (MOP; cone-specific) antibodies and DAPI (nuclei). Outer segment (OS)-enriched opsin staining is detected in the miniCEP290$^{580-1180}$-injected retinas. Dramatically reduced expression of opsins is detected in the miniCEP290$^{2037-2479}$-injected retinas. ONL: outer nuclear layer: INL: inner nuclear layer. GCL: ganglion cell layer.

DETAILED DESCRIPTION

Figure 1:
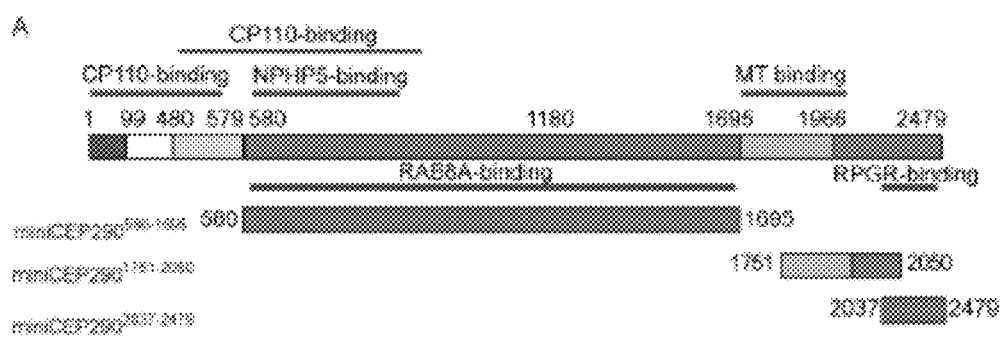
FIG. 1 shows schematic depiction of the full-length CEP290 gene representing the locations of distinct protein interaction domains.

In some aspects, the disclosure relates to compositions and methods useful for treating certain genetic diseases, for example monogenic diseases, ciliopathies, etc. Monogenic diseases are diseases that are diseases that result from abnormal expression or function of a single allele of a gene. Examples of monogenic diseases include but are not limited to thalassemia, sickle cell anemia, hemophilia, cystic fibrosis, Tay Sachs disease, Fragile X syndrome, Huntington's disease, etc. Ciliopathies are genetic disorders that affect the expression or function of cellular cilia. Examples of ciliopathies include but are not limited to Alstrom syndrome, Bardet-Biedl syndrome. Joubert syndrome. Merckel syndrome, nephronophthisis, orofaciodigital syndrome, Senior-Locken syndrome, polycystic kidney disease, primary ciliary dyskinesia, and situs inversus.

The disclosure is based, in part, on gene therapy vectors, such as viral (e.g., rAAV) vectors, comprising one or more gene fragments encoding a therapeutic gene product, such as a protein or peptide (e.g., a minigene), and optionally one or more inhibitory nucleic acids that target an endogenous gene variant (e.g., mutant) that is associated with a disease or disorder (e.g., a gene associated with a ciliopathy).

A gene therapy vector may be a viral vector (e.g., a lentiviral vector, an adeno-associated virus vector, etc.), a plasmid, a closed-ended DNA (e.g., ceDNA), etc. In some embodiments, a gene therapy vector is a viral vector. In some embodiments, an expression cassette encoding a minigene is flanked by one or more viral replication sequences, for example lentiviral long terminal repeats (LTRs) or adeno-associated virus (AAV) inverted terminal repeats (ITRS).

As used herein, "minigene" refers to an isolated nucleic acid sequence encoding a recombinant peptide or protein where one or more non-essential elements of the corresponding gene encoding the naturally-occurring peptide or protein have been removed and where the peptide or protein encoded by the minigene retains function of the corresponding naturally-occurring peptide or protein. A "therapeutic minigene" refers to a minigene encoding a peptide or protein useful for treatment of a genetic disease, for example dystrophin, dysferlin, Factor VIII, Amyloid precursor protein (APP), Tyrosinase (Tyr), etc. Minigenes are known in the art and are described, for example by Karpati and Acsadi (1994) *Clin invest Med* 17(5):499-509; Plantier et al. (2001) *Thromb Haemost.* 86(2):596-603; and Xiao et al. (2007) *World J. Gastroenterol.* 13(2):244-9.

Generally, an isolated nucleic acid encoding a minigene (e.g., a therapeutic minigene) is between about 10% and about 99% (e.g., about 10%, about 15%, about 20%, about 25%, about 30%, about 40% about 50%, about 60%, about 70%, about 75%, about 80%, about 90%, about 99%, etc.) truncated with respect to a nucleic acid sequence encoding the corresponding naturally-occurring wild-type protein. For example, in some embodiments, a minigene encoding a CEP290 protein fragment is about 76% truncated (e.g., comprises about 24% of the nucleic acid sequence) compared to a wild-type CEP290 gene.

In some embodiments, a gene therapy vector further comprises one or more inhibitory nucleic acids that do not silence gene expression of the gene product encoded by the minigene but do silence gene expression of an endogenous protein corresponding to a wild-type or disease-associated variant of the protein encoded by the minigene. For example, in some embodiments, a gene therapy vector comprises a minigene encoding a CEP290 protein fragment and one or more inhibitory nucleic acids (e.g., dsRNA, siRNA, shRNA, miRNA, amiRNA, etc.) that inhibit expression of endogenously expressed CEP290 (e.g., a CEP290 mutant selected from c.2991+1655A>G, c.2249T>G, c.7341dupA, c.2118_2122dupTCAGG, c.3814C>T, c.679_680delGA, c.265dupA, c.180+1G?T, c.1550delT, c.4115_4116delTA, c.4966G>T, and c.5813_5817delCTTTA) but do not inhibit expression of the CEP290 fragment encoded by the minigene. The skilled artisan will also appreciate that, in some embodiments, one or more inhibitory nucleic acids that that inhibit expression of endogenously expressed CEP290 but do not inhibit expression of the CEP290 fragment encoded by the minigene may be administered to a subject in a manner that is separate from the gene therapy construct.

Methods for Treating Ocular Ciliopathies

Aspects of the invention relate to certain protein-encoding transgenes (e.g., fragments of human CEP290) that when delivered to a subject are effective for promoting growth of ocular cilia (e.g., cilia of photoreceptors) and rescue of photoreceptor structure and function in the subject. Accordingly, methods and compositions described by the disclosure are useful, in some embodiments, for the treatment of ocular ciliopathies associated with mutations or deletions of CEP290 gene, such as Leber congenital amaurosis (LCA), Joubert syndrome, Bardet-Biedl syndrome, Meckel syndrome, Usher syndrome, and Senior-Løken syndrome.

Methods for delivering a transgene (e.g., a gene encoding a CEP290 protein or a fragment thereof) to a subject are provided by the disclosure. The methods typically involve administering to a subject an effective amount of an isolated nucleic acid encoding a CEP290 protein fragment, or a rAAV comprising a nucleic acid for expressing a CEP290 protein fragment.

The human CEP290 gene consists of 52 exons, which encode for a protein of ~290 kDa (2479 amino acids). In some embodiments, the human CEP290 gene encodes a protein comprising the amino acid sequence set forth in SEQ ID NO: 1, and as described as GenBank Accession Number (NP_079390.3). In some embodiments, the human CEP290 gene (e.g., NCBI Reference Sequence: NM_025114.3) comprises a sequence set forth in SEQ ID NO: 8.

CEP290 is a multidomain protein and contains numerous coiled-coil domains distributed over the entire length of the protein. In addition, the CEP290 protein contains membrane and microtubule-binding domains and myosin-tail homology domain. Typically, CEP290 predominantly localizes to the centrosomes and transition zone of primary cilia and to the CC of photoreceptors. Previous publications have observed that the domain of CEP290 that localizes the protein to centrosomes (e.g., the "M region" of the CEP290 gene, as described in US 2016/0185832) is necessary to mediate microtubule localization and cilium formation. In some embodiments, the "M region" refers to amino acid residues 1695 to 1966 of human CEP290, as described in US 2016/0185832.

Aspects of the instant disclosure are based, in part, on the surprising discovery that certain CEP290 fragments lacking the "M" region mediate effective rescue of cilial formation and photoreceptor rescue when expressed in a subject in need thereof, for example via administration of a viral vector (e.g., rAAV).

Accordingly in some aspects, the disclosure provides a transgene encoding a CEP290 protein fragment, wherein the CEP290 protein fragment does not comprise amino acid positions 1695 to 1966 (e.g., a region encompassing the "M" region) of SEQ ID NO: 1. A "CEP protein fragment" refers to a 2 to 2479 (e.g., any integer between 2 and 2479) amino acid portion of a CEP290 protein. In some embodiments, the CEP protein fragment comprises a contiguous amino acid portion (e.g., amino acids 580 to 1180) of CEP290 (e.g., SEQ ID NO: 1). In some embodiments, the CEP protein fragment comprises one or more (e.g., 2, 3, 4, 5, 6, 7, 8, 9, 10, or more) interrupted amino acid portions (e.g., amino acids 1 to 10, 580 to 1180 and 1967 to 2470) of CEP290 (e.g., SEQ ID NO: 1)

In some embodiments, the CEP290 protein fragment comprises at least 500 contiguous amino acids of SEQ ID NO: 1. For example, in some embodiments, the CEP290 protein fragment comprises (or consists of) amino acids 580 to 1695, or amino acids 580 to 1180, or amino acids 1181 to 1695, of CEP290 (e.g., SEQ ID NO: 1). In some embodiments, the at least 500 contiguous amino acids comprises or consists of a sequence selected from SEQ ID NOs: 2, 3 and 4. In some embodiments, the disclosure provides a transgene comprising a nucleic acid (e.g., isolated nucleic acid) encoding a CEP290 protein fragment. In some embodiments, the transgene comprises or consists of a nucleic acid sequence selected from SEQ ID NO: 5, 6 and 7.

In some embodiments, the transgenes encoding a CEP290 fragment described by the disclosure mediate cilial growth and photoreceptor rescue, and are therefore useful for treating ciliopathies, for example ocular ciliopathies. Generally, a ciliopathy" refers to a disease or disorder characterized by defective (or lack of) protein function resulting in abnormal formation or function of cilia in a cell of a subject. An "ocular ciliopathy" is a ciliopathy where abnormal formation or function of cilial occurs in ocular cells (e.g., rods, cones, photoreceptor cells, etc.) of a subject, typically resulting in retinal degeneration, loss of vision and blindness. Examples of ciliopathies include but are not limited to earlier onset developmental anomalies such as Meckel Gruber Syndrome and Joubert Syndrome, to relatively later onset diseases, such as Bardet-Biedl Syndrome, Senior-Loken Syndrome, and Usher Syndrome. In some embodiments, retinal dystrophies (e.g., due to an ocular ciliopathy) are more commonly presented in a non-syndromic manner.

In some embodiments, the ocular ciliopathy is Leber congenital amaurosis (LCA). Generally, LCA is a clinically and genetically heterogeneous disease with early onset severe retinal degeneration starting either at birth or by 5-7 years of age. Generally, a mutation or mutations in CEP290 account for >26% of LCA (LCA 10; OMIM 611755). In some embodiments, LCA is characterized by a deletion of the CEP290 gene in a subject. Generally, a mutation in CEP290 that results in LCA may be an intronic mutation, a nonsense mutation, a frameshift mutation, a missense mutation, or any combination thereof. Examples of CEP290 gene mutations associated with LCA include but are not limited to c.2991+1655A>G, c.2249T>G, c.7341dupA, c.2118_2122dupTCAGG, c.3814C>T, c.679_680delGA, c.265dupA, c.180+1 G?T, c.1550delT, c.4115_4116delTA, c.4966G>T, and c.5813_5817delCTTTA, for example as described by den Hollander et al. (2006) Am J Hum Genet. 79(3):556-561. In some embodiments, the mutation in CEP290 is a deep intronic mutation, for example at position c.2991+1655A. In some embodiments, the deep intronic mutation is c.2991+1655A>G.

Deletions and or mutations in a CEP290 gene of a subject (e.g., a subject having or suspected of having a ciliopathy associated with a deletion or mutation of CEP290 gene) may be identified from a sample obtained from the subject (e.g., a DNA sample, RNA sample, blood sample, or other biological sample) by any method known in the art. For example, in some embodiments, a nucleic acid (e.g., DNA, RNA, or a combination thereof) is extracted from a biological samples obtained from a subject and nucleic acid sequencing is performed in order to identify a mutation in the CEP290 gene. Examples of nucleic acids sequencing techniques include but are not limited to Maxam-Gilbert sequencing, pyrosequencing, chain-termination sequencing, massively parallel signature sequencing, single-molecule sequencing, nanopore sequencing, Illumina sequencing, etc. In some embodiments, a mutation or deletion in CEP290 gene is detected indirectly, for example by quantifying CEP290 protein expression (e.g., by Western blot) or function (e.g., by analyzing cilial growth, structure, function, etc.), or by direct sequencing of the DNA and comparing the sequence obtained to a control DNA sequence (e.g., a wild-type CEP290 DNA sequence).

In some aspects, the disclosure provides a method for treating an ocular ciliopathy in a subject in need thereof, the method comprising administering to a subject having an ocular ciliopathy a therapeutically effective amount of an isolated nucleic acid, or a rAAV, as described by the disclosure.

An "effective amount" of a substance is an amount sufficient to produce a desired effect. In some embodiments, an effective amount of an isolated nucleic acid (e.g., an isolated nucleic acid comprising a transgene encoding a CEP290 protein fragment as described herein) is an amount sufficient to transfect (or infect in the context of rAAV mediated delivery) a sufficient number of target cells of a target tissue of a subject. In some embodiments, a target tissue is ocular tissue (e.g., photoreceptor cells, rod cells, cone cells, retinal ganglion cells, retinal cells, etc.). In some embodiments, an effective amount of an isolated nucleic acid (e.g., which may be delivered via an rAAV) may be an amount sufficient to have a therapeutic benefit in a subject, e.g., to increase or supplement the expression of a gene or protein of interest (e.g., CEP290), to improve in the subject one or more symptoms of disease (e.g., a symptom of an ocular ciliopathy, such as LCA), etc. The effective amount will depend on a variety of factors such as, for example, the species, age, weight, health of the subject, and the tissue to be targeted, and may thus vary among subject and tissue as described elsewhere in the disclosure.

Isolated Nucleic Acids

In some aspects, the disclosure provides isolated nucleic acids that are useful for expressing human CEP290, or a fragment thereof. A "nucleic acid" sequence refers to a DNA or RNA sequence. In some embodiments, proteins and nucleic acids of the disclosure are isolated. As used herein, the term "isolated" means artificially produced. As used herein with respect to nucleic acids, the term "isolated" means: (i) amplified in vitro by, for example, polymerase chain reaction (PCR); (ii) recombinantly produced by cloning; (iii) purified, as by cleavage and gel separation: or (iv) synthesized by, for example, chemical synthesis. An isolated nucleic acid is one which is readily manipulable by recombinant DNA techniques well known in the art. Thus, a nucleotide sequence contained in a vector in which 5' and 3' restriction sites are known or for which polymerase chain reaction (PCR) primer sequences have been disclosed is considered isolated but a nucleic acid sequence existing in its native state in its natural host is not. An isolated nucleic acid may be substantially purified, but need not be. For example, a nucleic acid that is isolated within a cloning or expression vector is not pure in that it may comprise only a tiny percentage of the material in the cell in which it resides. Such a nucleic acid is isolated, however, as the term is used herein because it is readily manipulable by standard techniques known to those of ordinary skill in the art. As used herein with respect to proteins or peptides, the term "isolated" refers to a protein or peptide that has been isolated from its natural environment or artificially produced (e.g., by chemical synthesis, by recombinant DNA technology, etc.).

The skilled artisan will also realize that conservative amino acid substitutions may be made to provide functionally equivalent variants, or homologs of the capsid proteins. In some aspects the disclosure embraces sequence alterations that result in conservative amino acid substitutions. As used herein, a conservative amino acid substitution refers to an amino acid substitution that does not alter the relative charge or size characteristics of the protein in which the amino acid substitution is made. Variants can be prepared according to methods for altering polypeptide sequence known to one of ordinary skill in the art such as are found in references that compile such methods, e.g., Molecular Cloning: A Laboratory Manual, J. Sambrook, et al., eds., Second Edition, Cold Spring Harbor Laboratory Press, Cold Spring Harbor, New York, 1989, or Current Protocols in Molecular Biology, F. M. Ausubel, et al., eds., John Wiley & Sons, Inc., New York. Conservative substitutions of amino acids include substitutions made among amino acids within the following groups: (a) M. I, L. V; (b) F. Y. W; (c) K. R. H; (d) A. G; (e) S, T; (f) Q, N; and (g) E. D. Therefore, one can make conservative amino acid substitutions to the amino acid sequence of the proteins and polypeptides disclosed herein.

The isolated nucleic acids of the invention may be recombinant adeno-associated virus (AAV) vectors (rAAV vectors). In some embodiments, an isolated nucleic acid as described by the disclosure comprises a region (e.g., a first region) comprising a first adeno-associated virus (AAV) inverted terminal repeat (ITR), or a variant thereof. The isolated nucleic acid (e.g., the recombinant AAV vector) may be packaged into a capsid protein and administered to a subject and/or delivered to a selected target cell. "Recombinant AAV (rAAV) vectors" are typically composed of, at a minimum, a transgene and its regulatory sequences, and 5' and 3' AAV inverted terminal repeats (ITRs). The transgene may comprise, as disclosed elsewhere herein, one or more regions that encode one or more proteins (e.g., human CEP290, or a fragment thereof). The transgene may also comprise a region encoding, for example, a miRNA binding site, and/or an expression control sequence (e.g., a poly-A tail), as described elsewhere in the disclosure.

Generally, ITR sequences are about 145 bp in length. Preferably, substantially the entire sequences encoding the ITRs are used in the molecule, although some degree of minor modification of these sequences is permissible. The ability to modify these ITR sequences is within the skill of the art. (See, e.g., texts such as Sambrook et al., "Molecular Cloning. A Laboratory Manual", 2d ed., Cold Spring Harbor Laboratory, New York (1989): and K. Fisher et al., J Virol., 70:520 532 (1996)). An example of such a molecule employed in the present invention is a "cis-acting" plasmid containing the transgene, in which the selected transgene sequence and associated regulatory elements are flanked by the 5' and 3' AAV ITR sequences. The AAV ITR sequences may be obtained from any known AAV, including presently identified mammalian AAV types. In some embodiments, the isolated nucleic acid (e.g., the rAAV vector) comprises at least one ITR having a serotype selected from AAV 1, AAV2, AAV5, AAV6, AAV6.2, AAV7, AAV5, AAV9, AAV10, AAV11, and variants thereof. In some embodiments, the isolated nucleic acid comprises a region (e.g., a first region) encoding an AAV2 ITR.

In some embodiments, the isolated nucleic acid further comprises a region (e.g., a second region, a third region, a fourth region, etc.) comprising a second AAV ITR. In some embodiments, the second AAV ITR has a serotype selected from AAV 1, AAV2, AAV5, AAV6, AAV6.2, AAV7, AAV5, AAV9, AAV10, AAV 11, and variants thereof. In some embodiments, the second ITR is a mutant ITR that lacks a functional terminal resolution site (TRS). The term "lacking a terminal resolution site" can refer to an AAV ITR that comprises a mutation (e.g., a sense mutation such as a non-synonymous mutation, or missense mutation) that abrogates the function of the terminal resolution site (TRS) of the ITR, or to a truncated AAV ITR that lacks a nucleic acid sequence encoding a functional TRS (e.g., a ΔTRS ITR). Without wishing to be bound by any particular theory, a rAAV vector comprising an ITR lacking a functional TRS produces a self-complementary rAAV vector, for example as described by McCarthy (2008) *Molecular Therapy* 16(10): 1648-1656.

In addition to the major elements identified above for the recombinant AAV vector, the vector also includes conventional control elements which are operably linked with elements of the transgene in a manner that permits its transcription, translation and/or expression in a cell transfected with the vector or infected with the virus produced by the invention. As used herein, "operably linked" sequences include both expression control sequences that are contiguous with the gene of interest and expression control sequences that act in trans or at a distance to control the gene of interest. Expression control sequences include appropriate transcription initiation, termination, promoter and enhancer sequences; efficient RNA processing signals such as splicing and polyadenylation (polyA) signals; sequences that stabilize cytoplasmic mRNA; sequences that enhance translation efficiency (i.e., Kozak consensus sequence); sequences that enhance protein stability: and when desired, sequences that enhance secretion of the encoded product. A number of expression control sequences, including promoters which are native, constitutive, inducible and/or tissue-specific, are known in the art and may be utilized.

As used herein, a nucleic acid sequence (e.g., coding sequence) and regulatory sequences are said to be operably linked when they are covalently linked in such a way as to place the expression or transcription of the nucleic acid sequence under the influence or control of the regulatory sequences. If it is desired that the nucleic acid sequences be translated into a functional protein, two DNA sequences are said to be operably linked if induction of a promoter in the 5' regulatory sequences results in the transcription of the coding sequence and if the nature of the linkage between the two DNA sequences does not (1) result in the introduction of a frame-shift mutation, (2) interfere with the ability of the promoter region to direct the transcription of the coding sequences, or (3) interfere with the ability of the corresponding RNA transcript to be translated into a protein. Thus, a promoter region would be operably linked to a nucleic acid sequence if the promoter region were capable of effecting transcription of that DNA sequence such that the resulting transcript might be translated into the desired protein or polypeptide. Similarly two or more coding regions are operably linked when they are linked in such a way that their transcription from a common promoter results in the expression of two or more proteins having been translated in frame. In some embodiments, operably linked coding sequences yield a fusion protein. In some embodiments, operably linked coding sequences yield a functional RNA (e.g., miRNA).

A "promoter" refers to a DNA sequence recognized by the synthetic machinery of the cell, or introduced synthetic machinery, required to initiate the specific transcription of a gene. The phrases "operatively positioned," "under control" or "under transcriptional control" means that the promoter is in the correct location and orientation in relation to the nucleic acid to control RNA polymerase initiation and expression of the gene.

For nucleic acids encoding proteins, a polyadenylation sequence generally is inserted following the transgene sequences and before the 3' AAV ITR sequence. A rAAV construct useful in the present disclosure may also contain an intron, desirably located between the promoter/enhancer sequence and the transgene. One possible intron sequence is derived from SV-40, and is referred to as the SV-40 T intron sequence. Another vector element that may be used is an internal ribosome entry site (IRES). An IRES sequence is used to produce more than one polypeptide from a single gene transcript. An IRES sequence would be used to produce a protein that contain more than one polypeptide chains. Selection of these and other common vector elements are conventional and many such sequences are available [see, e.g., Sambrook et al., and references cited therein at, for example, pages 3.18 3.26 and 16.17 16.27 and Ausubel et al., Current Protocols in Molecular Biology, John Wiley & Sons, New York, 1989]. In some embodiments, a Foot and Mouth Disease Virus 2A sequence is included in polyprotein: this is a small peptide (approximately 18 amino acids in length) that has been shown to mediate the cleavage of polyproteins (Ryan, M D et al., EMBO, 1994; 4: 928-933; Mattion, N M et al., J Virology, November 1996: p. 8124-8127; Furler, S et al., Gene Therapy, 2001: 8: 864-873; and Halpin, C et al., The Plant Journal, 1999; 4: 453-459). The cleavage activity of the 2A sequence has previously been demonstrated in artificial systems including plasmids and gene therapy vectors (AAV and retroviruses) (Ryan, M D et al., EMBO, 1994; 4: 928-933; Mattion, N M et al., J Virology, November 1996: p. 8124-8127; Furler, S et al., Gene Therapy, 2001: 8: 864-873; and Halpin, C et al., The Plant Journal, 1999; 4: 453-459; de Felipe, P et al., Gene Therapy, 1999: 6: 198-208; de Felipe, P et al., Human Gene Therapy, 2000; 11: 1921-1931.; and Klump, H et al., Gene Therapy, 2001: 8: 811-817).

Examples of constitutive promoters include, without limitation, the retroviral Rous sarcoma virus (RSV) LTR promoter (optionally with the RSV enhancer), the cytomegalovirus (CMV) promoter (optionally with the CMV enhancer) [see, e.g., Boshart et al., Cell, 41:521-530 (1985)], the SV40 promoter, the dihydrofolate reductase promoter, the β-actin promoter, the phosphoglycerol kinase (PGK) promoter, and the EF1α promoter [Invitrogen]. In some embodiments, a promoter is an enhanced chicken β-actin promoter. In some embodiments, a promoter is a U6 promoter. In some embodiments, a promoter is a chicken beta-actin (CBA) promoter.

Inducible promoters allow regulation of gene expression and can be regulated by exogenously supplied compounds, environmental factors such as temperature, or the presence of a specific physiological state, e.g., acute phase, a particular differentiation state of the cell, or in replicating cells only. Inducible promoters and inducible systems are available from a variety of commercial sources, including, without limitation, Invitrogen, Clontech and Ariad. Many other systems have been described and can be readily selected by one of skill in the art. Examples of inducible promoters regulated by exogenously supplied promoters include the zinc-inducible sheep metallothionine (MT) promoter, the dexamethasone (Dex)-inducible mouse mammary tumor virus (MMTV) promoter, the T7 polymerase promoter system (WO 98/10088); the ecdysone insect promoter (No et al., Proc. Natl. Acad. Sci. USA, 93:3346-3351 (1996)), the tetracycline-repressible system (Gossen et al., Proc. Natl. Acad. Sci. USA, 89:5547-5551 (1992)), the tetracycline-inducible system (Gossen et al., Science, 268:1766-1769 (1995), see also Harvey et al., Curr. Opin. Chem. Biol., 2:512-518 (1998)), the RU486-inducible system (Wang et al., Nat. Biotech., 15:239-243 (1997) and Wang et al., Gene Ther., 4:432-441 (1997)) and the rapamycin-inducible system (Magari et al., J. Clin. Invest., 100:2865-2872 (1997)). Still other types of inducible promoters which may be useful in this context are those which are regulated by a specific physiological state, e.g., temperature, acute phase, a particular differentiation state of the cell, or in replicating cells only.

In another embodiment, the native promoter for the transgene will be used. The native promoter may be preferred when it is desired that expression of the transgene should mimic the native expression. The native promoter may be used when expression of the transgene must be regulated temporally or developmentally, or in a tissue-specific manner, or in response to specific transcriptional stimuli. In a further embodiment, other native expression control elements, such as enhancer elements, polyadenylation sites or Kozak consensus sequences may also be used to mimic the native expression.

In some embodiments, the regulatory sequences impart tissue-specific gene expression capabilities. In some cases, the tissue-specific regulatory sequences bind tissue-specific transcription factors that induce transcription in a tissue specific manner. Such tissue-specific regulatory sequences (e.g., promoters, enhancers, etc.,) are well known in the art. In some embodiments, the tissue-specific promoter is an eye-specific promoter. Examples of eye-specific promoters include but are not limited to a retinoschisin promoter. K12 promoter, a rhodopsin promoter, a rod-specific promoter, a cone-specific promoter, a rhodopsin kinase promoter, a GRK1 promoter, an interphotoreceptor retinoid-binding protein proximal (IRBP) promoter, and an opsin promoter (e.g., a red opsin promoter, a blue opsin promoter, etc.).

In some embodiments, a promoter is a RNA polymerase III (pol III) promoter. Non-limiting examples of pol III promoters include U6 and HI promoter sequences. In some embodiments, a promoter is a RNA polymerase II (pal II) promoter. Non-limiting examples of pol II promoters include T7, T3, SP6, RSV, and cytomegalovirus promoter sequences. In some embodiments, a pol III promoter sequence drives expression of one or more inhibitory nucleic acids and a pal II promoter sequence drives expression of a minigene.

Recombinant Adeno-Associated Viruses (rAAVs)

In some aspects, the disclosure provides isolated AAVs. As used herein with respect to AAVs, the term "isolated" refers to an AAV that has been artificially produced or obtained. Isolated AAVs may be produced using recombinant methods. Such AAVs are referred to herein as "recombinant AAVs". Recombinant AAVs (rAAVs) preferably have tissue-specific targeting capabilities, such that a nuclease and/or transgene of the rAAV will be delivered specifically to one or more predetermined tissue(s). The AAV capsid is an important element in determining these tissue-specific targeting capabilities. Thus, an rAAV having a capsid appropriate for the tissue being targeted can be selected.

Methods for obtaining recombinant AAVs having a desired capsid protein are well known in the art. (See, for example, US 2003/0138772), the contents of which are incorporated herein by reference in their entirety). Typically the methods involve culturing a host cell which contains a nucleic acid sequence encoding an AAV capsid protein; a functional rep gene; a recombinant AAV vector composed of, AAV inverted terminal repeats (ITRs) and a transgene; and sufficient helper functions to permit packaging of the recombinant AAV vector into the AAV capsid proteins. In some embodiments, capsid proteins are structural proteins encoded by the cap gene of an AAV. AAVs comprise three capsid proteins, virion proteins 1 to 3 (named VP1, VP2 and VP3), all of which are transcribed from a single cap gene via alternative splicing. In some embodiments, the molecular weights of VP1. VP2 and VP3 are respectively about 87 kDa, about 72 kDa and about 62 kDa. In some embodiments, upon translation, capsid proteins form a spherical 60-mer protein shell around the viral genome. In some embodiments, the functions of the capsid proteins are to protect the viral genome, deliver the genome and interact with the host. In some aspects, capsid proteins deliver the viral genome to a host in a tissue specific manner.

In some embodiments, an AAV capsid protein is of an AAV serotype selected from the group consisting of AAV2, AAV3, AAV4, AAV5, AAV6, AAV8, AAVrh8. AAV9, and AAV 10. In some embodiments, an AAV capsid protein is of a serotype derived from a non-human primate, for example AAVrh8 serotype. In some embodiments, the AAV capsid protein is of a serotype that has tropism for the eye of a subject, for example an AAV (e.g., AAV5, AAV6, AAV6.2, AAV7, AAV8, AAV9, AAVrh.8. AAVrh.10, AAVrh.39 and AAVrh.43) that transduces ocular cells of a subject more efficiently than other vectors. In some embodiments, an AAV capsid protein is of an AAV8 serotype or an AAV5 serotype. In some embodiments, the AAV capsid protein comprises the sequence set forth in SEQ ID NO: 9.

The components to be cultured in the host cell to package a rAAV vector in an AAV capsid may be provided to the host cell in trans. Alternatively, any one or more of the required components (e.g., recombinant AAV vector, rep sequences, cap sequences, and/or helper functions) may be provided by a stable host cell which has been engineered to contain one or more of the required components using methods known to those of skill in the art. Most suitably, such a stable host cell will contain the required component(s) under the control of an inducible promoter. However, the required component(s) may be under the control of a constitutive promoter. Examples of suitable inducible and constitutive promoters are provided herein, in the discussion of regulatory elements suitable for use with the transgene. In still another alternative, a selected stable host cell may contain selected component(s) under the control of a constitutive promoter and other selected component(s) under the control of one or more inducible promoters. For example, a stable host cell may be generated which is derived from 293 cells (which contain E1 helper functions under the control of a constitutive promoter), but which contain the rep and/or cap proteins under the control of inducible promoters. Still other stable host cells may be generated by one of skill in the art.

In some embodiments, the instant disclosure relates to a host cell containing a nucleic acid that comprises a coding sequence encoding a protein (e.g., a CEP290 protein fragment). In some embodiments, the instant disclosure relates to a composition comprising the host cell described above.

In some embodiments, the composition comprising the host cell above further comprises a cryopreservative.

The recombinant AAV vector, rep sequences, cap sequences, and helper functions required for producing the rAAV of the disclosure may be delivered to the packaging host cell using any appropriate genetic element (vector). The selected genetic element may be delivered by any suitable method, including those described herein. The methods used to construct any embodiment of this disclosure are known to those with skill in nucleic acid manipulation and include genetic engineering, recombinant engineering, and synthetic techniques. See, e.g., Sambrook et al., Molecular Cloning: A Laboratory Manual. Cold Spring Harbor Press, Cold Spring Harbor, N.Y. Similarly, methods of generating rAAV virions are well known and the selection of a suitable method is not a limitation on the present disclosure. See, e.g., K. Fisher et al., J. Virol., 70:520-532 (1993) and U.S. Pat. No. 5,478,745.

In some embodiments, recombinant AAVs may be produced using the triple transfection method (described in detail in U.S. Pat. No. 6,001,650). Typically, the recombinant AAVs are produced by transfecting a host cell with an recombinant AAV vector (comprising a transgene) to be packaged into AAV particles, an AAV helper function vector, and an accessory function vector. An AAV helper function vector encodes the "AAV helper function" sequences (i.e., rep and cap), which function in trans for productive AAV replication and encapsidation. Preferably, the AAV helper function vector supports efficient AAV vector production without generating any detectable wild-type AAV virions (i.e., AAV virions containing functional rep and cap genes). Non-limiting examples of vectors suitable for use with the present disclosure include pHLP19, described in U.S. Pat. No. 6,001,650 and pRep6cap6 vector, described in U.S. Pat. No. 6,156,303, the entirety of both incorporated by reference herein. The accessory function vector encodes nucleotide sequences for non-AAV derived viral and/or cellular functions upon which AAV is dependent for replication (i.e., "accessory functions"). The accessory functions include those functions required for AAV replication, including, without limitation, those moieties involved in activation of AAV gene transcription, stage specific AAV mRNA splicing. AAV DNA replication, synthesis of cap expression products, and AAV capsid assembly. Viral-based accessory functions can be derived from any of the known helper viruses such as adenovirus, herpesvirus (other than herpes simplex virus type-1), and vaccinia virus.

In some aspects, the disclosure provides transfected host cells. The term "transfection" is used to refer to the uptake of foreign DNA by a cell, and a cell has been "transfected" when exogenous DNA has been introduced inside the cell membrane. A number of transfection techniques are generally known in the art. See, e.g., Graham et al. (1973) Virology, 52:456, Sambrook et al. (1989) Molecular Cloning, a laboratory manual, Cold Spring Harbor Laboratories, New York, Davis et al. (1986) Basic Methods in Molecular Biology, Elsevier, and Chu et al. (1981) Gene 13:197. Such techniques can be used to introduce one or more exogenous nucleic acids, such as a nucleotide integration vector and other nucleic acid molecules, into suitable host cells.

A "host cell" refers to any cell that harbors, or is capable of harboring, a substance of interest. Often a host cell is a mammalian cell. A host cell may be used as a recipient of an AAV helper construct, an AAV minigene plasmid, an accessory function vector, or other transfer DNA associated with the production of recombinant AAVs. The term includes the progeny of the original cell which has been transfected. Thus, a "host cell" as used herein may refer to a cell which has been transfected with an exogenous DNA sequence. It is understood that the progeny of a single parental cell may not necessarily be completely identical in morphology or in genomic or total DNA complement as the original parent, due to natural, accidental, or deliberate mutation.

As used herein, the term "cell line" refers to a population of cells capable of continuous or prolonged growth and division in vitro. Often, cell lines are clonal populations derived from a single progenitor cell. It is further known in the art that spontaneous or induced changes can occur in karyotype during storage or transfer of such clonal populations. Therefore, cells derived from the cell line referred to may not be precisely identical to the ancestral cells or cultures, and the cell line referred to includes such variants.

As used herein, the terms "recombinant cell" refers to a cell into which an exogenous DNA segment, such as DNA segment that leads to the transcription of a biologically-active polypeptide or production of a biologically active nucleic acid such as an RNA, has been introduced.

As used herein, the term "vector" includes any genetic element, such as a plasmid, phage, transposon, cosmid, chromosome, artificial chromosome, virus, virion, etc., which is capable of replication when associated with the proper control elements and which can transfer gene sequences between cells. Thus, the term includes cloning and expression vehicles, as well as viral vectors. In some embodiments, useful vectors are contemplated to be those vectors in which the nucleic acid segment to be transcribed is positioned under the transcriptional control of a promoter. A "promoter" refers to a DNA sequence recognized by the synthetic machinery of the cell, or introduced synthetic machinery, required to initiate the specific transcription of a gene. The phrases "operatively positioned," "under control" or "under transcriptional control" means that the promoter is in the correct location and orientation in relation to the nucleic acid to control RNA polymerase initiation and expression of the gene. The term "expression vector or construct" means any type of genetic construct containing a nucleic acid in which part or all of the nucleic acid encoding sequence is capable of being transcribed. In some embodiments, expression includes transcription of the nucleic acid, for example, to generate a biologically-active polypeptide product or functional RNA (e.g., guide RNA) from a transcribed gene. The foregoing methods for packaging recombinant vectors in desired AAV capsids to produce the rAAVs of the disclosure are not meant to be limiting and other suitable methods will be apparent to the skilled artisan.

rAAV-Mediated Delivery of CEP290 Transgenes to the Eye

Methods for delivering a transgene to ocular (e.g., photoreceptors, such as rod cells or cone cells, retinal cells, etc.) tissue in a subject are provided herein. The methods typically involve administering to a subject an effective amount of a rAAV comprising a nucleic acid for expressing a transgene (e.g., a CEP290 protein fragment) in the subject. An "effective amount" of a rAAV is an amount sufficient to infect a sufficient number of cells of a target tissue in a subject. In some embodiments, a target tissue is ocular (e.g., photoreceptor, retinal, etc.) tissue. An effective amount of a rAAV may be an amount sufficient to have a therapeutic benefit in a subject, e.g., to improve in the subject one or more symptoms of disease, e.g., a symptom of an ocular ciliopathy (e.g., an ocular ciliopathy associated with a deletion or mutation of CEP290 gene, such as LCA). In some cases, an effective amount of a rAAV may be an amount sufficient to produce a stable somatic transgenic animal model. The effective amount will depend on a variety of factors such as, for example, the species, age, weight, health of the subject, and the ocular tissue to be targeted, and may thus vary among subject and tissue.

An effective amount may also depend on the rAAV used. The invention is based, in part on the recognition that rAAV comprising capsid proteins having a particular serotype (e.g., AAV5, AAV6, AAV6.2, AAV7, AAV8, AAV9, AAVrh.8, AAVrh.10, AAVrh.39, and AAVrh.43) mediate more efficient transduction of ocular (e.g., photoreceptor, retinal, etc.) tissue that rAAV comprising capsid proteins having a different serotype. Thus in some embodiments, the rAAV comprises a capsid protein of an AAV serotype selected from the group consisting of: AAV5, AAV6, AAV6.2, AAV7, AAV8, AAV9, AAVrh.8, AAVrh.10, AAVrh.39, and AAVrh.43. In some embodiments, the rAAV comprises a capsid protein of AAV8 serotype (SEQ ID NO: 9). In some embodiments, the capsid protein comprises an amino acid sequence that is at least 70%, at least 80%, at least 90%, at least 95%, or at least 99% identical to SEQ ID NO: 9. In some embodiments, the capsid protein is AAV5 capsid protein.

In certain embodiments, the effective amount of rAAV is $10^{10}$, $10^{11}$, $10^{12}$, $10^{13}$, or $10^{14}$ genome copies per kg. In certain embodiments, the effective amount of rAAV is $10^{10}$, $10^{11}$, $10^{12}$, $10^{13}$, $10^{14}$, or $10^{15}$ genome copies per subject.

An effective amount may also depend on the mode of administration. For example, targeting an ocular (e.g., photoreceptor, retinal, etc.) tissue by intrastromal administration or subcutaneous injection may require different (e.g., higher or lower) doses, in some cases, than targeting an ocular (e.g., photoreceptor, retinal, etc.) tissue by another method (e.g., systemic administration, topical administration). In some embodiments, intrastromal injection (IS) of rAAV having certain serotypes (e.g., AAV5, AAV6, AAV6.2, AAV7, AAV8, AAV9, AAVrh.8, AAVrh.10, AAVrh.39, and AAVrh.43) mediates efficient transduction of ocular (e.g., corneal, photoreceptor, retinal, etc.) cells. Thus, in some embodiments, the injection is intrastromal injection (IS). In some embodiments, the administration is via injection, optionally subretinal injection or intravitreal injection. In some embodiments, the injection is topical administration (e.g., topical administration to an eye). In some cases, multiple doses of a rAAV are administered.

Without wishing to be bound by any particular theory, efficient transduction of ocular (e.g., photoreceptor, retinal, etc.) cells by rAAV described herein may be useful for the treatment of a subject having an ocular disease (e.g., an ocular ciliopathy). Accordingly, methods and compositions for treating ocular disease are also provided herein. In some aspects, the disclosure provides a method for treating an ocular ciliopathy (e.g., an ocular ciliopathy associated with a deletion or mutation of CEP290 gene), the method comprising: administering to a subject having or suspected of having an ocular ciliopathy an effective amount of rAAV, wherein the rAAV comprises (i) a capsid protein having a serotype selected from the group consisting of AAV5, AAV6, AAV6.2, AAV7, AAV8, AAV9, AAVrh.8, AAVrh.10, AAVrh.39, and AAVrh.43, and (ii) a nucleic acid comprising a promoter operably linked to a transgene (e.g., a transgene encoding a CEP290 protein fragment as described by the disclosure).

In some embodiments, administration of a rAAV (or isolated nucleic acid) as described by the disclosure results in transduction of a cell or cells comprising a cilium, optionally a photoreceptor sensory cilium. The photoreceptor (PR) sensory cilium is nucleated from the basal body at the apical surface of the inner segment. As the microtubules extend, they form a doublet microtubule structure, called the connecting cilium (CC). The CC is analogous to the transition zone of a prototypic cilium and extends into the outer segment (OS) of the photoreceptor cell. The CC is acts as a conduit for unidirectional or bidirectional transport of cargo moieties between the inner and the outer segments. The CC also acts as a 'gatekeeper' to regulate the entry or exit of the cargo, which aids in the maintenance of its unique composition. In some embodiments, administration of a rAAV (or isolated nucleic acid) as described by the disclosure results in growth or formation of a photoreceptor sensory cilium, a connecting cilium, or a combination thereof.

The rAAVs may be delivered to a subject in compositions according to any appropriate methods known in the art. The rAAV, preferably suspended in a physiologically compatible carrier (i.e., in a composition), may be administered to a subject, i.e. host animal, such as a human, mouse, rat, cat, dog, sheep, rabbit, horse, cow, goat, pig, guinea pig, hamster, chicken, turkey, or a non-human primate (e.g., Macaque). In some embodiments, a host animal does not include a human.

Delivery of the rAAVs to a mammalian subject may be by, for example, intraocular injection or topical administration (e.g., eye drops). In some embodiments, the intraocular injection is intrastromal injection, subconjunctival injection, or intravitreal injection. In some embodiments, the injection is not topical administration. Combinations of administration methods (e.g., topical administration and intrastromal injection) can also be used.

The compositions of the disclosure may comprise an rAAV alone, or in combination with one or more other viruses (e.g., a second rAAV encoding having one or more different transgenes). In some embodiments, a composition comprises 1, 2, 3, 4, 5, 6, 7, 8, 9, 10, or more different rAAVs each having one or more different transgenes.

In some embodiments, a composition further comprises a pharmaceutically acceptable carrier. Suitable carriers may be readily selected by one of skill in the art in view of the indication for which the rAAV is directed. For example, one suitable carrier includes saline, which may be formulated with a variety of buffering solutions (e.g., phosphate buffered saline). Other exemplary carriers include sterile saline, lactose, sucrose, calcium phosphate, gelatin, dextran, agar, pectin, peanut oil, sesame oil, and water. The selection of the carrier is not a limitation of the present disclosure.

Optionally, the compositions of the disclosure may contain, in addition to the rAAV and carrier(s), other pharmaceutical ingredients, such as preservatives, or chemical stabilizers. Suitable exemplary preservatives include chlorobutanol, potassium sorbate, sorbic acid, sulfur dioxide, propyl gallate, the parabens, ethyl vanillin, glycerin, phenol, and parachlorophenol. Suitable chemical stabilizers include gelatin and albumin.

The rAAVs are administered in sufficient amounts to transfect the cells of a desired tissue (e.g., ocular tissue, such as photoreceptor, retinal, etc., tissue) and to provide sufficient levels of gene transfer and expression without undue adverse effects. Examples of pharmaceutically acceptable mutes of administration include, but are not limited to, direct delivery to the selected organ (e.g., subretinal delivery to the eye), oral, inhalation (including intranasal and intratracheal delivery), intraocular, intravenous, intramuscular, subcutaneous, intradermal, intratumoral, and other parental routes of administration. Routes of administration may be combined, if desired.

The dose of rAAV virions required to achieve a particular "therapeutic effect," e.g., the units of dose in genome copies/per kilogram of body weight (GC/kg), will vary based on several factors including, but not limited to: the mute of rAAV virion administration, the level of gene or RNA expression required to achieve a therapeutic effect, the specific disease or disorder being treated, and the stability of the gene or RNA product. One of skill in the art can readily determine a rAAV virion dose range to treat a patient having a particular disease or disorder based on the aforementioned factors, as well as other factors.

An effective amount of an rAAV is an amount sufficient to target infect an animal, target a desired tissue. The effective amount will depend primarily on factors such as the species, age, weight, health of the subject, and the tissue to be targeted, and may thus vary among animal and tissue. For example, an effective amount of the rAAV is generally in the range of from about 1 ml to about 100 ml of solution containing from about $10^9$ to $10^{16}$ genome copies. In some cases, a dosage between about $10^{11}$ to $10^{13}$ rAAV genome copies is appropriate. In certain embodiments, $10^9$ rAAV genome copies is effective to target ocular tissue (e.g., corneal tissue). In some embodiments, a dose more concentrated than $10^9$ rAAV genome copies is toxic when administered to the eye of a subject. In some embodiments, an effective amount is produced by multiple doses of an rAAV.

In some embodiments, a dose of rAAV is administered to a subject no more than once per calendar day (e.g., a 24-hour period). In some embodiments, a dose of rAAV is administered to a subject no more than once per 2, 3, 4, 5, 6, or 7 calendar days. In some embodiments, a dose of rAAV is administered to a subject no more than once per calendar week (e.g., 7 calendar days). In some embodiments, a dose of rAAV is administered to a subject no more than bi-weekly (e.g., once in a two calendar week period). In some embodiments, a dose of rAAV is administered to a subject no more than once per calendar month (e.g., once in 30 calendar days). In some embodiments, a dose of rAAV is administered to a subject no more than once per six calendar months. In some embodiments, a dose of rAAV is administered to a subject no more than once per calendar year (e.g., 365 days or 366 days in a leap year).

In some embodiments, rAAV compositions are formulated to reduce aggregation of AAV particles in the composition, particularly where high rAAV concentrations are present (e.g., ~$10^{13}$ GC/ml or more). Appropriate methods for reducing aggregation of may be used, including, for example, addition of surfactants, pH adjustment, salt concentration adjustment, etc. (See, e.g., Wright F R, et al., Molecular Therapy (2005) 12, 171-178, the contents of which are incorporated herein by reference.)

Formulation of pharmaceutically-acceptable excipients and carrier solutions is well-known to those of skill in the art, as is the development of suitable dosing and treatment regimens for using the particular compositions described herein in a variety of treatment regimens. Typically, these formulations may contain at least about 0.1% of the active compound or more, although the percentage of the active ingredient(s) may, of course, be varied and may conveniently be between about 1 or 2% and about 70% or 80% or more of the weight or volume of the total formulation. Naturally, the amount of active compound in each therapeutically-useful composition may be prepared is such a way that a suitable dosage will be obtained in any given unit dose of the compound. Factors such as solubility, bioavailability, biological half-life, route of administration, product shelf life, as well as other pharmacological considerations will be contemplated by one skilled in the art of preparing such pharmaceutical formulations, and as such, a variety of dosages and treatment regimens may be desirable.

In some embodiments, rAAVs in suitably formulated pharmaceutical compositions disclosed herein are delivered directly to target tissue, e.g., direct to ocular tissue (e.g., photoreceptor, retinal, etc., tissue) However, in certain circumstances it may be desirable to separately or in addition deliver the rAAV-based therapeutic constructs via another route, e.g., subcutaneously, intrapancreatically, intranasally, parenterally, intravenously, intramuscularly, intrathecally, or orally, intraperitoneally, or by inhalation. In some embodiments, the administration modalities as described in U.S. Pat. Nos. 5,543,158; 5,641,515 and 5,399,363 (each specifically incorporated herein by reference in its entirety) may be used to deliver rAAVs. In some embodiments, a preferred mode of administration is by intravitreal injection or subretinal injection.

The pharmaceutical forms suitable for injectable use include sterile aqueous solutions or dispersions and sterile powders for the extemporaneous preparation of sterile injectable solutions or dispersions. Dispersions may also be prepared in glycerol, liquid polyethylene glycols, and mixtures thereof and in oils. Under ordinary conditions of storage and use, these preparations contain a preservative to prevent the growth of microorganisms. In many cases the form is sterile and fluid to the extent that easy syringability exists. It must be stable under the conditions of manufacture and storage and must be preserved against the contaminating action of microorganisms, such as bacteria and fungi. The carrier can be a solvent or dispersion medium containing, for example, water, ethanol, polyol (e.g., glycerol, propylene glycol, and liquid polyethylene glycol, and the like), suitable mixtures thereof, and/or vegetable oils. Proper fluidity may be maintained, for example, by the use of a coating, such as lecithin, by the maintenance of the required particle size in the case of dispersion and by the use of surfactants. The prevention of the action of microorganisms can be brought about by various antibacterial and antifungal agents, for example, parabens, chlorobutanol, phenol, sorbic acid, thimerosal, and the like. In many cases, it will be preferable to include isotonic agents, for example, sugars or sodium chloride. Prolonged absorption of the injectable compositions can be brought about by the use in the compositions of agents delaying absorption, for example, aluminum monostearate and gelatin.

For administration of an injectable aqueous solution, for example, the solution may be suitably buffered, if necessary, and the liquid diluent first rendered isotonic with sufficient saline or glucose. These particular aqueous solutions are especially suitable for intravenous, intramuscular, subcutaneous and intraperitoneal administration. In this connection, a suitable sterile aqueous medium may be employed. For example, one dosage may be dissolved in 1 ml of isotonic NaCl solution and either added to 1000 ml of hypodermoclysis fluid or injected at the proposed site of infusion. (see for example, "Remington's Pharmaceutical Sciences" 15th Edition, pages 1035-1038 and 1570-1580). Some variation in dosage will necessarily occur depending on the condition of the host. The person responsible for administration will, in any event, determine the appropriate dose for the individual host.

Sterile injectable solutions are prepared by incorporating the active rAAV in the required amount in the appropriate solvent with various of the other ingredients enumerated herein, as required, followed by filtered sterilization. Generally, dispersions are prepared by incorporating the various sterilized active ingredients into a sterile vehicle which contains the basic dispersion medium and the required other ingredients from those enumerated above. In the case of sterile powders for the preparation of sterile injectable solutions, the preferred methods of preparation are vacuum-drying and freeze-drying techniques which yield a powder of the active ingredient plus any additional desired ingredient from a previously sterile-filtered solution thereof.

The rAAV compositions disclosed herein may also be formulated in a neutral or salt form. Pharmaceutically-acceptable salts, include the acid addition salts (formed with the free amino groups of the protein) and which are formed with inorganic acids such as, for example, hydrochloric or phosphoric acids, or such organic acids as acetic, oxalic, tartaric, mandelic, and the like. Salts formed with the free carboxyl groups can also be derived from inorganic bases such as, for example, sodium, potassium, ammonium, calcium, or ferric hydroxides, and such organic bases as isopropylamine, trimethylamine, histidine, procaine and the like. Upon formulation, solutions will be administered in a manner compatible with the dosage formulation and in such amount as is therapeutically effective. The formulations are easily administered in a variety of dosage forms such as injectable solutions, drug-release capsules, and the like.

As used herein, "carrier" includes any and all solvents, dispersion media, vehicles, coatings, diluents, antibacterial and antifungal agents, isotonic and absorption delaying agents, buffers, carrier solutions, suspensions, colloids, and the like. The use of such media and agents for pharmaceutical active substances is well known in the art. Supplementary active ingredients can also be incorporated into the compositions. The phrase "pharmaceutically-acceptable" refers to molecular entities and compositions that do not produce an allergic or similar untoward reaction when administered to a host.

Delivery vehicles such as liposomes, nanocapsules, microparticles, microspheres, lipid particles, vesicles, and the like, may be used for the introduction of the compositions of the present disclosure into suitable host cells. In particular, the rAAV vector delivered transgenes may be formulated for delivery either encapsulated in a lipid particle, a liposome, a vesicle, a nanosphere, or a nanoparticle or the like.

Such formulations may be preferred for the introduction of pharmaceutically acceptable formulations of the nucleic acids or the rAAV constructs disclosed herein. The formation and use of liposomes is generally known to those of skill in the art. Recently, liposomes were developed with improved serum stability and circulation half-times (U.S. Pat. No. 5,741,516). Further, various methods of liposome and liposome like preparations as potential drug carriers have been described (U.S. Pat. Nos. 5,567,434; 5,552,157; 5,565,213; 5,738,868 and 5,795,587). Liposomes have been used successfully with a number of cell types that are normally resistant to transfection by other procedures. In addition, liposomes are free of the DNA length constraints that are typical of viral-based delivery systems. Liposomes have been used effectively to introduce genes, drugs, radiotherapeutic agents, viruses, transcription factors and allosteric effectors into a variety of cultured cell lines and animals. In addition, several successful clinical trials examining the effectiveness of liposome-mediated drug delivery have been completed.

Liposomes are formed from phospholipids that are dispersed in an aqueous medium and spontaneously form multilamellar concentric bilayer vesicles (also termed multilamellar vesicles (MLVs). MLVs generally have diameters of from 25 nm to 4 µm. Sonication of MLVs results in the formation of small unilamellar vesicles (SUVs) with diameters in the range of 200 to 500 Å, containing an aqueous solution in the core.

Alternatively, nanocapsule formulations of the rAAV may be used. Nanocapsules can generally entrap substances in a stable and reproducible way. To avoid side effects due to intracellular polymeric overloading, such ultrafine particles (sized around 0.1 µm) should be designed using polymers able to be degraded in vivo. Biodegradable polyalkyl-cyanoacrylate nanoparticles that meet these requirements are contemplated for use.

Kits and Related Compositions

The agents described herein may, in some embodiments, be assembled into pharmaceutical or diagnostic or research kits to facilitate their use in therapeutic, diagnostic or research applications. A kit may include one or more containers housing the components of the disclosure and instructions for use. Specifically, such kits may include one or more agents described herein, along with instructions describing the intended application and the proper use of these agents. In certain embodiments agents in a kit may be in a pharmaceutical formulation and dosage suitable for a particular application and for a method of administration of the agents. Kits for research purposes may contain the components in appropriate concentrations or quantities for running various experiments.

In some embodiments, the instant disclosure relates to a kit for producing a rAAV, the kit comprising a container housing an isolated nucleic acid comprising a transgene encoding a CEP290 protein fragment having the amino acid sequence set forth in any one of SEQ ID NOs: 2-4. In some embodiments, the kit further comprises a container housing an isolated nucleic acid encoding an AAV capsid protein, for example an AAV8 capsid protein (e.g., SEQ ID NO: 9).

The kit may be designed to facilitate use of the methods described herein by researchers and can take many forms. Each of the compositions of the kit, where applicable, may be provided in liquid form (e.g., in solution), or in solid form. (e.g., a dry powder). In certain cases, some of the compositions may be constitutable or otherwise processable (e.g., to an active form), for example, by the addition of a suitable solvent or other species (for example, water or a cell culture medium), which may or may not be provided with the kit. As used herein, "instructions" can define a component of instruction and/or promotion, and typically involve written instructions on or associated with packaging of the disclosure. Instructions also can include any oral or electronic instructions provided in any manner such that a user will clearly recognize that the instructions are to be associated with the kit, for example, audiovisual (e.g., videotape, DVD, etc.), Internet, and/or web-based communications, etc. The written instructions may be in a form prescribed by a governmental agency regulating the manufacture, use or sale of pharmaceuticals or biological products, which instructions can also reflects approval by the agency of manufacture, use or sale for animal administration.

The kit may contain any one or more of the components described herein in one or more containers. As an example, in one embodiment, the kit may include instructions for mixing one or more components of the kit and/or isolating and mixing a sample and applying to a subject. The kit may include a container housing agents described herein. The agents may be in the form of a liquid, gel or solid (powder). The agents may be prepared sterilely, packaged in syringe and shipped refrigerated. Alternatively it may be housed in a vial or other container for storage. A second container may have other agents prepared sterilely. Alternatively the kit may include the active agents premixed and shipped in a syringe, vial, tube, or other container.

Exemplary embodiments of the invention will be described in more detail by the following examples. These embodiments are exemplary of the invention, which one skilled in the art will recognize is not limited to the exemplary embodiments.

EXAMPLES

Therapeutic Strategies for CEP290-LCA

The relative sparing of the central region of the CEP290-LCA patient retinas indicates that gene therapy may be a viable option for visual restoration in patients. However, progress in the development of mutation-independent gene replacement strategies for CEP290-LCA has been delayed largely because of unsuitability of the long CEP290 gene to be packaged into conventional AAV vector system for gene therapy. This example describes delivery of CEP290 fragments via AAV to treat CEP290-LCA. In some embodiments, the described CEP290 fragments restore cilial growth and photoreceptor function in a mutation-independent manner, and are thus useful for treatment of nonsyndromic LCA and retinal degeneration in systemic ciliopathies due to CEP290 mutations.

The full-length CEP290 cDNA is ~8 kb long, which generally exceeds the packaging limit of conventional AAV vectors. A schematic depiction of the full-length CEP290 gene representing the locations of distinct protein interaction domains is shown in FIG. 1. Here, CEP290 fragments that retain function in photoreceptors (PR) and can be delivered using the conventional AAV vectors were identified. As CEP290 is a ciliary protein and regulates cilia growth, an in vitro assay of cilia growth was developed in order to use as a surrogate marker to test the function of shorter CEP290 regions. It was observed that mouse embryonic fibroblasts (MEFs) derived from a Cep290-mutant (Cep290$^{rd16}$) mouse, which recapitulates the early onset severe PR degeneration phenotype, have fewer ciliated cells and the cells that formed cilia were shorter compared to controls. This observation is consistent with previous studies that revealed fewer and shorter cilia in fibroblasts derived from CEP290-LCA patient samples.

Figure 2A:
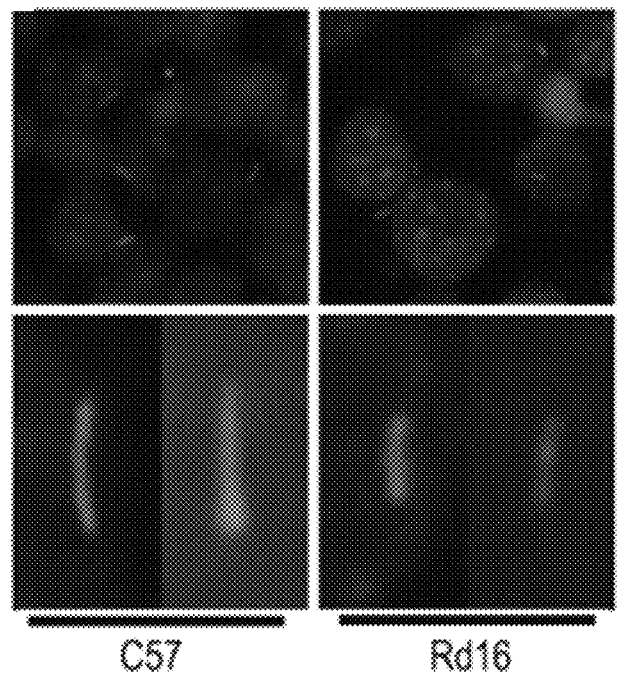
FIG. 2A shows microscopy data relating to cilial number and length in mouse embryonic fibroblasts (MEFs) from wild-type (WT) and Cep290$^{rd16}$ mice that were serum-starved for 24 h (for cilia growth) and then stained with anti-acetylated α-tubulin antibody (cilia marker). The lower images depict higher magnification of cilia.
Figure 2B:
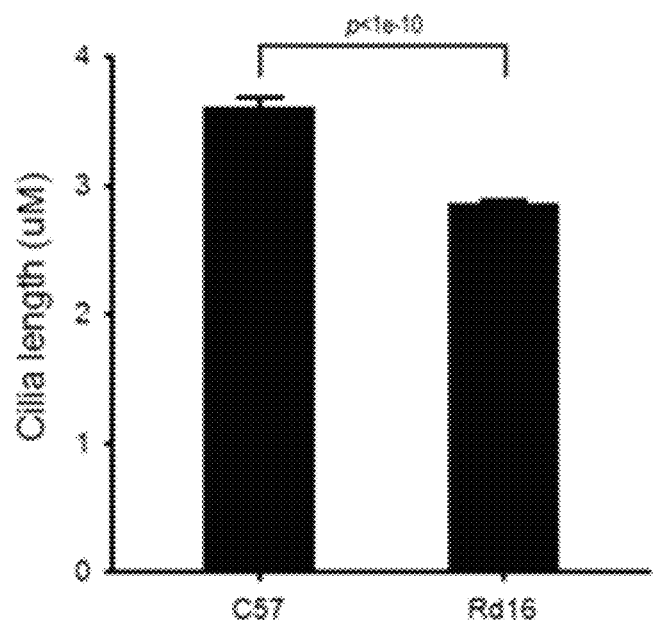
FIG. 2B shows a statistically significant decrease in the length of cilia in mutant MEFs.

As shown in FIGS. 2A-2B, cilia of Cep290$^{rd16}$ MEFs are ~2.7 μm in length as compared to controls, which have ~3.8 μm long cilia. In addition, fewer cells with cilia were detected among Cep290$^{rd16}$ MEFs as compared to controls.

Figure 3:
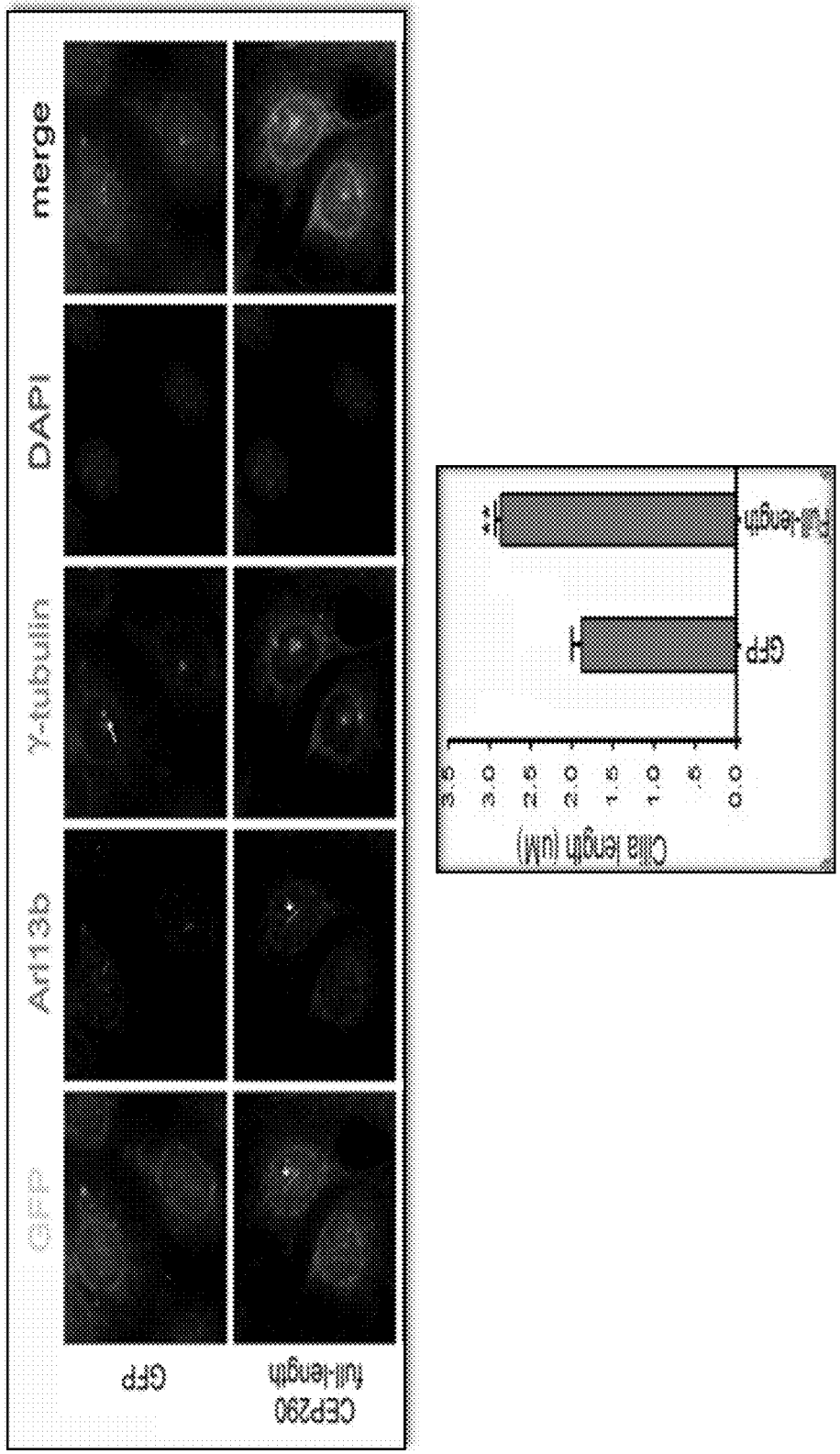
FIG. 3 shows Cep290$^{rd16}$ MEFs transfected with constructs encoding GFP or GFP-CEP290, followed by staining with ARL13b (cilia marker) and γ-tubulin. A significant increase in cilia length of cells expressing full-length CEP290 was observed. GFP-encoding construct was used as negative control. **: p<0.001.

Next, the effect of expressing full-length human CEP290 protein on cilia length in Cep290$^{rd16}$ MEFs was investigated. It was observed that the full-length human CEP290 protein correctly localizes to cilia, as determined by co-staining with ARL13b, which is a cilia marker (FIG. 3). Expressing GFP protein did not result in its localization to cilia. Additionally, measurement of cilia length showed that expression of CEP290 protein significantly rescued the cilia length of Cep290$^{rd16}$ MEFs as compared to expression of GFP.

Construction of vCEP290

Figure 4A:
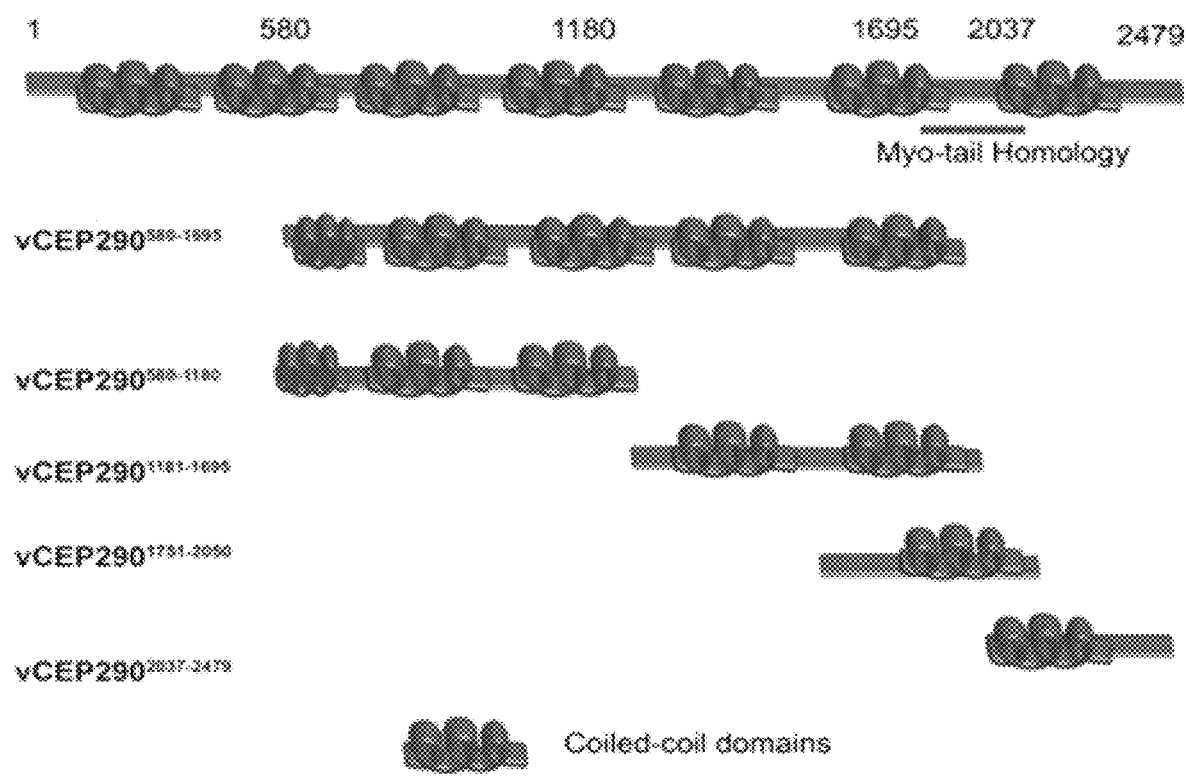
FIG. 4A shows a schematic representation of the human CEP290 protein and deleted variants. Myo-tail: Myosin tail homology domain. Additional protein-interaction domains are also not shown.
Figure 4B:
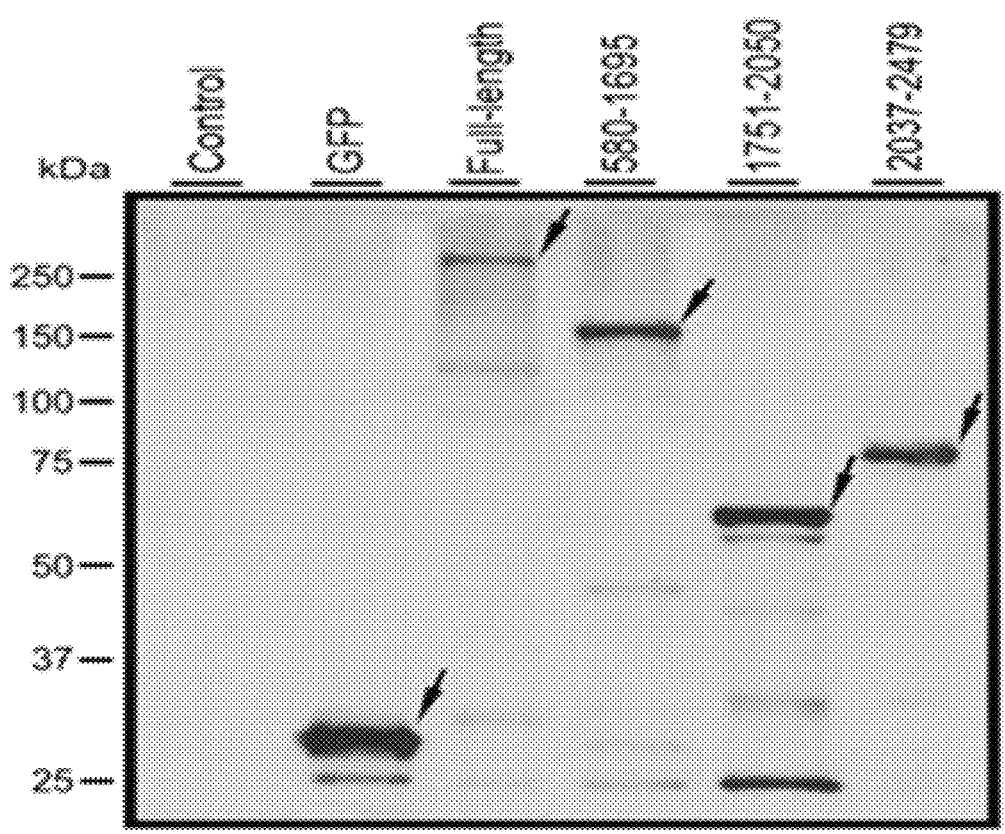
FIG. 4B shows immunoblot analysis using anti-GFP antibody of mouse fibroblasts transiently transfected with the constructs described in FIG. 4A. Specific protein bands (depicted by arrows) were detected indicating that the deleted variants are stably expressed in cells.
Figure 9:
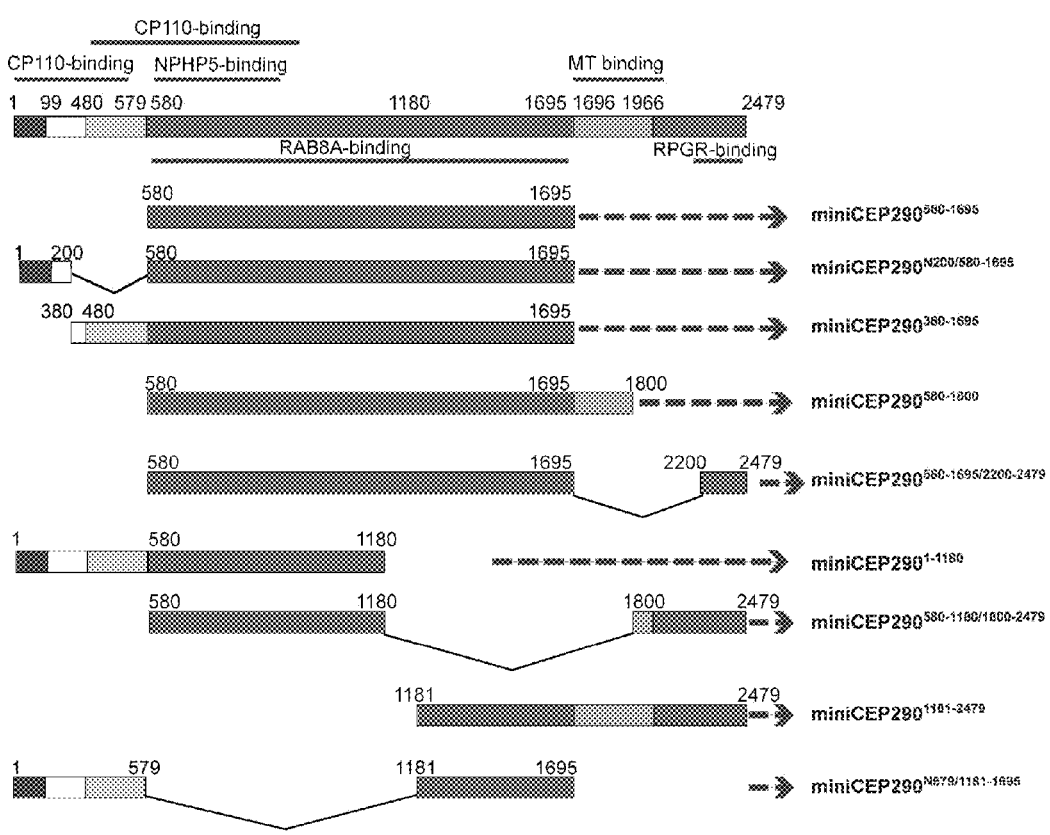
FIG. 9 shows additional embodiments of CEP290 minigenes.

The CEP290 gene encodes a predominantly coiled-coil protein. Constructs that removed repetitive domains of human CEP290, such as plasmids encoding GFP-fused miniCEP290$^{580-1695}$, miniCEP290$^{1751-2050}$ and miniCEP290$^{2037-2479}$ (FIG. 4A), were produced. Variants were cloned into pEGFP-C1 vector expressing the gene under the control of CMV promoter. The constructs express stable CEP290 protein fragments as determined by immunoblot analysis of protein extracts from transiently transfected mouse embryonic fibroblasts (FIG. 4B; see arrows). To test the functional potential of the miniCEP290s, a surrogate assay system using Cep290$^{rd16}$ MEFs (mouse embryonic fibroblasts) was used. FIG. 9 shows additional examples of CEP290 variants.

Effect of vCEP290 on Cilia Length

Figure 5A:
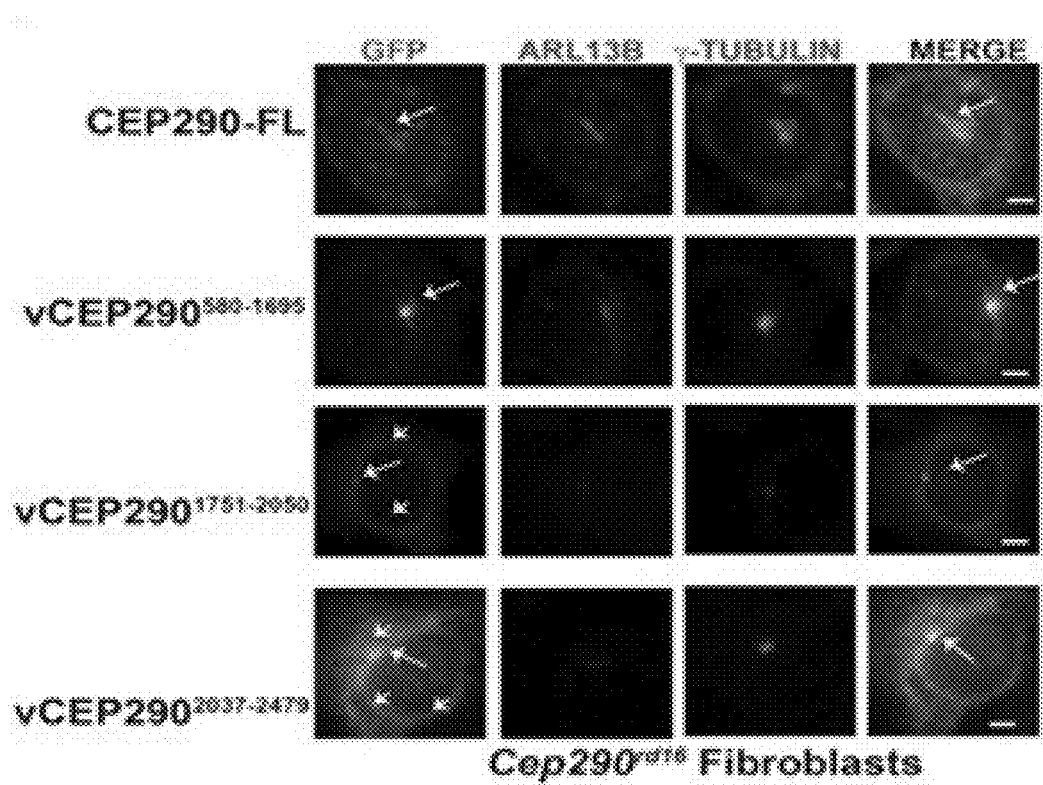
FIG. 5A shows immunostaining of Cep290$^{rd16}$ fibroblasts transiently transfected with plasmid encoding GFP-fused full-length (FL) CEP290 and indicated variants with GFP, γ-tubulin, ARL13B antibodies. Nuclei were stained with DAPI. Longer arrows indicate basal body/ciliary localization of the proteins whereas shorter arrows mark the diffuse staining.
Figure 5B:
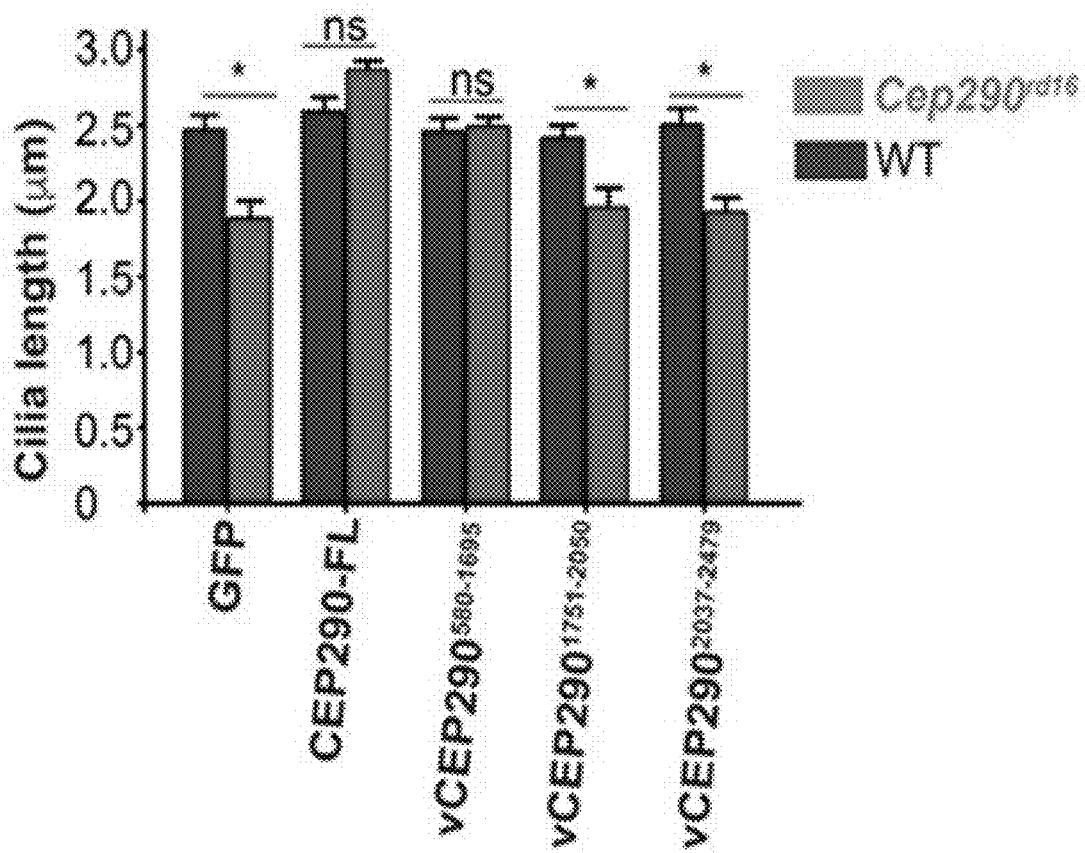
FIG. 5B shows cilia length of cells (n>200) described in FIG. 5A quantified using ImageJ. *: p<0.001. ns: not significant.

As shown in FIG. 5A, expression of different GFP-vCEP290-encoding plasmids into Cep290$^{rd16}$ or wild type mouse embryonic fibroblasts indicates that vCEP290$^{580-1695}$ localizes predominantly to the basal bodies (co-localization with γ-tubulin) and proximal cilia (co-localization with ADP-Ribosylation Factor-Like 13B; ARL13B; ciliary marker). Expression of other variants indicated a relatively diffuse pattern of localization. The ability of the vCEP290 to modulate cilia length in Cep290$^{rd16}$ fibroblasts was then assessed. As shown in FIG. 5B, cilia length of the mutant fibroblasts was significantly increased when vCEP290$^{580-1695}$ was expressed. Other variants, and the negative control expressing only GFP, did not reveal a change in the cilia length of the fibroblasts. No effect on cilia length of the wild type fibroblasts was observed.

Figure 6A:
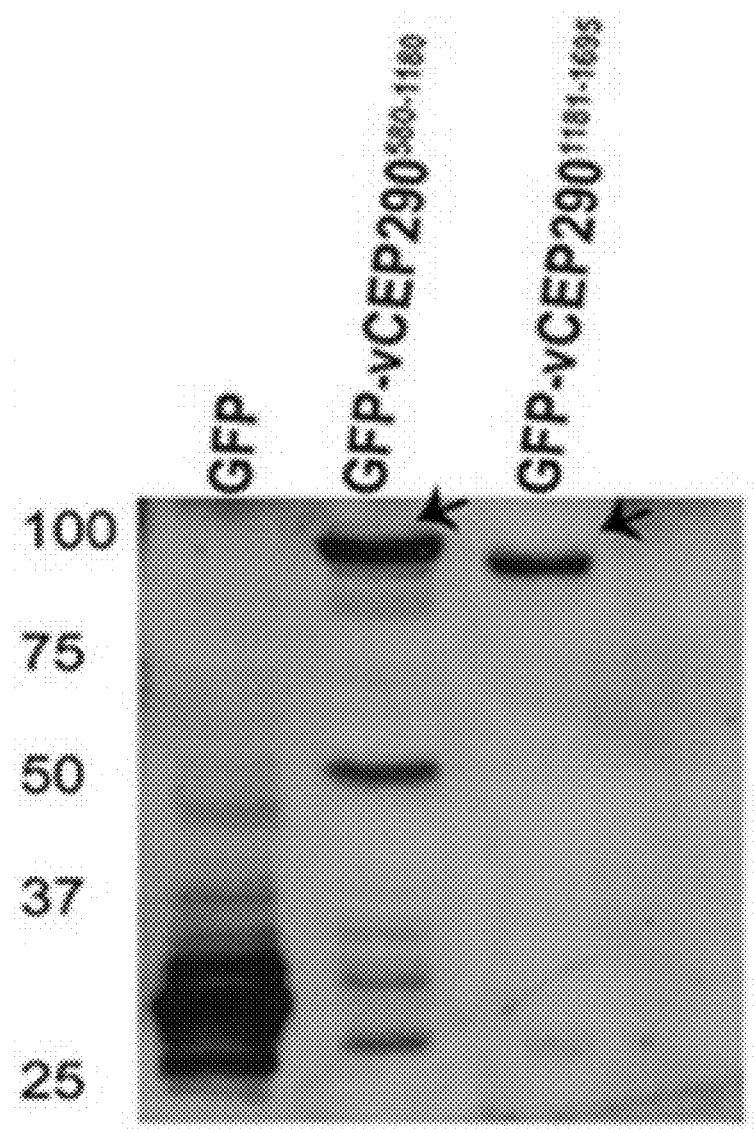
FIG. 6A shows immunoblot analysis of Cep290$^{rd16}$ fibroblasts transiently transfected with plasmid encoding GFP alone or GFP-fused indicated variants, using anti-GFP antibody. Arrows point to the expected size protein product. Molecular mass marker is shown in kDa.
Figure 6B:
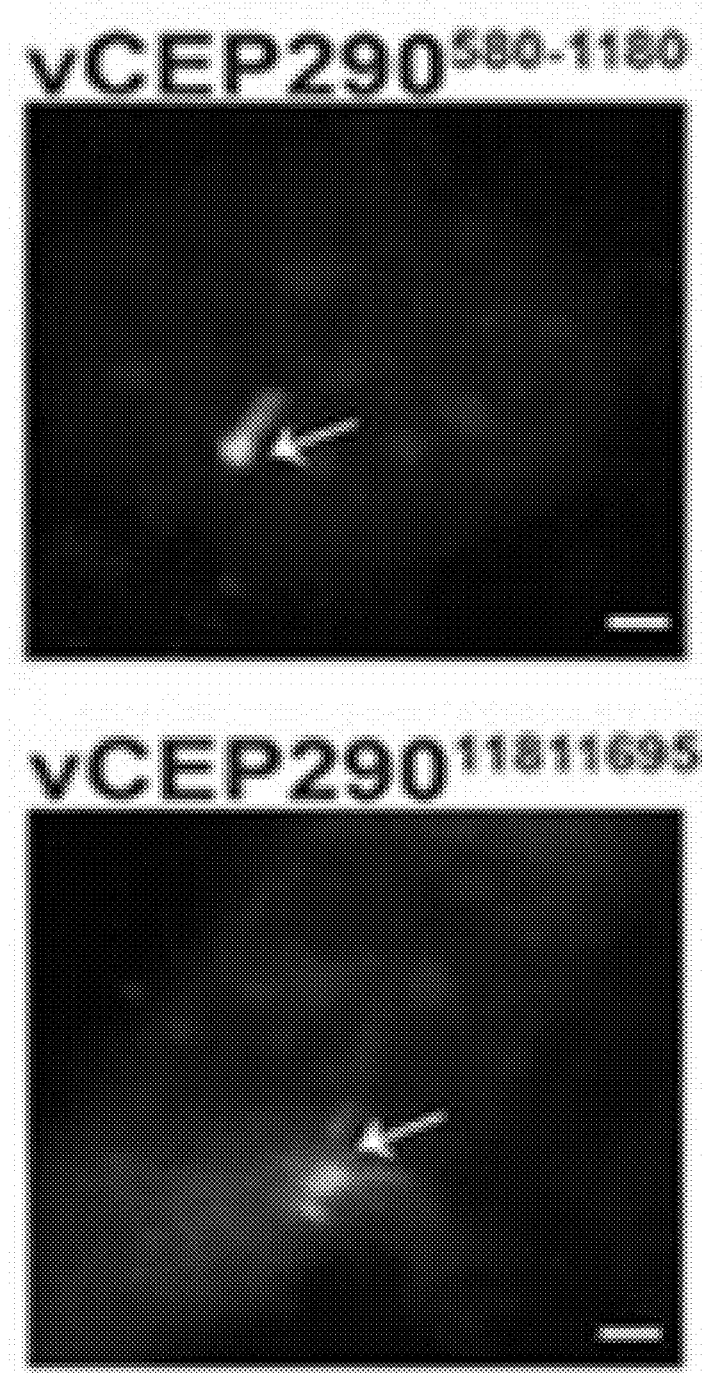
FIG. 6B shows immunostaining of the cells using GFP and ARL13B (cilia marker) antibodies. Nuclei were stained with DAPI. Arrows indicate basal body/ciliary localization of the proteins.
Figure 6C:
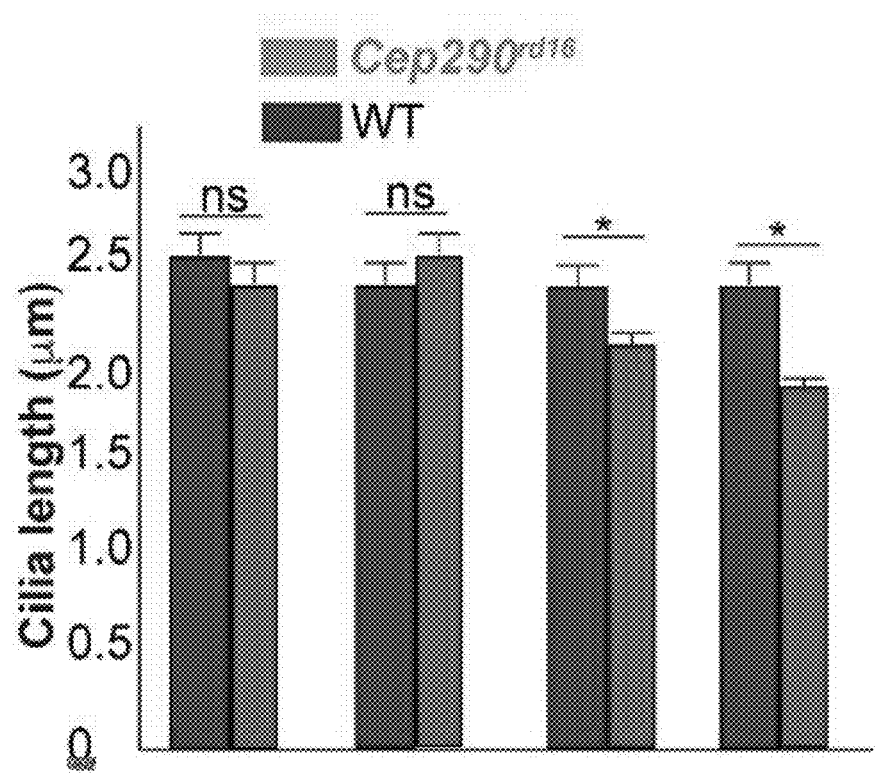
FIG. 6C shows the cilia length of the cells (n>200) quantified using ImageJ. *: p<0.001.
Figure 7A:
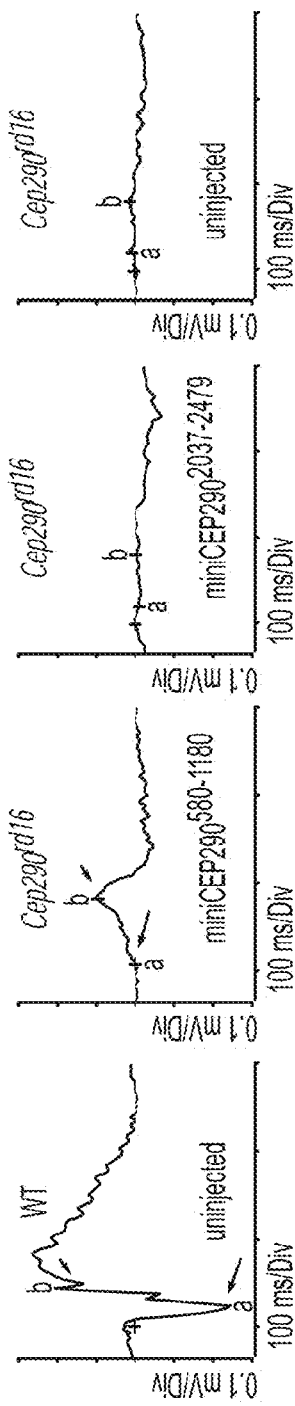
FIGS. 7A-7B show in vivo physiological rescue potential of miniCEP290$^{580-1180}$.
Figure 7B:
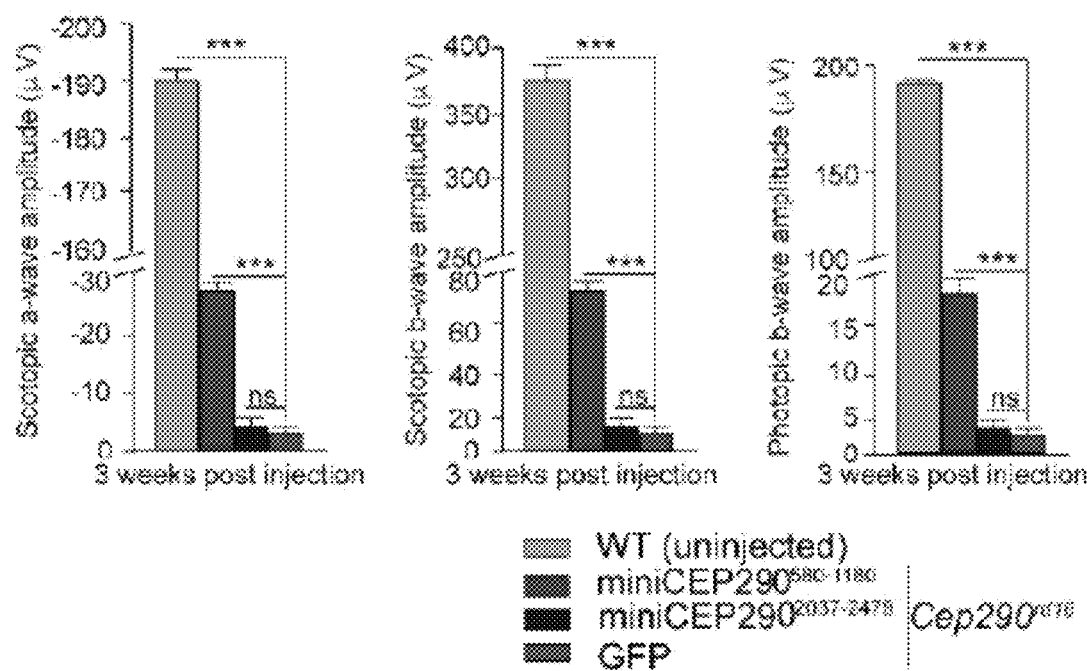
Figure 10:
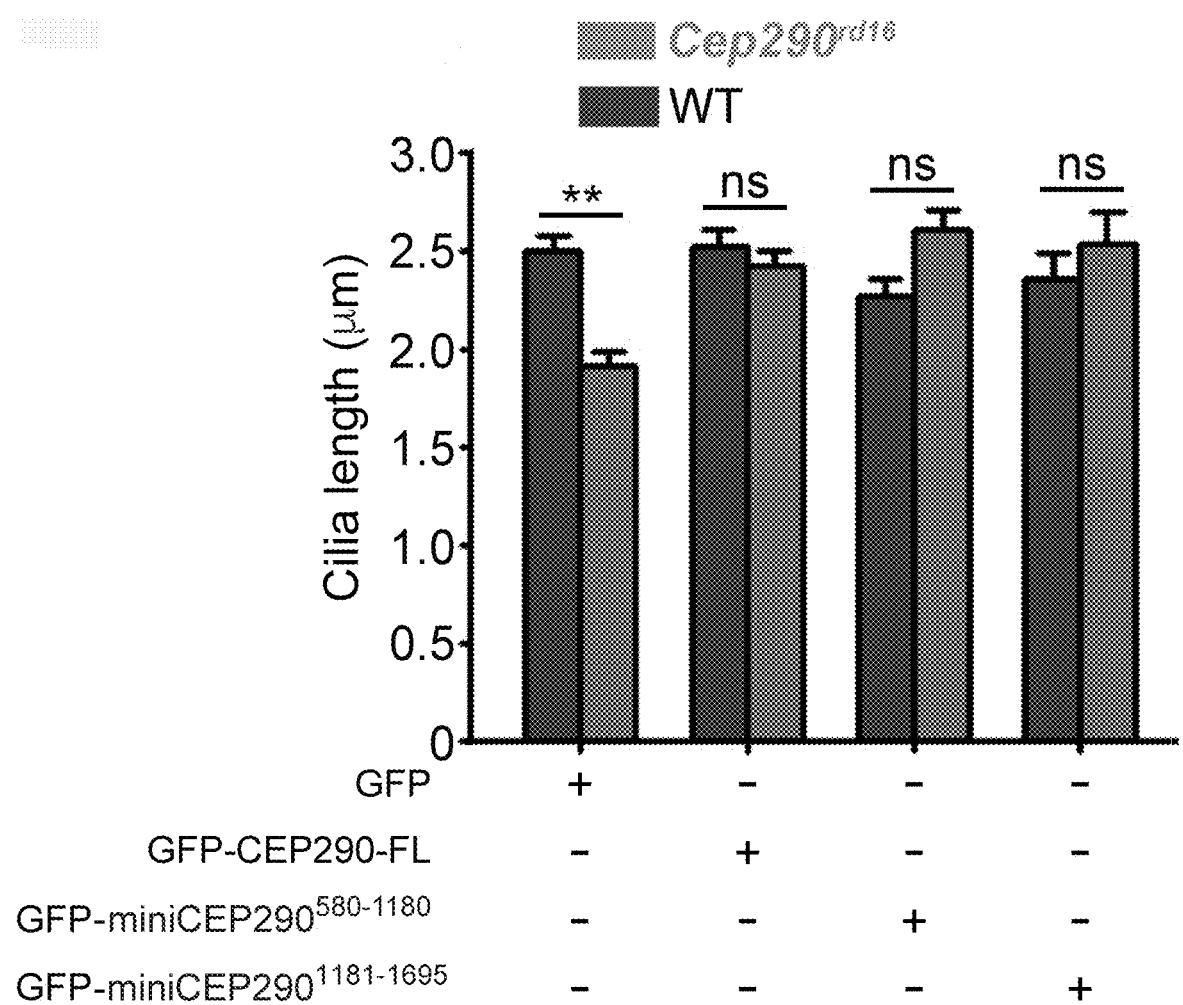
FIG. 10 shows the cilia length of Cep290$^{rd16}$ fibroblasts transiently transfected with plasmid encoding GFP alone or GFP-fused indicated variants, using anti-GFP antibody (n>200) quantified using ImageJ.
Figure 11:
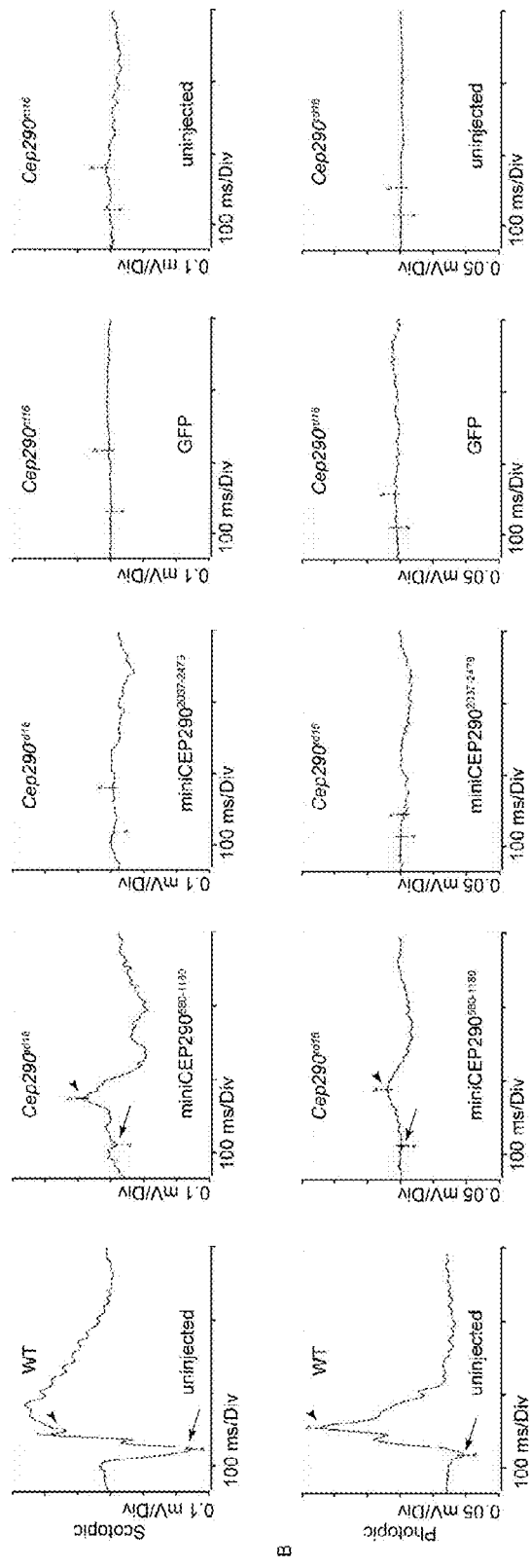
FIG. 11 shows Cep290$^{rd16}$ mice subretinally injected at P0/P1 stage with indicated miniCEP290s or GFP, and analyzed by ERG at 3 weeks post injection. Age-matched uninjected WT or Cep290$^{rd16}$ (littermates) mice were used as controls for ERG. The ERG a-wave is represented by arrows while b-wave vis depicted using arrowheads. Data represent analysis of at least 6 mice. ***: p<0.0001; ns: not significant.
Figure 12:
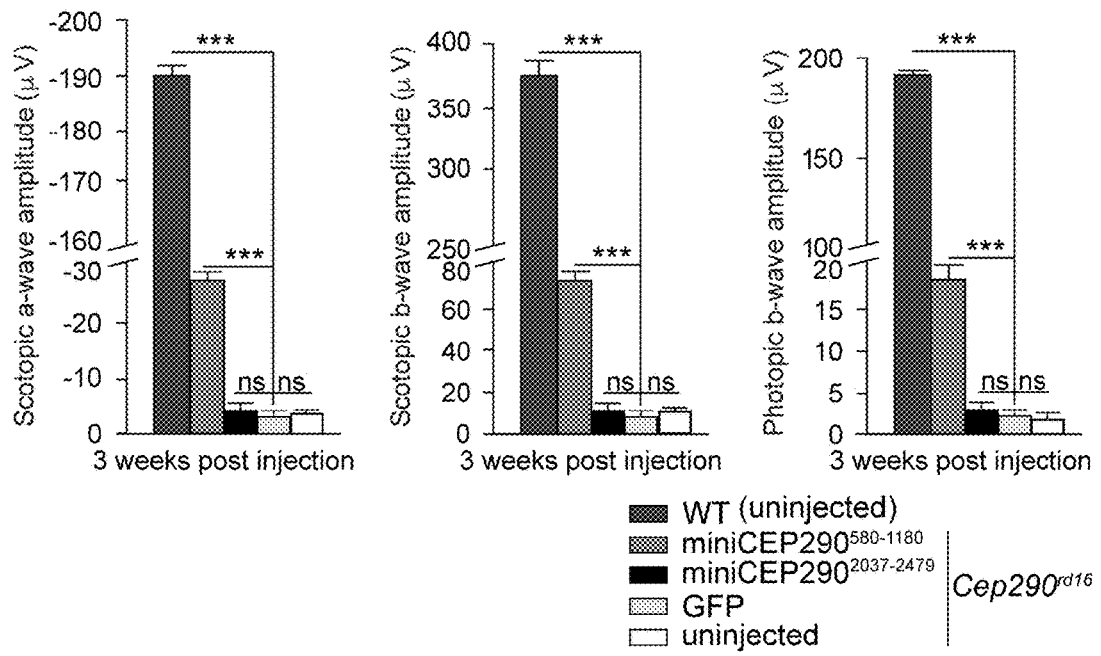
FIG. 12 shows scotopic a-wave and b-wave amplitude for mice subretinally injected at P0/P1 stage with indicated miniCEP290s or GFP, and analyzed by ERG at 3 weeks post injection Scotopic (a- and b-waves) and photopic b-wave analysis of the injected mice performed at 4 and 5 weeks post injection and compared to the ERG at 3 weeks are shown. Age-matched uninjected WT and GFP-injected Cep290$^{rd16}$ mice were used as controls.
Figure 12:
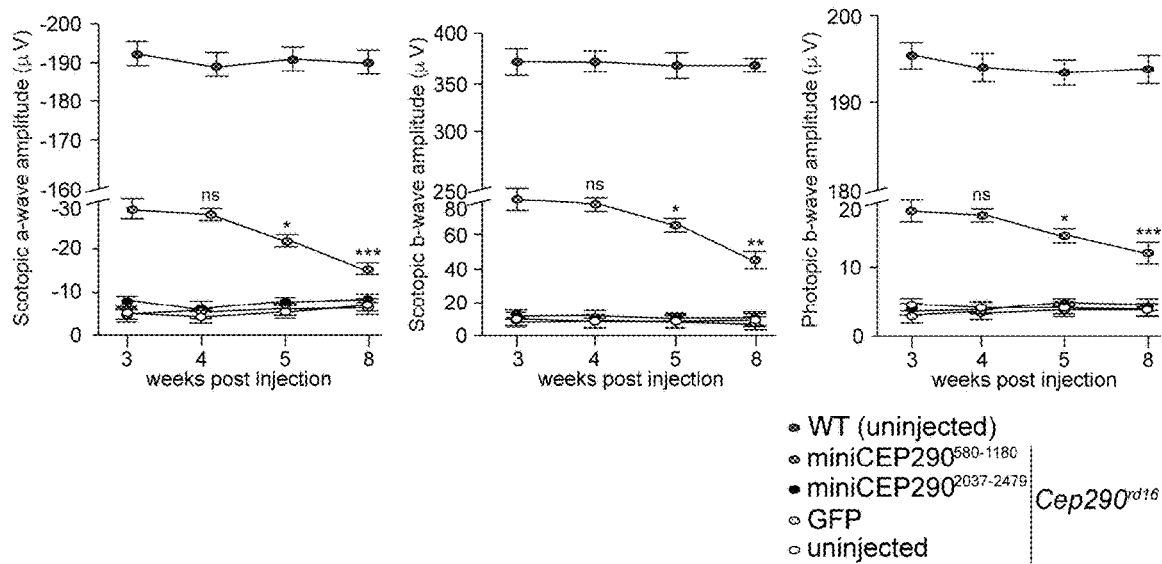

Whether further shortening vCEP290$^{580-1695}$ will result in a cilia length rescue was then investigated. Plasmids encoding GFP-fused vCEP290$^{580-1180}$ and vCEP290$^{1181-1695}$ were produced and their expression, localization and potential to rescue cilia length in Cep290$^{rd16}$ fibroblasts were tested. Both variants exhibited optimal expression as determined by immunoblotting using anti-GFP antibody, and localization to cilia (FIGS. 6A-6B). Data for vCEP290$^{1181-1695}$ indicate predominant localization to the base of cilia and diffuse staining around the basal body. Cilia rescue assay data indicate that expression of either variant results in a significant increase in the cilia length of Cep290$^{rd16}$ fibroblasts (FIG. 6C and FIG. 10).

Potential of vCEP290 In Vivo

Functionality of vCEP290 constructs in vivo was investigated, vCEP290$^{580-1180}$, vCEP290$^{1181-1695}$ and vCEP290$^{2037-2179}$ (as negative control since it did not rescue the cilia length defect in the fibroblasts) were cloned into an AAV2 vector having a CBA promoter and containing an IRES (internal ribosome entry site) between the gene of interest (e.g., vCEP290) and GFP. This permits both CEP290 and GFP to be translated from a single bicistronic mRNA and assists in identifying transduced photoreceptors using an anti-GFP antibody. Each rAAV (e.g., AAV2/8-CBA-vCep290$^{580-1180}$-IRES-GFP, AAV2/8-CBA-vCep290$^{1181-1695}$-IRES-GFP, AAV2/8-CBA-vCep290$^{2037-2472}$-IRES-GFP, and negative control AAV2/8-CBA-GFP) were injected at 8×10$^9$ vg/eye in 1 μl volume into the subretinal space of Cep290$^{rd16}$ pups at P0 stage. The mice were assessed for PR function and retinal morphology up to 5 weeks after injection. Analysis of PR function by electroretinography (ERG) at 3 weeks post-injection revealed improvement (25-30%) in both scotopic (rod PR-mediated) and photopic (cone PR-mediated) (FIGS. 7A-7B, and FIGS. 11-12) responses of the miniCEP290$^{580-1180}$-injected mice. No improvement was detected using mini-CEP290$^{2037-2479}$ or GFP. Further analysis revealed that the improvement in the ERG was stable up to 4 weeks post injection.

Figure 8A:
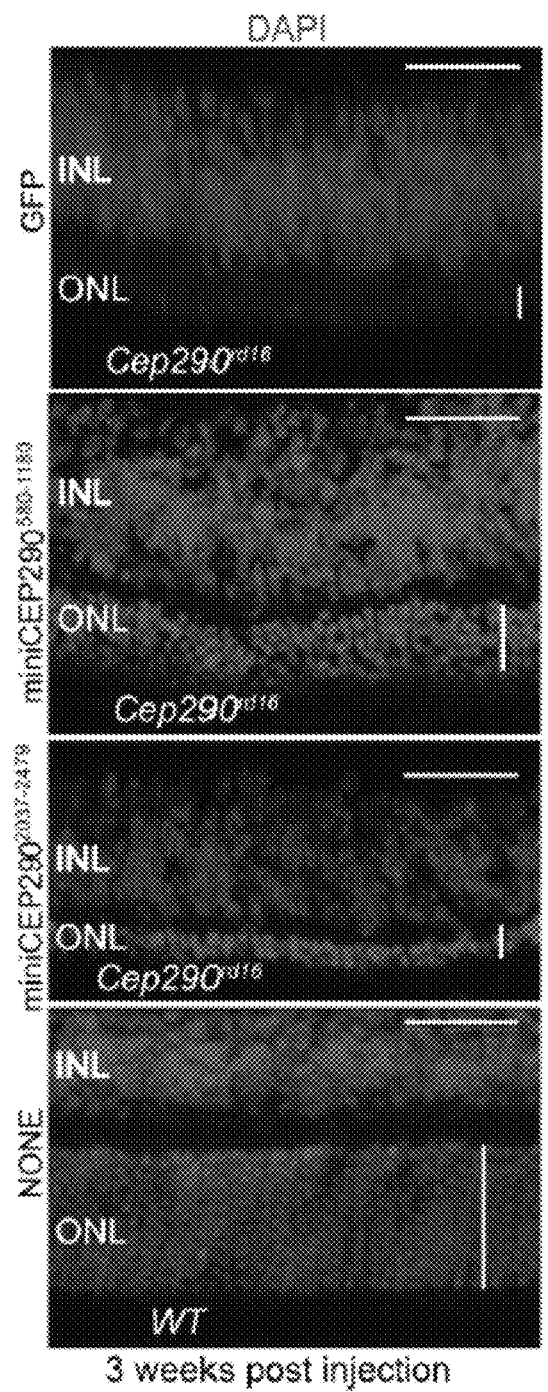
FIGS. 8A-8D show in vivo morphological rescue of photoreceptors by miniCEP290$^{580-1180}$
Figure 8B:
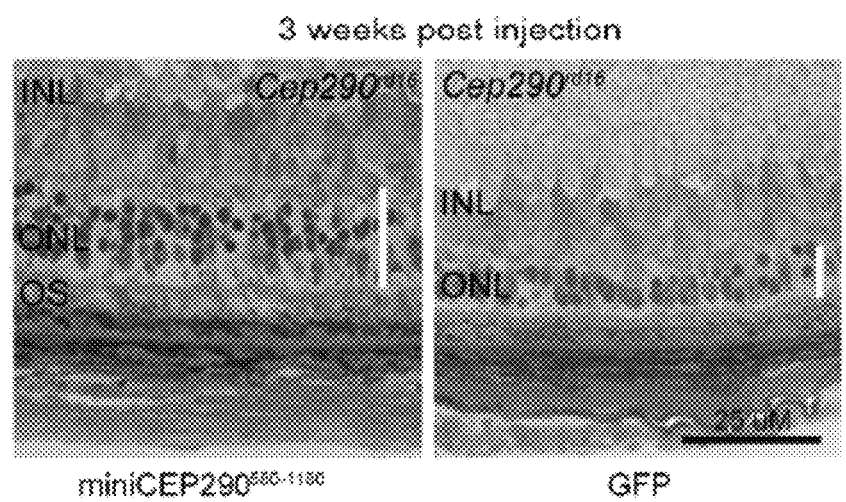

The number of layers of the ONL, which correlates with PR survival, were also counted in retinal cryosections: ~6-7 layers were observed in Cep290$^{rd16}$ retinas injected with miniCep290$^{580-1180}$; 4-5 layers were observed in Cep290$^{rd16}$ retinas injected with miniCep290$^{1181-1695}$ and; 2-3 layers were observed in retinas injected with miniCep290$^{2037-2472}$ or GFP (equivalent to uninjected Cep290$^{rd16}$ at 3 weeks of age), as shown in FIG. 8A. It was also observed that ultrathin sections of the CEP290$^{rd16}$ retinas injected with miniCEP290$^{580-1180}$ exhibited significant preservation of the outer nuclear layer (ONL) (FIG. 8B).

Figure 8C:
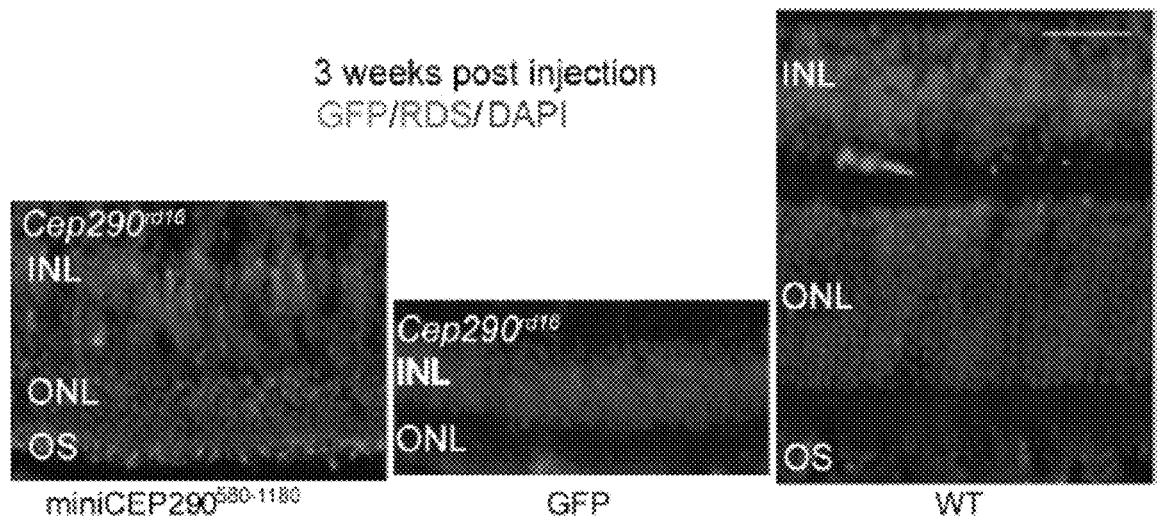
Figure 8D:
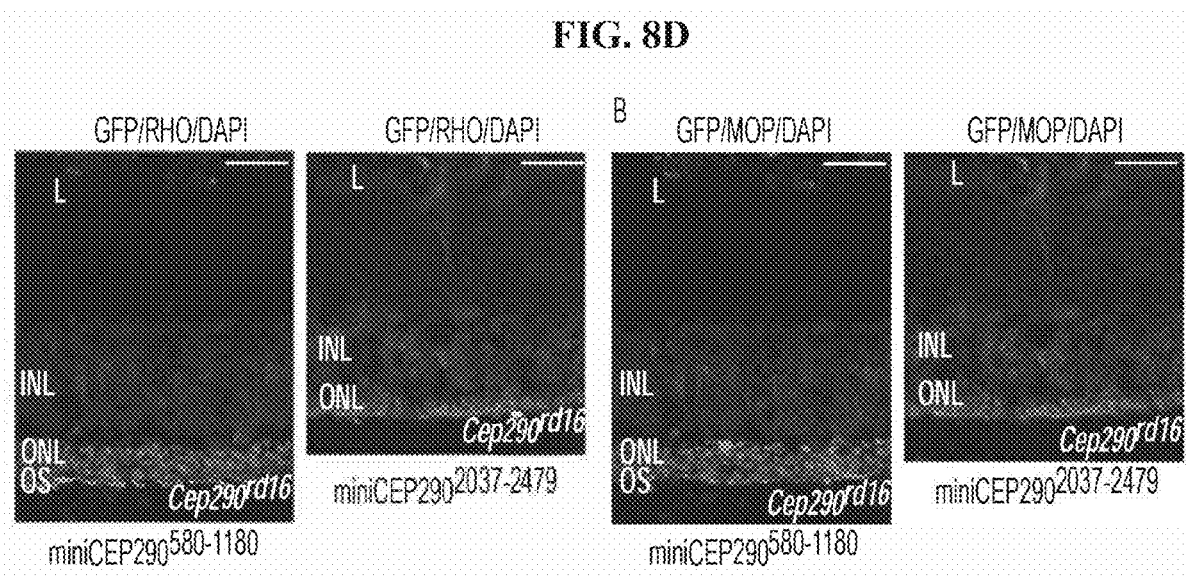

The structural preservation of photoreceptor (PR) outer segment in the miniCEP290$^{580-1180}$-injected mice was examined by staining with peripherin-RDS (retinal degeneration slow. PR outer segment marker 45). RDS is a structural protein that specifically localizes to the outer segment (OS) discs and maintains the OS structure. The miniCEP290$^{580-1180}$-injected Cep290rd16 mice exhibited improved RDS localization to the outer segment as compared to undetectable RDS expression in the GFP-injected mice (FIG. 8C). The expression of rhodopsin and cone opsins, two of the key phototransduction proteins, was also examined. Undetectable opsin expression was detected in the miniCEP290$^{2037-2479}$-injected retinas. However, the miniCEP290$^{580-1180}$-injected retinas revealed detectable expression of rhodopsin and cone opsins in the outer segments (FIG. 8D). Some staining of cone opsins in the inner segment and outer nuclear layer was also observed. Overall, the data indicate that the expression of miniCEP290$^{580-1180}$ can improve the function, morphology and opsin trafficking of CEP290$^{rd16}$ retinas.

Materials and Methods

Cell Culture, Transient Transfection and Immunostaining

MEFs derived from the WT and Cep290$^{rd16}$ mice were maintained in DMEM with 10% FBS. Transient transfection with GFP-CEP290-FL or GFP-miniCEP290s was performed using Lipofectamine 2000 (Thermo Fisher). The transfected cells were either harvested for immunoblotting or were serum-starved to induce cilia growth. The ciliated cells were then immunostained, imaged under Leica microscope (DM5500). Images were then processed for cilia length evaluation using Image J.

Constructs and AAV Production

For in vitro experiments, full-length or miniCEP290-expressing cDNAs were cloned into pEGFP-C1 plasmid expressing GFP-tagged proteins under the control of CMV promoter. For AAV production, the miniCEP290-encoding cDNAs were cloned into a pAAV2 vector plasmid between a CMVenhancer/CBA (chicken 1-actin) promoter upstream of IRES (internal ribosome entry site) GFP and β-globin intron. This expression cassette was flanked with AAV2 inverted terminal repeats (ITRs). The recombinant AAV2 genomes were packaged with AAV8 capsid by HEK293-triple transfection method and purified by CsCl gradient centrifugation method.

Subretinal Injection

Wild type C57BL6/J mice were obtained from a commercial source. The Cep290$^{rd16}$ mice were also obtained. The Cep290$^{rd16}$ mouse pups (P0/P1) were subretinally injected unilaterally with 8×10$^9$ vg/μl (total volume 1 μl) of the virus.

ERG and Immunofluorescence Microscopy of the Retina

Scotopic and photopic ERGS were performed. For scotopic response, mice were dark adapted overnight and all procedures were performed under dim red light. Light adapted (photopic) ERGs were recorded after light adaptation with a background illumination of 30 cd/m$^2$ (white 6500 K) for 8 min.

Immunofluorescence microscopy was performed by staining retinal cryosection sections with primary antibodies: rhodopsin, M-opsin, and peripherin-RDS. ARL13B, GFP (Abram), and γ-tubulin. After washing with PBS (phosphate buffered saline), Alexa-488 or Alexa-546-conjugated secondary antibodies were added and the sections were further incubated for 1 h. After washing, nuclei were stained with DAPI and cells were imaged using a Leica microscope (DM5500).

SEQUENCES
>Human CEP290 amino acid sequence; NCBI Reference Sequence: NP_079390.3
(SEQ ID NO: 1)

MPPNINWKEIMKVDPDDLPRQEELADNLLISLSKVEVNELKSEKQENVIHLFRITQSLMK

MKAQEVELALEEVEKAGEEQAKFENQLKTKVMKLENELEMAQQSAGGRDTRFLRNEI

CQLEKQLEQKDRELEDMEKELEKEKKVNEQLALRNEEAENENSKLRRENKRLKKKNE

QLCQDIIDYQKQIDSQKETLLSRRGEDSDYRSQLSKKNYELIQYLDEIQTLTEANEKIEVQ

NQEMRKNLEESVQEMEKMTDEYNRMKAIVHQTDNVIDQLKKENDHYQLQVQELTDL

LKSKNEEDDPIMVAVNAKVEEWKLILSSKDDEHIEYQQMLHNLREKLKNAQLDADKSN

VMALQQGIQERDSQIKMLTEQVEQYTKEMEKNTCIIEDLKNELQRNKGASTLSQQTHM

KIQSTLDILKEKTKEAERTAELAEADAREKDKELVEALKRLKDYESGVYGLEDAVVEIK

NCKNQIKIRDREIEILTKEINKLELKISDFLDENEALRERVGLEPKTMIDLTEFRNSKHLK

QQQYRAENQILLKEIESLEEERLDLKKKIRQMAQERGKRSATSGLTTEDLNLTENISQGD

RISERKLDLLSLKNMSEAQSKNEFLSRELIEKERDLERSRTVIAKFQNKLKELVEENKQL

EEGMKEILQAIKEMQKDPDVKGGETSLIIPSLERLVNAIESKNAEGIFDASLHLKAQVDQ

LTGRNEELRQELRESRKEAINYSQQLAKANLKIDHLEKETSLLRQSEGSNVVFKGIDLPD

GIAPSSASIINSQNEYLIHLLQELENKEKKLKNLEDSLEDYNRKFAVIRHQQSLLYKEYLS

EKETWKTESKTIKEEKRKLEDQVQQDAIKVKEYNNLLNALQMDSDEMKKILAENSRKI

TVLQVNEKSLIRQYTTLVELERQLRKENEKQKNELLSMEAEVCEKIGCLQRFKEMAIFKI

AALQKVVDNSVSLSELELANKQYNELTAKYRDILQKDNMLVQRTSNLEHLECENISLK

EQVESINKELEITKEKLHTIEQAWEQETKLGNESSMDKAKKSITNSDIVSISKKITMLEMK

-continued

ELNERQRAEHCQKMYEHLRTSLKQMEERNFELETKFAELTKINLDAQKVEQMLRDELA

DSVSKAVSDADRQRILELEKNEMELKVEVSKLREISDIARRQVEILNAQQQSRDKEVESL

RMQLLDYQAQSDEKSLIAKLHQHNVSLQLSEATALGKLESITSKLQKMEAYNLRLEQK

LDEKEQALYYARLEGRNRAKHLRQTIQSLRRQFSGALPLAQQEKFSKTMIQLQNDKLKI

MQEMKNSQQEHRNMENKTLEMELKLKGLEELISTLKDTKGAQKVINWHMKIEELRLQ

ELKLNRELVKDKEEIKYLNNIISEYERTISSLEEEIVQQNKFHEERQMAWDQREVDLERQ

LDIFDRQQNEILNAAQKFEEATGSIPDPSLPLPNQLEIALRKIKENIRIILETRATCKSLEEK

LKEKESALRLAEQNILSRDKVINELRLRLPATAEREKLIAELGRKEMEPKSHHTLKIAHQ

TIANMQARLNQKEEVLKKYQRLLEKAREEQREIVKKHEEDLHILHHRLELQADSSLNKF

KQTAWDLMKQSPTPVPTNKHFIRLAEMEQTVAEQDDSLSSLLVKLKKVSQDLERQREI

TELKVKEFENIKLQLQENHEDEVKKVKAEVEDLKYLLDQSQKESQCLKSELQAQKEAN

SRAPTTTMRNLVERLKSQLALKEKQQKALSRALLELRAEMTAAAEERIISATSQKEAHL

NVQQIVDRHTRELKTQVEDLNENLLKLKEALKTSKNRENSLTDNLNDLNNELQKKQKA

YNKILREKEEIDQENDELKRQIKRLTSGLQGKPLTDNKQSLIEELQRKVKKLENQLEGK

VEEVDLKPMKEKNAKEELIRWEEGKKWQAKIEGIRNKLKEKEGEVFTLTKQLNTLKDL

FAKADKEKLTLQRKLKTTGMTVDQVLGIRALESEKELEELKKRNLDLENDILYMRAHQ

ALPRDSVVEDLHLQNRYLQEKLHALEKQFSKDTYSKPSISGIESDDHCQREQELQKENL

KLSSENIELKFQLEQANKDLPRLKNQVRDLKEMCEFLKKEKAEVQRKLGHVRGSGRSG

KTIPELEKTIGLMKKVVEKVQRENEQLKKASGILTSEKMANIEQENEKLKAELEKLKAH

LGHQLSMHYESKTKGTEKIIAENERLRKELKKETDAAEKLRIAKNNLEILNEKMTVQLE

ETGKRLQFAESRGPQLEGADSKSWKSIVVTRMYETKLKELETDIAKKNQSITDLKQLVK

EATEREQKVNKYNEDLEQQIKILKHVPEGAETEQGLKRELQVLRLANHQLDKEKAELIH

QIEANKDQSGAESTIPDADQLKEKIKDLETQLKMSDLEKQHLKEEIKKLKKELENFDPSF

FEEIEDLKYNYKEEVKKNILLEEKVKKLSEQLGVELTSPVAASEEFEDEEESPVNFPIY

>CEP290 Fragment (aa580-1695) amino acid sequence
(SEQ ID NO: 2)
TENISQGDRISERKLDLLSLKNMSEAQSKNEFLSRELIEKERDLERSRTVIAKFQNKLKEL

VEENKQLEEGMKEILQAIKEMQKDPDVKGGETSLIIPSLERLVNAIESKNAEGIFDASLH

LKAQVDQLTGRNEELRQELRESRKEAINYSQQLAKANLKIDHLEKETSLLRQSEGSNVV

FKGIDLPDGIAPSSASIINSQNEYLIHLLQELENKEKKLKNLEDSLEDYNRKFAVIRHQQS

LLYKEYLSEKETWKTESKTIKEEKRKLEDQVQQDAIKVKEYNNLLNALQMDSDEMKKI

LAENSRKITVLQVNEKSLIRQYTTL VELERQLRKENEKQKNELLSMEAEVCEKIGCLQR

FKEMAIFKIAALQKVVDNSVSLSELELANKQYNELTAKYRDILQKDNMLVQRTSNLEH

LECENISLKEQVESINKELEITKEKLHTIEQAWEQETKLGNESSMDKAKKSITNSDIVSIS

KKITMLEMKELNERQRAEHCQKMYEHLRTSLKQMEERNFELETKFAELTKINLDAQKV

EQMLRDELADSVSKAVSDADRQRILELEKNEMELKVEVSKLREISDIARRQVEILNAQQ

QSRDKEVESLRMQLLDYQAQSDEKSLIAKLHQHNVSLQLSEATALGKLESITSKLQKME

AYNLRLEQKLDEKEQALYYARLEGRNRAKHLRQTIQSLRRQFSGALPLAQQEKFSKTM

IQLQNDKLKIMQEMKNSQQEHRNMENKTLEMELKLKGLEELISTLKDTKGAQKVINW

HMKIEELRLQELKLNRELVKDKEEIKYLNNIISEYERTISSLEEEIVQQNKFHEERQMAW

DQREVDLERQLDIFDRQQNEILNAAQKFEEATGSIPDPSLPLPNQLEIALRKIKENIRIILET

RATCKSLEEKLKEKESALRLAEQNILSRDKVINELRLRLPATAEREKLIAELGRKEMEPK

SHHTLKIAHQTIANMQARLNQKEEVLKKYQRLLEKAREEQREIVKKHEEDLHILHHRLE

LQADSSLNKFKQTAWDLMKQSPTPVPTNKHFIRLAEMEQTVAEQDDSLSSLLVKLKKV

SQDLERQREITELKVKEFENIKLQLQENHEDEVKKVKAEVEDLKYLLD

> CEP290 Fragment (aa580-1180) amino acid sequence
(SEQ ID NO: 3)
TENISQGDRISERKLDLLSLKNMSEAQSKNEFLSRELIEKERDLERSRTVIAKFQNKLKEL

VEENKQLEEGMKEILQAIKEMQKDPDVKGGETSLIIPSLERLVNAIESKNAEGIFDASLH

LKAQVDQLTGRNEELRQELRESRKEAINYSQQLAKANLKIDHLEKETSLLRQSEGSNVV

FKGIDLPDGIAPSSASIINSQNEYLIHLLQELENKEKKLKNLEDSLEDYNRKFAVIRHQQS

LLYKEYLSEKETWKTESKTIKEEKRKLEDQVQQDAIKVKEYNNLLNALQMDSDEMKKI

LAENSRKITVLQVNEKSLIRQYTTL VELERQLRKENEKQKNELLSMEAEVCEKIGCLQR

FKEMAIFKIAALQKVVDNSVSLSELELANKQYNELTAKYRDILQKDNMLVQRTSNLEH

LECENISLKEQVESINKELEITKEKLHTIEQAWEQETKLGNESSMDKAKKSITNSDIVSIS

KKITMLEMKELNERQRAEHCQKMYEHLRTSLKQMEERNFELETKFAELTKINLDAQKV

EQMLRDELADSVSKAVSDADRQRILELEKNEMELKVEVSKLREISDIARRQVEILNAQQ

QSRDKEV

> CEP290 Fragment (aa1181-1695) amino acid sequence
(SEQ ID NO: 4)
ESLRMQLLDYQAQSDEKSLIAKLHQHNVSLQLSEATALGKLESITSKLQKMEAYNLRLE

QKLDEKEQALYYARLEGRNRAKHLRQTIQSLRRQFSGALPLAQQEKFSKTMIQLQNDK

LKIMQEMKNSQQEHRNMENKTLEMELKLKGLEELISTLKDTKGAQKVINWHMKIEELR

LQELKLNRELVKDKEEIKYLNNIISEYERTISSLEEEIVQQNKFHEERQMAWDQREVDLE

RQLDIFDRQQNEILNAAQKFEEATGSIPDPSLPLPNQLEIALRKIKENIRIILETRATCKSLE

EKLKEKESALRLAEQNILSRDKVINELRLRLPATAEREKLIAELGRKEMEPKSHHTLKIA

HQTIANMQARLNQKEEVLKKYQRLLEKAREEQREIVKKHEEDLHILHHRLELQADSSL

NKFKQTAWDLMKQSPTPVPTNKHFIRLAEMEQTVAEQDDSLSSLLVKLKKVSQDLERQ

REITELKVKEFENIKLQLQENHEDEVKKVKAEVEDLKYLLD

>CEP290 Fragment (aa580-1695) nucleic acid sequence
(SEQ ID NO: 5)
ACTGAAAACATTTCTCAAGGAGATAGAATAAGTGAAAGAAAATTGGATTTATTGAG

CCTCAAAAATATGAGTGAAGCACAATCAAAGAATGAATTTCTTTCAAGAGAACTAA

TTGAAAAAGAAAGAGATTTAGAAAGGAGTAGGACAGTGATAGCCAAATTTCAGAA

TAAATTAAAAGAATTAGTTGAAGAAAATAAGCAACTTGAAGAAGGTATGAAAGAA

ATATTGCAAGCAATTAAGGAAATGCAGAAAGATCCTGATGTTAAAGGAGGAGAAA

CATCTCTAATTATCCCTAGCCTTGAAAGACTAGTTAATGCTATAGAATCAAAGAATG

CAGAAGGAATCTTTGATGCGAGTCTGCATTTGAAAGCCCAAGTTGATCAGCTTACC

GGAAGAAATGAAGAATTAAGACAGGAGCTCAGGGAATCTCGGAAAGAGGCTATAA

ATTATTCACAGCAGTTGGCAAAAGCTAATTTAAAGATAGACCATCTTGAAAAAGAA

ACTAGTCTTTTACGACAATCAGAAGGATCGAATGTTGTTTTTAAAGGAATTGACTTA

CCTGATGGGATAGCACCATCTAGTGCCAGTATCATTAATTCTCAGAATGAATATTTA

ATACATTTGTTACAGGAACTAGAAAATAAAGAAAAAAAGTTAAAGAATTTAGAAG

ATTCTCTTGAAGATTACAACAGAAAATTTGCTGTAATTCGTCATCAACAAAGTTTGT

TGTATAAAGAATACCTAAGTGAAAAGGAGACCTGGAAAACAGAATCTAAAACAAT

-continued

```
AAAAGAGGAAAAGAGAAAACTTGAGGATCAAGTCCAACAAGATGCTATAAAAGTA
AAAGAATATAATAATTTGCTCAATGCTCTTCAGATGGATTCGGATGAAATGAAAAA
AATACTTGCAGAAAATAGTAGGAAAATTACTGTTTTGCAAGTGAATGAAAAATCAC
TTATAAGGCAATATACAACCTTAGTAGAATTGGAGCGACAACTTAGAAAAGAAAAT
GAGAAGCAAAAGAATGAATTGTTGTCAATGGAGGCTGAAGTTTGTGAAAAAATTGG
GTGTTTGCAAAGATTTAAGGAAATGGCCATTTTCAAGATTGCAGCTCTCCAAAAAGT
TGTAGATAATAGTGTTTCTTTGTCTGAACTAGAACTGGCTAATAAACAGTACAATGA
ACTGACTGCTAAGTACAGGGACATCTTGCAAAAGATAATATGCTTGTTCAAAGAA
CAAGTAACTTGGAACACCTGGAGTGTGAAAACATCTCCTTAAAAGAACAAGTGGAG
TCTATAAATAAAGAACTGGAGATTACCAAGGAAAAACTTCACACTATTGAACAAGC
CTGGGAACAGGAAACTAAATTAGGTAATGAATCTAGCATGGATAAGGCAAAGAAA
TCAATAACCAACAGTGACATTGTTTCCATTTCAAAAAAAATAACTATGCTGGAAAT
GAAGGAATTAAATGAAAGGCAGCGGGCTGAACATTGTCAAAAAATGTATGAACAC
TTACGGACTTCGTTAAAGCAAATGGAGGAACGTAATTTTGAATTGGAAACCAAATT
TGCTGAGCTTACCAAAATCAATTTGGATGCACAGAAGGTGGAACAGATGTTAAGAG
ATGAATTAGCTGATAGTGTGAGCAAGGCAGTAAGTGATGCTGATAGGCAACGGATT
CTAGAATTAGAGAAGAATGAAATGGAACTAAAAGTTGAAGTGTCAAAACTGAGAG
AGATTTCTGATATTGCCAGAAGACAAGTTGAAATTTTGAATGCACAACAACAATCT
AGGGACAAGGAAGTAACTGAAAACATTTCTCAAGGAGATAGAATAAGTGAAAGAA
AATTGGATTTATTGAGCCTCAAAAATATGAGTGAAGCACAATCAAAGAATGAATTT
CTTTCAAGAGAACTAATTGAAAAAGAAAGAGATTTAGAAAGGAGTAGGACAGTGA
TAGCCAAATTTCAGAATAAATTAAAAGAATTAGTTGAAGAAAATAAGCAACTTGAA
GAAGGTATGAAAGAAATATTGCAAGCAATTAAGGAAATGCAGAAAGATCCTGATG
TTAAAGGAGGAGAAACATCTCTAATTATCCCTAGCCTTGAAAGACTAGTTAATGCT
ATAGAATCAAAGAATGCAGAAGGAATCTTTGATGCGAGTCTGCATTTGAAAGCCCA
AGTTGATCAGCTTACCGGAAGAAATGAAGAATTAAGACAGGAGCTCAGGGAATCTC
GGAAAGAGGCTATAAATTATTCACAGCAGTTGGCAAAAGCTAATTTAAAGATAGAC
CATCTTGAAAAAGAAACTAGTCTTTTACGACAATCAGAAGGATCGAATGTTGTTTTT
AAAGGAATTGACTTACCTGATGGGATAGCACCATCTAGTGCCAGTATCATTAATTCT
CAGAATGAATATTTAATACATTTGTTACAGGAACTAGAAAATAAAGAAAAAAAGTT
AAAGAATTTAGAAGATTCTCTTGAAGATTACAACAGAAAATTTGCTGTAATTCGTCA
TCAACAAAGTTTGTTGTATAAAGAATACCTAAGTGAAAAGGAGACCTGGAAAACAG
AATCTAAAACAATAAAAGAGGAAAAGAGAAAACTTGAGGATCAAGTCCAACAAGA
TGCTATAAAAGTAAAAGAATATAATAATTTGCTCAATGCTCTTCAGATGGATTCGGA
TGAAATGAAAAAAATACTTGCAGAAAATAGTAGGAAAATTACTGTTTTGCAAGTGA
ATGAAAAATCACTTATAAGGCAATATACAACCTTAGTAGAATTGGAGCGACAACTT
AGAAAAGAAAATGAGAAGCAAAAGAATGAATTGTTGTCAATGGAGGCTGAAGTTT
GTGAAAAAATTGGGTGTTTGCAAAGATTTAAGGAAATGGCCATTTTCAAGATTGCA
GCTCTCCAAAAAGTTGTAGATAATAGTGTTTCTTTGTCTGAACTAGAACTGGCTAAT
AAACAGTACAATGAACTGACTGCTAAGTACAGGGACATCTTGCAAAAGATAATAT
```

-continued

```
GCTTGTTCAAAGAACAAGTAACTTGGAACACCTGGAGTGTGAAAACATCTCCTTAA
AAGAACAAGTGGAGTCTATAAATAAAGAACTGGAGATTACCAAGGAAAAACTTCA
CACTATTGAACAAGCCTGGGAACAGGAAACTAAATTAGGTAATGAATCTAGCATGG
ATAAGGCAAAGAAATCAATAACCAACAGTGACATTGTTTCCATTTCAAAAAAATA
ACTATGCTGGAAATGAAGGAATTAAATGAAAGGCAGCGGGCTGAACATTGTCAAA
AAATGTATGAACACTTACGGACTTCGTTAAAGCAAATGGAGGAACGTAATTTTGAA
TTGGAAACCAAATTTGCTGAGCTTACCAAAATCAATTTGGATGCACAGAAGGTGGA
ACAGATGTTAAGAGATGAATTAGCTGATAGTGTGAGCAAGGCAGTAAGTGATGCTG
ATAGGCAACGGATTCTAGAATTAGAGAAGAATGAAATGGAACTAAAAGTTGAAGT
GTCAAAACTGAGAGAGATTTCTGATATTGCCAGAAGACAAGTTGAAATTTTGAATG
CACAACAACAATCTAGGGACAAGGAAGTA
```

> CEP290 Fragment (aa580-1180) nucleic acid sequence (SEQ ID NO: 6)

```
ACTGAAAACATTTCTCAAGGAGATAGAATAAGTGAAAGAAAATTGGATTTATTGAG
CCTCAAAAATATGAGTGAAGCACAATCAAAGAATGAATTTCTTTCAAGAGAACTAA
TTGAAAAAGAAAGAGATTTAGAAAGGAGTAGGACAGTGATAGCCAAATTTCAGAA
TAAATTAAAAGAATTAGTTGAAGAAAATAAGCAACTTGAAGAAGGTATGAAAGAA
ATATTGCAAGCAATTAAGGAAATGCAGAAAGATCCTGATGTTAAAGGAGGAGAAA
CATCTCTAATTATCCCTAGCCTTGAAAGACTAGTTAATGCTATAGAATCAAAGAATG
CAGAAGGAATCTTTGATGCGAGTCTGCATTTGAAAGCCCAAGTTGATCAGCTTACC
GGAAGAAATGAAGAATTAAGACAGGAGCTCAGGGAATCTCGGAAAGAGGCTATAA
ATTATTCACAGCAGTTGGCAAAAGCTAATTTAAAGATAGACCATCTTGAAAAAGAA
ACTAGTCTTTTACGACAATCAGAAGGATCGAATGTTGTTTTTAAAGGAATTGACTTA
CCTGATGGGATAGCACCATCTAGTGCCAGTATCATTAATTCTCAGAATGAATATTTA
ATACATTTGTTACAGGAACTAGAAAATAAAGAAAAAAAGTTAAAGAATTTAGAAG
ATTCTCTTGAAGATTACAACAGAAAATTTGCTGTAATTCGTCATCAACAAAGTTTGT
TGTATAAAGAATACCTAAGTGAAAAGGAGACCTGGAAAACAGAATCTAAAACAAT
AAAAGAGGAAAAGAGAAAACTTGAGGATCAAGTCCAACAAGATGCTATAAAAGTA
AAAGAATATAATAATTTGCTCAATGCTCTTCAGATGGATTCGGATGAAATGAAAAA
AATACTTGCAGAAAATAGTAGGAAAATTACTGTTTTGCAAGTGAATGAAAAATCAC
TTATAAGGCAATATACAACCTTAGTAGAATTGGAGCGACAACTTAGAAAAGAAAT
GAGAAGCAAAAGAATGAATTGTTGTCAATGGAGGCTGAAGTTTGTGAAAAAATTGG
GTGTTTGCAAAGATTTAAGGAAATGGCCATTTTCAAGATTGCAGCTCTCCAAAAAGT
TGTAGATAATAGTGTTTCTTTGTCTGAACTAGAACTGGCTAATAAACAGTACAATGA
ACTGACTGCTAAGTACAGGGACATCTTGCAAAAAGATAATATGCTTGTTCAAAGAA
CAAGTAACTTGGAACACCTGGAGTGTGAAAACATCTCCTTAAAAGAACAAGTGGAG
TCTATAAATAAAGAACTGGAGATTACCAAGGAAAAACTTCACACTATTGAACAAGC
CTGGGAACAGGAAACTAAATTAGGTAATGAATCTAGCATGGATAAGGCAAAGAAA
TCAATAACCAACAGTGACATTGTTTCCATTTCAAAAAAATAACTATGCTGGAAAT
GAAGGAATTAAATGAAAGGCAGCGGGCTGAACATTGTCAAAAAATGTATGAACAC
TTACGGACTTCGTTAAAGCAAATGGAGGAACGTAATTTTGAATTGGAAACCAAATT
TGCTGAGCTTACCAAAATCAATTTGGATGCACAGAAGGTGGAACAGATGTTAAGAG
```

-continued

ATGAATTAGCTGATAGTGTGAGCAAGGCAGTAAGTGATGCTGATAGGCAACGGATT

CTAGAATTAGAGAAGAATGAAATGGAACTAAAAGTTGAAGTGTCAAAACTGAGAG

AGATTTCTGATATTGCCAGAAGACAAGTTGAAATTTTGAATGCACAACAACAATCT

AGGGACAAGGAAGTA

> CEP290 Fragment (aa1181-1695) nucleic acid sequence (SEQ ID NO: 7)

GAGTCCCTCAGAATGCAACTGCTAGACTATCAGGCACAGTCTGATGAAAAGTCGCT

CATTGCCAAGTTGCACCAACATAATGTCTCTCTTCAACTGAGTGAGGCTACTGCTCT

TGGTAAGTTGGAGTCAATTACATCTAAACTGCAGAAGATGGAGGCCTACAACTTGC

GCTTAGAGCAGAAACTTGATGAAAAAGAACAGGCTCTCTATTATGCTCGTTTGGAG

GGAAGAAACAGAGCAAAACATCTGCGCCAAACAATTCAGTCTCTACGACGACAGTT

TAGTGGAGCTTTACCCTTGGCACAACAGGAAAAGTTCTCCAAAACAATGATTCAAC

TACAAAATGACAAACTTAAGATAATGCAAGAAATGAAAAATTCTCAACAAGAACAT

AGAAATATGGAGAACAAAACATTGGAGATGGAATTAAAATTAAAGGGCCTGGAAG

AGTTAATAAGCACTTTAAAGGATACCAAAGGAGCCCAAAAGGTAATCAACTGGCAT

ATGAAAATAGAAGAACTTCGTCTTCAAGAACTTAAACTAAATCGGGAATTAGTCAA

GGATAAAGAAGAAATAAAATATTTGAATAACATAATTTCTGAATATGAACGTACAA

TCAGCAGTCTTGAAGAAGAAATTGTGCAACAGAACAAGTTTCATGAAGAAAGACAA

ATGGCCTGGGATCAAAGAGAAGTTGACCTGGAACGCCAACTAGACATTTTTGACCG

TCAGCAAAATGAAATACTAAATGCGGCACAAAAGTTTGAAGAAGCTACAGGATCA

ATCCCTGACCCTAGTTTGCCCCTTCCAAATCAACTTGAGATCGCTCTAAGGAAAATT

AAGGAGAACATTCGAATAATTCTAGAAACACGGGCAACTTGCAAATCACTAGAAGA

GAAACTAAAAGAGAAAGAATCTGCTTTAAGGTTAGCAGAACAAAATATACTGTCAA

GAGACAAAGTAATCAATGAACTGAGGCTTCGATTGCCTGCCACTGCAGAAAGAGAA

AAGCTCATAGCTGAGCTAGGCAGAAAAGAGATGGAACCAAAATCTCACCACACATT

GAAAATTGCTCATCAAACCATTGCAAACATGCAAGCAAGGTTAAATCAAAAGAAG

AAGTATTAAAGAAGTATCAACGTCTTCTAGAAAAAGCCAGAGAGGAGCAAAGAGA

AATTGTGAAGAAACATGAGGAAGACCTTCATATTCTTCATCACAGATTAGAACTAC

AGGCTGATAGTTCACTAAATAAATTCAAACAAACGGCTTGGGATTTAATGAAACAG

TCTCCCACTCCAGTTCCTACCAACAAGCATTTTATTCGTCTGGCTGAGATGGAACAG

ACAGTAGCAGAACAAGATGACTCTCTTTCCTCACTCTTGGTCAAACTAAAGAAAGT

ATCACAAGATTTGGAGAGACAAAGAGAAATCACTGAATTAAAAGTAAAGAATTT

GAAAATATCAAATTACAGCTTCAAGAAACCATGAAGATGAAGTGAAAAAAGTAA

AAGCGGAAGTAGAGGATTTAAAGTATCTTCTGGAC

>CEP290 nucleic acid sequence; NCBI Reference Sequence: NM_025114.3

(SEQ ID NO: 8)

ATTTGAAGTCCTCGTTCCACGCCTTCTCATCATCCTGAACACCGAGCTCTGGGACTC

CGGCGGAGAATCTAAACGTAAAGCATCACCCACGGTCGTGAACTGTAGGCTCTCCT

GGCATCCGGGATCTTATTCTGGCCTTGGCGGAGTTGGGGATGGTGTCGCCTAGCAGC

CGCTGCCGCTTTGGCTTGCTCGGGACCATTTGGCTGGACCCAGAGTCCGCGTGGAAC

CGCGATAGGGATCTGTCAGGGCCCGCGGCCGGGTCCAGCTTGGTGGTTGCGGTAGT

GAGAGGCCTCCGCTGGTTGCCAGGCTTGGTCTAGAGGTGGAGCACAGTGAAAGAAT

-continued

```
TCAAGATGCCACCTAATATAAACTGGAAAGAAATAATGAAAGTTGACCCAGATGAC
CTGCCCCGTCAAGAAGAACTGGCAGATAATTTATTGATTTCCTTATCCAAGGTGGAA
GTAAATGAGCTAAAAAGTGAAAAGCAAGAAAATGTGATACACCTTTTCAGAATTAC
TCAGTCACTAATGAAGATGAAAGCTCAAGAAGTGGAGCTGGCTTTGGAAGAAGTAG
AAAAAGCTGGAGAAGAACAAGCAAAATTTGAAAATCAATTAAAAACTAAAGTAAT
GAAACTGGAAAATGAACTGGAGATGGCTCAGCAGTCTGCAGGTGGACGAGATACTC
GGTTTTTACGTAATGAAATTTGCCAACTTGAAAAACAATTAGAACAAAAAGATAGA
GAATTGGAGGACATGGAAAAGGAGTTGGAGAAAGAGAAGAAAGTTAATGAGCAAT
TGGCTCTTCGAAATGAGGAGGCAGAAAATGAAAACAGCAAATTAAGAAGAGAGAA
CAAACGTCTAAAGAAAAAGAATGAACAACTTTGTCAGGATATTATTGACTACCAGA
AACAAATAGATTCACAGAAAGAAACACTTTTATCAAGAAGAGGGGAAGACAGTGA
CTACCGATCACAGTTGTCTAAAAAAAACTATGAGCTTATCCAATATCTTGATGAAAT
TCAGACTTTAACAGAAGCTAATGAGAAAATTGAAGTTCAGAATCAAGAAATGAGAA
AAAATTTAGAAGAGTCTGTACAGGAAATGGAGAAGATGACTGATGAATATAATAG
AATGAAAGCTATTGTGCATCAGACAGATAATGTAATAGATCAGTTAAAAAAAGAAA
ACGATCATTATCAACTTCAAGTGCAGGAGCTTACAGATCTTCTGAAATCAAAAAAT
GAAGAAGATGATCCAATTATGGTAGCTGTCAATGCAAAAGTAGAAGAATGGAAGCT
AATTTTGTCTTCTAAAGATGATGAAATTATTGAGTATCAGCAAATGTTACATAACCT
AAGGGAGAAACTTAAGAATGCTCAGCTTGATGCTGATAAAAGTAATGTTATGGCTC
TACAGCAGGGTATACAGGAACGAGACAGTCAAATTAAGATGCTCACCGAACAAGT
AGAACAATATACAAAAGAAATGGAAAAGAATACTTGTATTATTGAAGATTTGAAAA
ATGAGCTCCAAAGAAACAAAGGTGCTTCAACCCTTTCTCAACAGACTCATATGAAA
ATTCAGTCAACGTTAGACATTTTAAAAGAGAAAACTAAAGAGGCTGAGAGAACAGC
TGAACTGGCTGAGGCTGATGCTAGGGAAAAGGATAAAGAATTAGTTGAGGCTCTGA
AGAGGTTAAAAGATTATGAATCGGGAGTATATGGTTTAGAAGATGCTGTCGTTGAA
ATAAAGAATTGTAAAAACCAAATTAAAATAAGAGATCGAGAGATTGAAATATTAAC
AAAGGAAATCAATAAACTTGAATTGAAGATCAGTGATTTCCTTGATGAAAATGAGG
CACTTAGAGAGCGTGTGGGCCTTGAACCAAAGACAATGATTGATTTAACTGAATTT
AGAAATAGCAAACACTTAAAACAGCAGCAGTACAGAGCTGAAAACCAGATTCTTTT
GAAAGAGATTGAAAGTCTAGAGGAAGAACGACTTGATCTGAAAAAAAAAATTCGT
CAAATGGCTCAAGAAGAGGAAAAAGAAGTGCAACTTCAGGATTAACCACTGAGG
ACCTGAACCTAACTGAAAACATTTCTCAAGGAGATAGAATAAGTGAAAGAAAATTG
GATTTATTGAGCCTCAAAAATATGAGTGAAGCACAATCAAAGAATGAATTTCTTTC
AAGAGAACTAATTGAAAAGAAAGAGATTTAGAAAGGAGTAGGACAGTGATAGCC
AAATTTCAGAATAAATTAAAAGAATTAGTTGAAGAAATAAGCAACTTGAAGAAG
GTATGAAAGAAATATTGCAAGCAATTAAGGAAATGCAGAAAGATCCTGATGTTAAA
GGAGGAGAAACATCTCTAATTATCCCTAGCCTTGAAAGACTAGTTAATGCTATAGA
ATCAAAGAATGCAGAAGGAATCTTTGATGCGAGTCTGCATTTGAAAGCCCAAGTTG
ATCAGCTTACCGGAAGAAATGAAGAATTAAGACAGGAGCTCAGGGAATCTCGGAA
AGAGGCTATAAATTATTCACAGCAGTTGGCAAAAGCTAATTTAAAGATAGACCATC
TTGAAAAAGAAACTAGTCTTTTACGACAATCAGAAGGATCGAATGTTGTTTTTAAA
```

-continued

```
GGAATTGACTTACCTGATGGGATAGCACCATCTAGTGCCAGTATCATTAATTCTCAG

AATGAATATTTAATACATTTGTTACAGGAACTAGAAAATAAAGAAAAAAAGTTAAA

GAATTTAGAAGATTCTCTTGAAGATTACAACAGAAAATTTGCTGTAATTCGTCATCA

ACAAAGTTTGTTGTATAAAGAATACCTAAGTGAAAAGGAGACCTGGAAAACAGAAT

CTAAAACAATAAAAGAGGAAAAGAGAAAACTTGAGGATCAAGTCCAACAAGATGC

TATAAAAGTAAAAGAATATAATAATTTGCTCAATGCTCTTCAGATGGATTCGGATG

AAATGAAAAAAATACTTGCAGAAAATAGTAGGAAAATTACTGTTTTGCAAGTGAAT

GAAAAATCACTTATAAGGCAATATACAACCTTAGTAGAATTGGAGCGACAACTTAG

AAAAGAAAATGAGAAGCAAAAGAATGAATTGTTGTCAATGGAGGCTGAAGTTTGT

GAAAAAATTGGGTGTTTGCAAAGATTTAAGGAAATGGCCATTTTCAAGATTGCAGC

TCTCCAAAAAGTTGTAGATAATAGTGTTTCTTTGTCTGAACTAGAACTGGCTAATAA

ACAGTACAATGAACTGACTGCTAAGTACAGGGACATCTTGCAAAAAGATAATATGC

TTGTTCAAAGAACAAGTAACTTGGAACACCTGGAGTGTGAAAACATCTCCTTAAAA

GAACAAGTGGAGTCTATAAATAAAGAACTGGAGATTACCAAGGAAAAACTTCACA

CTATTGAACAAGCCTGGGAACAGGAAACTAAATTAGGTAATGAATCTAGCATGGAT

AAGGCAAAGAAATCAATAACCAACAGTGACATTGTTTCCATTTCAAAAAAAATAAC

TATGCTGGAAATGAAGGAATTAAATGAAAGGCAGCGGGCTGAACATTGTCAAAAA

ATGTATGAACACTTACGGACTTCGTTAAAGCAAATGGAGGAACGTAATTTTGAATT

GGAAACCAAATTTGCTGAGCTTACCAAAATCAATTTGGATGCACAGAAGGTGGAAC

AGATGTTAAGAGATGAATTAGCTGATAGTGTGAGCAAGGCAGTAAGTGATGCTGAT

AGGCAACGGATTCTAGAATTAGAGAAGAATGAAATGGAACTAAAAGTTGAAGTGT

CAAAACTGAGAGAGATTTCTGATATTGCCAGAAGACAAGTTGAAATTTTGAATGCA

CAACAACAATCTAGGGACAAGGAAGTAGAGTCCCTCAGAATGCAACTGCTAGACTA

TCAGGCACAGTCTGATGAAAAGTCGCTCATTGCCAAGTTGCACCAACATAATGTCTC

TCTTCAACTGAGTGAGGCTACTGCTCTTGGTAAGTTGGAGTCAATTACATCTAAACT

GCAGAAGATGGAGGCCTACAACTTGCGCTTAGAGCAGAAACTTGATGAAAAAGAA

CAGGCTCTCTATTATGCTCGTTTGGAGGGAAGAAACAGAGCAAAACATCTGCGCCA

AACAATTCAGTCTCTACGACGACAGTTTAGTGGAGCTTTACCCTTGGCACAACAGG

AAAAGTTCTCCAAAACAATGATTCAACTACAAAATGACAAACTTAAGATAATGCAA

GAAATGAAAAATTCTCAACAAGAACATAGAAATATGGAGAACAAAACATTGGAGA

TGGAATTAAAATTAAAGGGCCTGGAAGAGTTAATAAGCACTTTAAAGGATACCAAA

GGAGCCCAAAAGGTAATCAACTGGCATATGAAAATAGAAGAACTTCGTCTTCAAGA

ACTTAAACTAAATCGGGAATTAGTCAAGGATAAAGAAGAAATAAAATATTTGAATA

ACATAATTTCTGAATATGAACGTACAATCAGCAGTCTTGAAGAAGAAATTGTGCAA

CAGAACAAGTTTCATGAAGAAAGACAAATGGCCTGGGATCAAAGAGAAGTTGACC

TGGAACGCCAACTAGACATTTTTGACCGTCAGCAAAATGAAATACTAAATGCGGCA

CAAAAGTTTGAAGAAGCTACAGGATCAATCCCTGACCCTAGTTTGCCCCTTCCAAAT

CAACTTGAGATCGCTCTAAGGAAAATTAAGGAGAACATTCGAATAATTCTAGAAAC

ACGGGCAACTTGCAAATCACTAGAAGAGAAACTAAAAGAGAAAGAATCTGCTTTA

AGGTTAGCAGAACAAAATATACTGTCAAGAGACAAAGTAATCAATGAACTGAGGCT
```

-continued

```
TCGATTGCCTGCCACTGCAGAAAGAGAAAAGCTCATAGCTGAGCTAGGCAGAAAAG

AGATGGAACCAAAATCTCACCACACATTGAAAATTGCTCATCAAACCATTGCAAAC

ATGCAAGCAAGGTTAAATCAAAAGAAGAAGTATTAAAGAAGTATCAACGTCTTCT

AGAAAAAGCCAGAGAGGAGCAAAGAGAAATTGTGAAGAAACATGAGGAAGACCTT

CATATTCTTCATCACAGATTAGAACTACAGGCTGATAGTTCACTAAATAAATTCAAA

CAAACGGCTTGGGATTTAATGAAACAGTCTCCCACTCCAGTTCCTACCAACAAGCAT

TTTATTCGTCTGGCTGAGATGGAACAGACAGTAGCAGAACAAGATGACTCTCTTTCC

TCACTCTTGGTCAAACTAAAGAAAGTATCACAAGATTTGGAGAGACAAAGAGAAAT

CACTGAATTAAAAGTAAAAGAATTTGAAAATATCAAATTACAGCTTCAAGAAAACC

ATGAAGATGAAGTGAAAAAAGTAAAAGCGGAAGTAGAGGATTTAAAGTATCTTCT

GGACCAGTCACAAAAGGAGTCACAGTGTTTAAAATCTGAACTTCAGGCTCAAAAAG

AAGCAAATTCAAGAGCTCCAACAACTACAATGAGAAATCTAGTAGAACGGCTAAA

GAGCCAATTAGCCTTGAAGGAGAAACAACAGAAAGCACTTAGTCGGGCACTTTTAG

AACTCCGGGCAGAAATGACAGCAGCTGCTGAAGAACGTATTATTTCTGCAACTTCT

CAAAAAGAGGCCCATCTCAATGTTCAACAAATCGTTGATCGACATACTAGAGAGCT

AAAGACACAAGTTGAAGATTTAAATGAAAATCTTTTAAAATTGAAAGAAGCACTTA

AAACAAGTAAAAACAGAGAAAACTCACTAACTGATAATTTGAATGACTTAAATAAT

GAACTGCAAAAGAAACAAAAAGCCTATAATAAAATACTTAGAGAGAAAGAGGAAA

TTGATCAAGAGAATGATGAACTGAAAAGGCAAATTAAAAGACTAACCAGTGGATTA

CAGGGCAAACCCCTGACAGATAATAAACAAAGTCTAATTGAAGAACTCCAAAGGA

AAGTTAAAAAACTAGAGAACCAATTAGAGGGAAAGGTGGAGGAAGTAGACCTAAA

ACCTATGAAAGAAAAGAATGCTAAAGAAGAATTAATTAGGTGGGAAGAAGGTAAA

AAGTGGCAAGCCAAAATAGAAGGAATTCGAAACAAGTTAAAAGAGAAAGAGGGGG

AAGTCTTTACTTTAACAAAGCAGTTGAATACTTTGAAGGATCTTTTTGCCAAAGCCG

ATAAAGAGAAACTTACTTTGCAGAGGAAACTAAAAACAACTGGCATGACTGTTGAT

CAGGTTTTGGGAATACGAGCTTTGGAGTCAGAAAAAGAATTGGAAGAATTAAAAAA

GAGAAATCTTGACTTAGAAAATGATATATTGTATATGAGGGCCCACCAAGCTCTTCC

TCGAGATTCTGTTGTAGAAGATTTACATTTACAAAATAGATACCTCCAAGAAAAACT

TCATGCTTTAGAAAAACAGTTTTCAAAGGATACATATTCTAAGCCTTCAATTTCAGG

AATAGAGTCAGATGATCATTGTCAGAGAGAACAGGAGCTTCAGAAGGAAAACTTG

AAGTTGTCATCTGAAAATATTGAACTGAAATTTCAGCTTGAACAAGCAAATAAAGA

TTTGCCAAGATTAAAGAATCAAGTCAGAGATTTGAAGGAAATGTGTGAATTTCTTA

AGAAAGAAAAGCAGAAGTTCAGCGGAAACTTGGCCATGTTAGAGGGTCTGGTAG

AAGTGGAAAGACAATCCCAGAACTGGAAAAAACCATTGGTTTAATGAAAAAAGTA

GTTGAAAAAGTCCAGAGAGAAAATGAACAGTTGAAAAAAGCATCAGGAATATTGA

CTAGTGAAAAAATGGCTAATATTGAGCAGGAAAATGAAAAATTGAAGGCTGAATTA

GAAAAACTTAAAGCTCATCTTGGGCATCAGTTGAGCATGCACTATGAATCCAAGAC

CAAAGGCACAGAAAAAATTATTGCTGAAAATGAAAGGCTTCGTAAAGAACTTAAA

AAAGAAACTGATGCTGCAGAGAAATTACGGATAGCAAAGAATAATTTAGAGATATT

AAATGAGAAGATGACAGTTCAACTAGAAGAGACTGGTAAGAGATTGCAGTTTGCAG

AAAGCAGAGGTCCACAGCTTGAAGGTGCTGACAGTAAGAGCTGGAAATCCATTGTG
```

```
-continued
GTTACAAGAATGTATGAAACCAAGTTAAAAGAATTGGAAACTGATATTGCCAAAAA

AAATCAAAGCATTACTGACCTTAAACAGCTTGTAAAAGAAGCAACAGAGAGAGAA

CAAAAAGTTAACAAATACAATGAAGACCTTGAACAACAGATTAAGATTCTTAAACA

TGTTCCTGAAGGTGCTGAGACAGAGCAAGGCCTTAAACGGGAGCTTCAAGTTCTTA

GATTAGCTAATCATCAGCTGGATAAAGAGAAAGCAGAATTAATCCATCAGATAGAA

GCTAACAAGGACCAAAGTGGAGCTGAAAGCACCATACCTGATGCTGATCAACTAAA

GGAAAAAATAAAAGATCTAGAGACACAGCTCAAAATGTCAGATCTAGAAAAGCAG

CATTTGAAGGAGGAAATAAAGAAGCTGAAAAAAGAACTGGAAAATTTTGATCCTTC

ATTTTTTGAAGAAATTGAAGATCTTAAGTATAATTACAAGGAAGAAGTGAAGAAGA

ATATTCTCTTAGAAGAGAAGGTAAAAAAACTTTCAGAACAATTGGGAGTTGAATTA

ACTAGCCCTGTTGCTGCTTCTGAAGAGTTTGAAGATGAAGAAGAAAGTCCTGTTAAT

TTCCCCATTTACTAAAGGTCACCTATAAACTTTGTTTCATTTAACTATTTATTAACTT

TATAAGTTAAATATACTTGGAAATAAGCAGTTCTCCGAACTGTAGTATTTCCTTCTC

ACTACCTTGTACCTTTATACTTAGATTGGAATTCTTAATAAATAAAATTATATGAAA

TTTTCAACTTATTAAAAAAAAAAAAAAAAAA

>AAV8 capsid protein amino acid sequence
                                                                    (SEQ ID NO: 9)
MAADGYLPDWLEDNLSEGIREWWALKPGAPKPKANQQKQDDGRGLVLPGYKYLGPF

NGLDKGEPVNAADAAALEHDKAYDQQLQAGDNPYLRYNHADAEFQERLQEDTSFGG

NLGRAVFQAKKRVLEPLGLVEEGAKTAPGKKRPVEPSPQRSPDSSTGIGKKGQQPARKR

LNFGQTGDSESVPDPQPLGEPPAAPSGVGPNTMAAGGGAPMADNNEGADGVGSSSGN

WHCDSTWLGDRVITTSTRTWALPTYNNHLYKQISNGTSGGATNDNTYFGYSTPWGYF

DFNRFHCHFSPRDWQRLINNNWGFRPKRLSFKLFNIQVKEVTQNEGTKTIANNLTSTIQ

VFTDSEYQLPYVLGSAHQGCLPPFPADVFMIPQYGYLTLNNGSQAVGRSSFYCLEYFPS

QMLRTGNNFQFTYTFEDVPFHSSYAHSQSLDRLMNPLIDQYLYYLSRTQTTGGTANTQT

LGFSQGGPNTMANQAKNWLPGPCYRQQRVSTTTGQNNNSNFAWTAGTKYHLNGRNS

LANPGIAMATHKDDEERFFPSNGILIFGKQNAARDNADYSDVMLTSEEEIKTTNPVATE

EYGIVADNLQQQNTAPQIGTVNSQGALPGMVWQNRDVYLQGPIWAKIPHTDGNFHPSP

LMGGFGLKHPPPQILIKNTPVPADPPTTFNQSKLNSFITQYSTGQVSVEIEWELQKENSKR

WNPEIQYTSNYYKSTSVDFAVNTEGVYSEPRPIGTRYLTRNL
```

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A recombinant adeno-associated virus (rAAV) comprising:
(i) arAAV vector encoding a CEP290 protein fragment comprising the amino acid sequence set forth in SEQ ID NO: 3, wherein the CEP290 protein fragment comprises no more than 700 contiguous amino acids of SEQ ID NO: 1, and wherein the CEP290 protein fragment lacks amino acids 1695 to 1966 of SEQ ID NO: 1, and
(ii) one or more AAV capsid proteins.

2. The rAAV of claim 1, wherein the CEP290 protein fragment is encoded by the sequence set forth in SEQ ID NO: 6.

3. The rAAV of claim 1, further comprising a promoter.

4. The rAAV of claim 3, wherein the promoter is a chicken beta-actin (CBA) promoter, or a tissue specific promoter selected from the group consisting of: an eye-specific promoter, a retinoschisin promoter, K12 promoter, a rhodopsin promoter, a rod-specific promoter, a cone-specific promoter, a rhodopsin kinase promoter, and an interphotoreceptor retinoid-binding protein proximal (IRBP) promoter.

5. The rAAV of claim 1, wherein the rAAV vector further comprises AAV2 ITRs.

6. The rAAV of claim 1, wherein the one or more AAV capsid proteins is an AAV5 capsid protein or an AAV8 capsid protein.

7. The rAAV of claim 1, wherein the one or more AAV capsid proteins comprises the sequence set forth in SEQ ID NO: 9.

8. The rAAV of claim 1, wherein the rAAV is a self-complementary AAV (scAAV).

* * * * *

SEQUENCE LISTING

```
Sequence total quantity: 9
SEQ ID NO: 1            moltype = AA  length = 2479
FEATURE                 Location/Qualifiers
source                  1..2479
                        mol_type = protein
                        organism = Homo sapiens
SEQUENCE: 1
MPPNINWKEI MKVDPDDLPR QEELADNLLI SLSKVEVNEL KSEKQENVIH LFRITQSLMK   60
MKAQEVELAL EEVEKAGEEQ AKFENQLKTK VMKLENELEM AQQSAGGRDT RFLRNEICQL  120
EKQLEQKDRE LEDMEKELEK EKKVNEQLAL RNEEAENENS KLRRENKRLK KKNEQLCQDI  180
IDYQKQIDSQ KETLLSRRGE DSDYRSQLSK KNYELIQYLD EIQTLTEANE KIEVQNQEMR  240
KNLEESVQEM EKMTDEYNRM KAIVHQTDNV IDQLKKENDH YQLQVQELTD LLKSKNEEDD  300
PIMVAVNAKV EEWKLILSSK DDEIIEYQQM LHNLREKLKN AQLDADKSNV MALQQGIQER  360
DSQIKMLTEQ VEQYTKEMEK NTCIIEDLKN ELQRNKGAST LSQQTHMKIQ STLDILKEKT  420
KEAERTAELA EADAREKDKE LVEALKRLKD YESGVYGLED AVVEIKNCKN QIKIRDREIE  480
ILTKEINKLE LKISDFLDEN EALRERVGLE PKTMIDLTEF RNSKHLKQQQ YRAENQILLK  540
EIESLEEERL DLKKKIRQMA QERGKRSATS GLTTEDLNLT ENISQGDRIS ERKLDLLSLK  600
NMSEAQSKNE FLSRELIEKE RDLERSRTVI AKFQNKLKEL VEENKQLEEG MKEILQAIKE  660
MQKDPDVKGG ETSLIIPSLE RLVNAIESKN AEGIFDASLH LKAQVDQLTG RNEELRQELR  720
ESRKEAINYS QQLAKANLKI DHLEKETSLL RQSEGSNVVF KGIDLPDGIA PSSASIINSQ  780
NEYLIHLLQE LENKEKKLKN LEDSLEDYNR KFAVIRHQQS LLYKEYLSEK ETWKTESKTI  840
KEEKRKLEDQ VQQDAIKVKE YNNLLNALQM DSDEMKKILA ENSRKITVLQ VNEKSLIRQY  900
TTLVELERQL RKENEKQKNE LLSMEAEVCE KIGCLQRFKE MAIFKIAALQ KVVDNSVSLS  960
ELELANKQYN ELTAKYRDIL QKDNMLVQRT SNLEHLECEN ISLKEQVESI NKELEITKEK 1020
LHTIEQAWEQ ETKLGNESSM DKAKKSITNS DIVSISKKIT MLEMKELNER QRAEHCQKMY 1080
EHLRTSLKQM EERNFELETK FAELTKINLD AQKVEQMLRD ELADSVSKAV SDADRQRILE 1140
LEKNEMELKV EVSKLREISD IARRQVEILN AQQQSRDKEV ESLRMQLLDY QAQSDEKSLI 1200
AKLHQHNVSL QLSEATALGK LESITSKLQK MEAYNLRLEQ KLDEKEQALY YARLEGRNRA 1260
KHLRQTIQSL RRQFSGALPL AQQEKFSKTM IQLQNDKLKI MQEMKNSQQE HRNMENKTLE 1320
MELKLKGLEE LISTLKDTKG AQKVINWHMK IEELRLQELK LNRELVKDKE EIKYLNNIIS 1380
EYERTISSLE EEIVQQNKFH EERQMAWDQR EVDLERQLDI FDRQQNEILN AAQKFEEATG 1440
SIPDPSLPLP NQLEIALRKI KENIRIILET RATCKSLEEK LKEKESALRL AEQNILSRDK 1500
VINELRLRLP ATAEREKLIA ELGRKEMEPK SHHTLKIAHQ TIANMQARLN QKEEVLKKYQ 1560
RLLEKAREEQ REIVKKHEED LHILHHRLEL QADSSLNKFK QTAWDLMKQS PTPVPTNKHF 1620
IRLAEMEQTV AEQDDSLSSL LVKLKKVSQD LERQREITEL KVKEFENIKL QLQENHEDEV 1680
```

```
KKVKAEVEDL KYLLDQSQKE SQCLKSELQA QKEANSRAPT TMMRNLVERL KSQLALKEKQ   1740
QKALSRALLE LRAEMTAAAE ERIISATSQK EAHLNVQQIV DRHTRELKTQ VEDLNENLLK   1800
LKEALKTSKN RENSLTDNLN DLNNELQKKQ KAYNKILREK EEIDQENDEL KRQIKRLTSG   1860
LQGKPLTDNK QSLIEELQRK VKKLENQLEG KVEEVDLKPM KEKNAKEELI RWEEGKKWQA   1920
KIEGIRNKLK EKEGEVFTLT KQLNTLKDLF AKADKEKLTL QRKLKTTGMT VDQVLGIRAL   1980
ESEKELEELK KRNLDLENDI LYMRAHQALP RDSVVEDLHL QNRYLQEKLH ALEKQFSKDT   2040
YSKPSISGIE SDDHCQREQE LQKENLKLSS ENIELKFQLE QANKDLPRLK NQVRDLKEMC   2100
EFLKKEKAEV QRKLGHVRGS GRSGKTIPEL EKTIGLMKKV VEKVQRENEQ LKKASGILTS   2160
EKMANIEQEN EKLKAELEKL KAHLGHQLSM HYESKTKGTE KIIAENERLR KELKKETDAA   2220
EKLRIAKNNL EILNEKMTVQ LEETGKRLQF AESRGPQLEG ADSKSWKSIV VTRMYETKLK   2280
ELETDIAKKN QSITDKQLVK EATEREQKV NKYNEDLEQQ IKILKHVPEG AETEQGLKRE    2340
LQVLRLANHQ LDKEKAELIH QIEANKDQSG AESTIPDADQ LKEKIKDLET QLKMSDLEKQ   2400
HLKEEIKKLK KELENFDPSF FEEIEDLKYN YKEEVKKNIL LEEKVKKLSE QLGVELTSPV   2460
AASEEFEDEE ESPVNFPIY                                              2479

SEQ ID NO: 2           moltype = AA  length = 1116
FEATURE                Location/Qualifiers
source                 1..1116
                       mol_type = protein
                       organism = synthetic construct
SEQUENCE: 2
TENISQGDRI SERKLDLLSL KNMSEAQSKN EFLSRELIEK ERDLERSRTV IAKFQNKLKE    60
LVEENKQLEE GMKEILQAIK EMQKDPDVKG GETSLIIPSL ERLVNAIESK NAEGIFDASL   120
HLKAQVDQLT GRNEELRQEL RESRKEAINY SQQLAKANLK IDHLEKETSL LRQSEGSNVV   180
FKGIDLPDGI APSSASIINS QNEYLIHLLQ ELENKEKKLK NLEDSLEDYN RKFAVIRHQQ   240
SLLYKEYLSE KETWKTESKT IKEEKRKLED QVQQDAIKVK EYNNLLNALQ MDSDEMKKIL   300
AENSRKITVL QVNEKSLIRQ YTTLVELERQ LRKENEKQKN ELLSMEAEVC EKIGCLQRFK   360
EMAIFKIAAL QKVVDNSVSL SELELANKQY NELTAKYRDI LQKDNMLVQR TSNLEHLECE   420
NISLKEQVES INKELEITKE KLHTIEQAWE QETKLGNESS MDKAKKSITN SDIVSISKKI   480
TMLEMKELNE RQRAEHCQKM YEHLRTSLKQ MEERNFELET KFAELTKINL DAQKVEQMLR   540
DELADSVSKA VSDADRQRIL ELEKNEMELK VEVSKLREIS DIARRQVEIL NAQQQSRDKE   600
VESLRMQLLD YQAQSDEKSL IAKLHQHNVS LQLSEATALG KLESITSKLQ KMEAYNLRLE   660
QKLDEKEQAL YYARLEGRNR AKHLRQTIQS LRRQFSGALP LAQQEKFSKT MIQLQNDKLK   720
IMQEMKNSQQ EHRNMENKTL EMELKLKGLE ELISTLKDTK GAQKVINWHM KIEELRLQEL   780
KLNRELVKDK EEIKYLNNII SEYERTISSL EEEIVQQNKF HEERQMAWDQ REVDLERQLD   840
IFDRQQNEIL NAAQKFEEAT GSIPDPSLPL PNQLEIALRK IKENIRIILE TRATCKSLEE   900
KLKEKESALR LAEQNILSRD KVINELRLRL PATAEREKLI AELGRKEMEP KSHHTLKIAH   960
QTIANMQARL NQKEEVLKKY QRLLEKAREE QREIVKKHEE DLHILHHRLE LQADSSLNKF   1020
KQTAWDLMKQ SPTPVPTNKH FIRLAEMEQT VAEQDDSLSS LLVKLKKVSQ DLERQREITE   1080
LKVKEFENIK LQLQENHEDE VKKVKAEVED LKYLLD                            1116

SEQ ID NO: 3           moltype = AA  length = 601
FEATURE                Location/Qualifiers
source                 1..601
                       mol_type = protein
                       organism = synthetic construct
SEQUENCE: 3
TENISQGDRI SERKLDLLSL KNMSEAQSKN EFLSRELIEK ERDLERSRTV IAKFQNKLKE    60
LVEENKQLEE GMKEILQAIK EMQKDPDVKG GETSLIIPSL ERLVNAIESK NAEGIFDASL   120
HLKAQVDQLT GRNEELRQEL RESRKEAINY SQQLAKANLK IDHLEKETSL LRQSEGSNVV   180
FKGIDLPDGI APSSASIINS QNEYLIHLLQ ELENKEKKLK NLEDSLEDYN RKFAVIRHQQ   240
SLLYKEYLSE KETWKTESKT IKEEKRKLED QVQQDAIKVK EYNNLLNALQ MDSDEMKKIL   300
AENSRKITVL QVNEKSLIRQ YTTLVELERQ LRKENEKQKN ELLSMEAEVC EKIGCLQRFK   360
EMAIFKIAAL QKVVDNSVSL SELELANKQY NELTAKYRDI LQKDNMLVQR TSNLEHLECE   420
NISLKEQVES INKELEITKE KLHTIEQAWE QETKLGNESS MDKAKKSITN SDIVSISKKI   480
TMLEMKELNE RQRAEHCQKM YEHLRTSLKQ MEERNFELET KFAELTKINL DAQKVEQMLR   540
DELADSVSKA VSDADRQRIL ELEKNEMELK VEVSKLREIS DIARRQVEIL NAQQQSRDKE   600
V                                                                  601

SEQ ID NO: 4           moltype = AA  length = 515
FEATURE                Location/Qualifiers
source                 1..515
                       mol_type = protein
                       organism = synthetic construct
SEQUENCE: 4
ESLRMQLLDY QAQSDEKSLI AKLHQHNVSL QLSEATALGK LESITSKLQK MEAYNLRLEQ    60
KLDEKEQALY YARLEGRNRA KHLRQTIQSL RRQFSGALPL AQQEKFSKTM IQLQNDKLKI   120
MQEMKNSQQE HRNMENKTLE MELKLKGLEE LISTLKDTKG AQKVINWHMK IEELRLQELK   180
LNRELVKDKE EIKYLNNIIS EYERTISSLE EEIVQQNKFH EERQMAWDQR EVDLERQLDI   240
FDRQQNEILN AAQKFEEATG SIPDPSLPLP NQLEIALRKI KENIRIILET RATCKSLEEK   300
LKEKESALRL AEQNILSRDK VINELRLRLP ATAEREKLIA ELGRKEMEPK SHHTLKIAHQ   360
TIANMQARLN QKEEVLKKYQ RLLEKAREEQ REIVKKHEED LHILHHRLEL QADSSLNKFK   420
QTAWDLMKQS PTPVPTNKHF IRLAEMEQTV AEQDDSLSSL LVKLKKVSQD LERQREITEL   480
KVKEFENIKL QLQENHEDEV KKVKAEVEDL KYLLD                              515

SEQ ID NO: 5           moltype = DNA  length = 3606
FEATURE                Location/Qualifiers
source                 1..3606
                       mol_type = other DNA
``` organism = synthetic construct
SEQUENCE: 5

```
actgaaaaca tttctcaagg agatagaata agtgaaagaa aattggattt attgagcctc    60
aaaaatatga gtgaagcaca atcaaagaat gaatttcttt caagagaact aattgaaaaa   120
gaaagagatt tagaaaggag taggacagtg atagccaaat ttcagaataa attaaaagaa   180
ttagttgaag aaaataagca acttgaagaa ggtatgaaaa aaatattgca agcaattaag   240
gaaatgcaga aagatcctga tgttaaagga ggagaaacat ctctaattat ccctagcctt   300
gaaagactag ttaatgctat agaatcaaag aatgcagaag gaatctttga tgcgagtctg   360
catttgaaag cccaagttga tcagcttacc ggaagaaatg aagaattaag acaggagctc   420
agggaatctc ggaagagagc tataaattat tcacagcagt tggcaaaagc taatttaaag   480
atagaccatc ttgaaaaaga aactagtctt ttacgacaat cagaaggatc gaatgttgtt   540
tttaaaggaa ttgacttacc tgatgggata gcaccatcta gtgccagtat cattaattct   600
cagaatgaat atttaataca tttgttacag gaactagaaa ataaagaaaa aaagttaaag   660
aatttagaag attccttga agattacaac agaaaatttg ctgtaattcg tcatcaacaa   720
agtttgttgt ataagaata cctaagtgaa aaggagacct ggaaaacaga atctaaaaca   780
ataaagagg aaaagagaaa acttgaggat caagtccaac aagatgctat aaaagtaaaa   840
gaatataata atttgctcaa tgctcttcag atggattcgg atgaaatgaa aaaaatactt   900
gcagaaaata gtaggaaaat tactgttttg caagtgaatg aaaaatcact tataaggcaa   960
tatacaacct tagtagaatt ggagcgacaa cttagaaaag aaaatgagaa gcaaaagaat  1020
gaattgttgt caatggaggc tgaagtttgt gaaaaaattg ggtgtttgca agatttaag  1080
gaaatggcca ttttcaagat tgcagctctc caaaaagttg tagataatag tgtttctttg  1140
tctgaactag aactggctaa taaacagtac aatgaactga ctgctaagta cagggacatc  1200
ttgcaaaaag ataatatgct tgttcaagaa acaagtaact tggaacaccct ggagtgtgaa  1260
aacatctcct taaagaaaca agtggagtct ataaataaag aactggagat taccaaggaa  1320
aaacttcaca ctattgaaca agcctgggaa caggaaacta aattaggtaa tgaatctagc  1380
atggataagg caaagaaatc aataaccaac agtgacattc tttccatttc aaaaaaaata  1440
actatgctgg aaatgaagga attaaatgaa aggcagcggg ctgaacattg tcaaaaaatg  1500
tatgaacact tacggacttc gttaaagcaa atggaggaac gtaattttga attgaaaacc  1560
aaatttgctg agcttaccaa aatcaatttg gatgcacaga aggtggaaca gatgttaaga  1620
gatgaattag ctgatagtgt gagcaaggca gtaagtgatg ctgataggca acggattcta  1680
gaattagaga agaatgaaat ggaactaaaa gttgaagtgt caaaactgag agagatttct  1740
gatattgcca aagacaagt tgaaattttg aatgcacaac aacaatctag gacaaggaa  1800
gtaactgaaa acatttctca aggagataga ataagtgaaa gaaaattgga tttattgagc  1860
ctcaaaaata tgagtgaagc acaatcaaag aatgaatttc tttcaagaga actaattgaa  1920
aaagaaagag atttagaaag gagtaggaca gtgatagcca aatttcagaa taaattaaaa  1980
gaattagttg aagaaaataa gcaacttgaa gaaggtatga agaaatatt gcaagcaatt  2040
aaggaaatgc agaagatcc tgatgttaaa ggaggagaaa catctctaat tatccctagc  2100
cttgaaagac tagttaatgc tatagaatca agaatgcag aaggaatctt tgatgcgagt  2160
ctgcatttga agcccaagt tgatcagctt accggaagaa atgaagacggag  2220
ctcagggaat ctcggaaaga ggctataaat tattcacagc agttggcaaa agctaattta  2280
aagatagacc atcttgaaaa agaaactagt cttttacgac aatcagaagg atcgaatgtt  2340
gttttttaag gaattgactt acctgatggg atagcaccat ctagtgccag tatcattaat  2400
tctcagaata atatttaat acatttgtta caggaactag gaaaataaaga aaaaagttaaag  2460
aagaatttag aagattctct tgaagattac aacagaaaat tgctgtaat tcgtcatcaa  2520
caaagtttgt tgtataaaga atacctaagt gaaaaggaga cctggaaaac agaatctaaa  2580
acaataaaag aggaaaagag aaaacttgag gatcaagtcc aacaagatgc tataaaagta  2640
aaagaatata ataatttgct caatgctctt cagatgatt cggatgaaat gaaaaaaata  2700
cttgcagaaa atagtaggaa aattactgtt ttgcaagtga atgaaaaatc acttataagg  2760
caatatacaa cctttagtaga attggagcga caacttagaa aagaaaatga agcaaaag  2820
aatgaattgt tgtcaatgga ggctgaagtt tgtgaaaaaa ttgggtgttt gcaaagattt  2880
aaggaaatgg ccatttttcaa gattgcagct ctccaaaaag ttgtagataa tagtgtttct  2940
ttgtctgaac tagaactggc taataaacag tacaatgaac tgactgctaa gtacagggac  3000
atcttgcaaa aagataatat gcttgttcaa gaacaagta acttggaaca cctggagtgt  3060
gaaaacatct ccttaaaaga acaagtggag tctataaata agaactgga gattaccaag  3120
gaaaaacttc acactattga acaagcctgg gaacaggaaa ctaaattagg taatgaatct  3180
agcatggata aggcaaagaa atcaataacc aacagtgaca ttctttccat ttcaaaaaaa  3240
ataactatgc tggaaatgaa ggaattaaat gaaaggcagc gggctgaaca ttgtcaaaaa  3300
atgtatgaac acttacggac ttcgttaaag caaatggagg aacgtaattt tgaattggaa  3360
accaaatttg ctgagcttac caaaatcaat ttggatgcac agaaggtgga acagatgtta  3420
agagatgaat tagctgatag tgtgagcaag gcagtaagtg atgctgatag gcaacggatt  3480
ctagaattag agaagaatga aatggaacta aaagttgaag tgtcaaaact gagagagatt  3540
tctgatattg ccagaagaca agttgaaatt tgaatgcac aacaacaatc tagggacaag  3600
gaagta                                                              3606
```

SEQ ID NO: 6    moltype = DNA    length = 1803
FEATURE         Location/Qualifiers
source          1..1803
                mol_type = other DNA
                organism = synthetic construct
SEQUENCE: 6

```
actgaaaaca tttctcaagg agatagaata agtgaaagaa aattggattt attgagcctc    60
aaaaatatga gtgaagcaca atcaaagaat gaatttcttt caagagaact aattgaaaaa   120
gaaagagatt tagaaaggag taggacagtg atagccaaat ttcagaataa attaaaagaa   180
ttagttgaag aaaataagca acttgaagaa ggtatgaaaa aaatattgca agcaattaag   240
gaaatgcaga aagatcctga tgttaaagga ggagaaacat ctctaattat ccctagcctt   300
gaaagactag ttaatgctat agaatcaaag aatgcagaag gaatctttga tgcgagtctg   360
catttgaaag cccaagttga tcagcttacc ggaagaaatg aagaattaag acaggagctc   420
agggaatctc ggaagagagc tataaattat tcacagcagt tggcaaaagc taatttaaag   480
atagaccatc ttgaaaaaga aactagtctt ttacgacaat cagaaggatc gaatgttgtt   540
```

```
tttaaaggaa ttgacttacc tgatgggata gcaccatcta gtgccagtat cattaattct    600
cagaatgaat atttaataca tttgttacag gaactagaaa ataaagaaaa aaagttaaag    660
aatttagaag attctcttga agattacaac agaaaatttg ctgtaattcg tcatcaacaa    720
agtttgttgt ataagaata  cctaagtgaa aaggagacct ggaaaacaga atctaaaaca    780
ataaaagagg aaaagagaaa acttgaggat caagtccaac aagatgctat aaaagtaaaa    840
gaatataata atttgctcaa tgctcttcag atggattcgg atgaaatgaa aaaaatactt    900
gcagaaaata gtaggaaaat tactgttttg caagtgaatg aaaaatcact tataaggcaa    960
tatacaacct tagtagaatt ggagcgacaa cttagaaaag aaaatgagaa gcaaaagaat   1020
gaattgttgt caatggaggc tgaagtttgt gaaaaaattg ggtgtttgca aagatttaag   1080
gaaatggcca ttttcaagat tgcagctctc caaaaagttg tagataatag tgtttctttg   1140
tctgaactag aactggctaa taaacagtac aatgaactga ctgctaagta cagggacatc   1200
ttgcaaaaag ataatatgct tgttcaaaga acaagtaact ggaacaccct ggagtgtgaa   1260
aacatctcct taaaagaaca agtggagtct ataaataaag aactggagat taccaaggaa   1320
aaacttcaca ctattgaaca agcctgggaa caggaaacta aattaggtaa tgaatctagc   1380
atggataagg caaagaaatc aataaccaac agtgacattg tttccatttc aaaaaaaata   1440
actatgctgg aaatgaagga attaaatgaa aggcagcggg ctgaacattg tcaaaaaatg   1500
tatgaacact acggacttc  gttaaagcaa atggaggaac gtaattttga attggaaacc   1560
aaatttgctg agcttaccaa aatcaatttg gatgcacaga aggtggaaca gatgttaaga   1620
gatgaattag ctgatagtgt gagcaaggca gtaagtgatg ctgataggca acggattcta   1680
gaattagaga agaatgaaat ggaactaaaa gttgaagtgt caaaactgag agagatttct   1740
gatattgcca gaagacaagt tgaaattttg aatgcacaac aacaatctag ggacaaggaa   1800
gta                                                                 1803

SEQ ID NO: 7           moltype = DNA  length = 1545
FEATURE                Location/Qualifiers
source                 1..1545
                       mol_type = other DNA
                       organism = synthetic construct
SEQUENCE: 7
gagtccctca gaatgcaact gctagactat caggcacagt ctgatgaaaa gtcgctcatt     60
gccaagttgc accaacataa tgtctctctt caactgagtg aggctactgc tcttggtaag    120
ttggagtcaa ttacatctaa actgcagaag atggaggcct acaacttgcg cttagagcag    180
aaacttgatg aaaaagaaca ggctctctat tatgctcgtt tggagggaag aaacagagca    240
aaacatctgc gccaaacaat tcagtctcta cgacgacagt ttagtggagc tttaccccttg   300
gcacaacagg aaaagttctc caaaacaatg attcaactac aaaatgacaa acttaagta    360
atgcaagaaa tgaaaaattc tcaacaagaa catagaaata tggagaacaa acattggag    420
atggaattaa aattaaaggg cctggaagag ttaataagca ctttaaagga taccaaagga    480
gcccaaaagg taatcaactg gcatatgaaa atagaagaac ttcgtcttca agaacttaaa    540
ctaaatcgag aattagtcaa ggataaagaa gaaataaat atttgaataa cataattct    600
gaatatgaac gtacaatcag cagtcttgaa gaagaaattg tgcaacagaa caagtttcat    660
gaagaaagac aaatggcctg ggatcaaaga gaagttgacc tggaacgcca actagacatt    720
tttgaccgtc agcaaaatga atactactaat gcggcacaaa agtttgaaga agctacagga    780
tcaatccctg accctagttt gccccttcca aatcaacttg agatcgctct aaggaaaatt    840
aaggagaaca ttcgaataat tctagaaaca cgggcaactt gcaaatcact agaagagaaa    900
ctaaaagaga agaatctgc tttaaggtta gcagaacaaa atatactgtc aagagacaaa    960
gtaatcaatg aactgaggct tcgattgcct gccactgcag aaagagaaaa gctcatagct   1020
gagctaggca gaaaagagat ggaaccaaaa tctcaccaca cattgaaaat tgctcatcaa   1080
accattgcaa acatgcaagc aaggttaaat caaaaagaag aagtattaaa gaagtatcaa   1140
cgtcttctag aaaaagccag agaggagcaa agagaaattg aagaaaca tgaggaagac   1200
cttcatattc ttcatcacag attagaacta caggctgata gttcactaaa taattcaaa   1260
caaacggctt gggatttaat gaaacagtct cccactccaa ttcctaccaa caagcattt   1320
attcgtctgg ctgagatgga acagacagta gcagaacaag atgactctct ttcctcactc   1380
ttggtcaaac taagaaagt atcacaagat tggagagac aaagagaaat cactgaatta    1440
aaagtaaaag aatttgaaaa tatcaaatta cagcttcaag aaaaccatga agatgaagtg   1500
aaaaaagtaa aagcggaagt agaggattta agtatcttc tggac                   1545

SEQ ID NO: 8           moltype = DNA  length = 7972
FEATURE                Location/Qualifiers
source                 1..7972
                       mol_type = genomic DNA
                       organism = Homo sapiens
SEQUENCE: 8
atttgaagtc ctcgttccac gccttctcat catcctgaac accgagctct gggactccgg     60
cggagaatct aaacgtaaag catcacccac ggtcgtgaac tgtaggctct cctggcatcc    120
gggatcttat tctggccttg gcggagttgg ggatggtgtc gcctagcagc cgctgccgct    180
ttggcttgct cggggaccatt tggctggacc cagagtccgc gtgaaccgc gatagggatc    240
tgtcagggcc cgcggccggg tccagcttgg tggttgcgt agtgagaggc ctccgctggt    300
tgccaggctt ggtctagagg tggagcacag tgaaagaatt caagatgcca cctaatataa    360
actggaaaga aataatgaaa gttgacccag atgacctgcc ccgtcaagaa gaactggcag    420
ataatttatt gatttcctta tccaaggtgg aagtaaatga gctaaaaagt gaaaagcaag    480
aaaatgtgat acaccttttc agaattactc agtcactaat gaagatgaaa gctcaagaag    540
tggagctggc tttggaagaa gtagaaaaag ctggagaaga caagcaaaaa tttgaaaatc    600
aattaaaaac taaagtaatg aaactggaaa atgaactgga gatggctcag cagtctgcag    660
gtggacgaga tactcggttt acgtaatgg aaatttgcca acttgaaaaa caattagaac    720
aaaaagatag agaattggag gacatgaaaa aggagttgga gaagaag aaagtttaatg    780
agcaattggc tcttcgaaat gaggaggcag aaaatgaaaa cagcaaatta agaagagaga    840
acaaacgtct aaagaaaaag aatgaacaac tttgtcagga tattattgac taccagaaac    900
aaatagatta acagaaagaa acactttat caagaagagg ggaagacagt gactaccgat    960
cacagttgtc taaaaaaaac tatgagctta ccaatatctc tgatgaaatt cagactttaa   1020
```

```
cagaagctaa tgagaaaatt gaagttcaga atcaagaaat gagaaaaaat ttagaagagt  1080
ctgtacagga aatggagaag atgactgatg aatataatag aatgaaagct attgtgcatc  1140
agacagataa tgtaatagat cagttaaaaa aagaaaacga tcattatcaa cttcaagtgc  1200
aggagcttac agatcttctg aaatcaaaaa atgaagaaga tgatccaatt atggtagctg  1260
tcaatgcaaa agtagaagaa tggaagctaa ttttgtcttc taaagatgat gaaattattg  1320
agtatcagca aatgttacat aacctaaggg agaaacttaa gaatgctcag cttgatgctg  1380
ataaaagtaa tgttatggct ctacagcagg gtatacagga acgagacagt caaattaaga  1440
tgctcaccga acaagtagaa caatatacaa aagaaatgga aaagaatact tgtattattg  1500
aagatttgaa aaatgagctc caaagaaaca aaggtgcttc aacccttcct caacagactc  1560
atatgaaaat tcagtcaacg ttagacattt taaaagagaa aactaaagag gctgagagaa  1620
cagctgaact ggctgaggct gatgctaggg aaaaggataa agaattagtt gaggctctga  1680
agaggttaaa agattatgaa tcgggagtat atggtttaga agatgctgtc gttgaaataa  1740
agaattgtaa aaaccaaatt aaaataagag atcgagagat tgaaatatta acaaaggaaa  1800
tcaataaact tgaattgaag atcagtgatt tccttgatga aaatgaggca cttagagagc  1860
gtgtgggcct tgaaccaaag acaatgattg atttaactga atttagaaat agcaaacact  1920
taaaacagca gcagtacaga gctgaaaacc agattctttt gaaagagatt gaaagtctag  1980
aggaagaacg acttgatctg aaaaaaaaaa ttcgtcaaat ggctcaagaa agaggaaaaa  2040
gaagtgcaac ttcaggatta accactgagg acctgaacct aactgaaaac atttctcaag  2100
gagatagaat aagtgaaaga aaattggatt tattgagcct caaaaatatg agtgaagcac  2160
aatcaaagaa tgaatttctt tcaagagaac taattgaaaa agaaagagat ttagaaagga  2220
gtaggacagt gatagccaaa tttcagaata aattaaaaga attagttgaa gaaaataagc  2280
aacttgaaga aggtatgaaa gaaatattgc aagcaattaa gggaatgcag aaagatcctg  2340
atgttaaagg aggagaaaca tctctaatta tccctagcct tgaaagacta gttaatgcta  2400
tagaatcaaa gaatgcagaa ggaatctttg atgcgagtct gcatttgaaa gcccaagttg  2460
atcagcttac cggaagaaat gaagaattaa gacaggagct cagggaatct cggaaagagg  2520
ctataaatta ttcacagcag ttggcaaaag ctaatttaaa gatagaccat cttgaaaaag  2580
aaactagtct tttacgacaa tcagaaggat cgaatgttgt ttttaaagga attgacttac  2640
ctgatgggat agcaccatct agtgccagta tcattaattc tcagaatgaa tatttaatac  2700
atttgttaca ggaactagaa aataaagaaa aaagttaaa gaatttagaa gattctcttg  2760
aagattacaa cagaaaattt gctgtaattc gtcatcaaca aagtttgttg tataaagaat  2820
acctaagtga aaaggagacc tggaaaacag aatctaaaac aataaaagag gaaaagagaa  2880
aacttgagga tcaagtccaa caagatgcta taaaagtaaa agaatataat aatttgctca  2940
atgctcttca gatggattcg gatgaaatga aaaaaatact tgcagaaaat agtaggaaaa  3000
ttactgtttt gcaagtgaat gaaaaatcac ttataaggca atataaacc ttagtagaat  3060
tggagcgaca acttagaaaa gaaaatgaga agcaaaagaa tgaattgttg tcaatggagg  3120
ctgaagtttg tgaaaaaatt gggtgtttgc aaagatttaa ggaatggcc attttcaaga  3180
ttgcagctct ccaaaaagtt gtagataata gtgtttcttt gtctgaacta gaactggcta  3240
ataaacagta caatgaactg actgctaagt acagggacat cttgcaaaaa gataatatgc  3300
ttgttcaaag aacaagtaac ttggaacacc tggagtgtga aaacatctcc ttaaaagaac  3360
aagtggagtc tataaataaa gaactggaga ttaccaagga aaaacttcac actattgaac  3420
aagcctggga acaggaaact aaattaggta atgaatctag catggataag gcaaagaaat  3480
caataaccaa cagtgacatt gtttccattt caaaaaaaat aactatgctg gaaatgaagg  3540
aattaaatga aaggcagcgg gctgaacatt gtcaaaaaat gtatgaacac ttacggactt  3600
cgttaaagca aatggaggaa cgtaattttg aattggaaaa caaatttgct gagcttacca  3660
aaatcaattt ggatgcacag aaggtggaac agatgttaag agatgaatta gctgatagtg  3720
tgagcaaggc agtaagtgat gctgatagc aacggattct agaattagag aagaatgaaa  3780
tggaactaaa agttgaagtg tcaaaactga gagagatttc tgatattgcc agaagacaag  3840
ttgaaatttt gaatgcacaa caacaatcta gggacaagga agtagagtcc ctcagaatgc  3900
aactgctaga ctatcaggca cagtctgatg aaaagtcgct cattgccaag ttgcaccaac  3960
ataatgtctc tcttcaactg agtgaggcta ctgctcttgg taagttggag tcaattacat  4020
ctaaactgca gaagatggag gcctacaact tgccgttaga gcagaaactt gatgaaaaag  4080
aacaggctct ctattatgct cgtttggagg gaagaaacag agcaaaacat ctgcgccaaa  4140
caattcagtc tctacgacga cagtttagtg gagcttacc cttggcacaa caggaaaagt  4200
tctccaaaac aatgattcaa ctacaaaatg acaaacttaa gataatgcaa gaaatgaaaa  4260
attctcaaca agaacatga aatatggaga acaaaacatt ggagatggaa ttaaaattaa  4320
agggcctgga agagttaata agcacttaa aaggataccaa aggagcccaa aaggtaatca  4380
actggcatat gaaaatagaa gaacttcgtc ttcaagaact taaactaaat cgggaattag  4440
tcaaggataa agaagaaata aaatatttga ataacataat ttctgaatat gaacgtacaa  4500
tcagcagtct tgaagaagaa attgtgcaac agaacaagtt tcatgaagaa agacaaatgg  4560
cctgggatca aagagaagtt gacctggaac gccaactaga catttttgac cgtcagcaga  4620
atgaaatact aaatgcggca caaaagtttg aagaagctac aggatcaatc cctgaccctaa  4680
gtttgccct tccaaatcaa cttgagatcg ctctaaggaa aattaaggag aacattcgaa  4740
taattctaga aacacgggca acttgcaaat cactagaaga gaaactaaaa gagaaagaat  4800
ctgctttaag gttagcagaa caaaatatac tgtcaagaga caagactaat aatgaactga  4860
ggcttcgatt gcctgccact gcagaaagag aaaagctcat agctgagcta ggcagaaaag  4920
agatggaacc aaaatctcac cacacattga aaattgctca tcaaaccatt gcaaacatgc  4980
aagcaaggtt aaatcaaaaa gaagaagtat taagaagta tcaacgtctt ctagaaaaag  5040
ccagagagga gcaaagagaa attgtgaaga aactgagga gaccttcag attcttcatc  5100
acagattaga actacaggct gatagttcac taaataaatt caaacaaacg gcttgggatt  5160
taatgaaaca gtctcccact ccagttccta ccaacaagca ttttattcgt ctggctgaga  5220
tggaacagac agtagcagaa caagatgact ctctttcctc actcttggtc aaactaaaga  5280
aagtatcaca agatttggag agacaaagag aaatcactga attaaagta aaagaatttg  5340
aaaatatcaa attcagcttt caagaaaacc atgaagatga agtgaaaaaa gtaaaagcgg  5400
aagtagagga tttaaagtat cttctgagtc agtcacaaag ggagtcacag tgtttaaaat  5460
ctgaacttca ggctcaaaaa aagcaaattt caagagctcc aacaactaca atggaaaatc  5520
tagtagaacg gctaaagagc caattagcct tgaaggagaa acaacagaaa gcacttagtc  5580
gggcacttt agaactccgg gcagaaatga cagcagctgc tgaagaacgt attatttctg  5640
caacttctca aaaagaggcc catctcaatg ttcaacaaat cgttgatcga catactagag  5700
agctaaagac acaagttgaa gatttaaatg aaaatctttt aaaattgaaa gaagcactta  5760
```

```
aaacaagtaa aaacagagaa aactcactaa ctgataattt gaatgactta aataatgaac   5820
tgcaaaagaa acaaaaagcc tataataaaa tacttagaga gaaagaggaa attgatcaag   5880
agaatgatga actgaaaagg caaattaaaa gactaaccag tggattacag ggcaaacccc   5940
tgacagataa taaacaaagt ctaattgaag aactccaaag gaaagttaaa aaactagaga   6000
accaattaga gggaaaggtg gaggaagtag acctaaaacc tatgaaagaa aagaatgcta   6060
aagaagaatt aattaggtgg gaagaaggta aaaagtggca agccaaaata gaaggaattc   6120
gaaacaagtt aaaagagaaa gagggggaag tctttacttt aacaaagcag ttgaatactt   6180
tgaaggatct ttttgccaaa gccgataaag agaaacttac tttgcagagg aaactaaaaa   6240
caactggcat gactgttgat caggttttgg gaatacgagc tttggagtca gaaaaagaat   6300
tggaagaatt aaaaaagaga aatcttgact tagaaaatga tatattgtat atgagggccc   6360
accaagctct tcctcgagat tctgttgtag aagatttaca tttacaaaat agatacctcc   6420
aagaaaaact tcatgcttta gaaaaacagt tttcaaagga tacatattct aagccttcaa   6480
tttcaggaat agagtcagat gatcattgtc agagagaaca ggagcttcag aaggaaaact   6540
tgaagttgtc atctgaaaat attgaactga aatttcagct tgaacaagca aataaagatt   6600
tgccaagatt aaagaatcaa gtcagagatt tgaaggaaat gtgtgaattt cttaagaaag   6660
aaaaagcaga agttcagcgg aaacttggcc atgttagagg gtctggtaga agtgaaaga    6720
caatcccaga actggaaaaa accattggtt taatgaaaaa agtagttgaa aaagtccaga   6780
gagaaaatga acagttgaaa aaagcatcag gaatattgac tagtgaaaaa atggctaata   6840
ttgagcagga aaatgaaaaa ttgaaggctg aattagaaaa acttaaagct catcttgggc   6900
atcagttgag catgcactat gaatccaaga ccaaggcac agaaaaaatt attgctgaaa    6960
atgaaaggct tcgtaaagaa cttaaaaag aaactgatgc tgcagagaaa ttacggatag    7020
caaagaataa tttagagata ttaaatgaga agatgacagt tcaactagaa gagactggta   7080
agagattgca gtttgcagaa agcagaggtc cacagcttga aggtgctgac agtaagagct   7140
ggaaatccat tgtgttaca agaatgtatg aaaccaagtt aaaagaattg gaaactgata   7200
ttgccaaaaa aaatcaaagc attactgacc ttaaacagct tgtaaaagaa gcaacagaga   7260
gagaacaaaa agttaacaaa tacaatgaag accttgaaca acagattaag attcttaaac   7320
atgttcctga aggtgctgag acagagcaag gccttaaacg ggagcttcaa gttcttagat   7380
tagctaatca tcagctggat aaagagaaag cagaattaat ccatcagata gaagctaaca   7440
aggaccaaag tggagctgaa agcaccatac ctgatgctga tcaactaaag gaaaaaataa   7500
aagatctaga gacacagctc aaaatgtcag atctagaaaa gcagcatttg aaggaggaaa   7560
taaagaagct gaaaaaagaa ctggaaaatt ttgatccttc atttttgaa gaaattgaag    7620
atcttaagta taattacaag gaagaagtga agaagaatat tctcttagaa gagaaggtaa   7680
aaaaactttc agaacaattg ggagttgaat taactagccc tgttgctgct tctgaagagt   7740
ttgaagatga agaagaaagt cctgttaatt tccccattta ctaaaggtca cctataaact   7800
ttgtttcatt taactattta ttaactttat aagttaaata tacttggaaa taagcagttc   7860
tccgaactgt agtatttcct tctcactacc ttgtaccttt atacttagat tggaattctt   7920
aataaataaa attatatgaa attttcaact tattaaaaaa aaaaaaaaaa aa           7972

SEQ ID NO: 9            moltype = AA   length = 738
FEATURE                 Location/Qualifiers
source                  1..738
                        mol_type = protein
                        organism = synthetic construct
SEQUENCE: 9
MAADGYLPDW LEDNLSEGIR EWWALKPGAP KPKANQQKQD DGRGLVLPGY KYLGPFNGLD    60
KGEPVNAADA AALEHDKAYD QQLQAGDNPY LRYNHADAEF QERLQEDTSF GGNLGRAVFQ   120
AKKRVLEPLG LVEEGAKTAP GKKRPVEPSP QRSPDSSTGI GKKGQQPARK RLNFGQTGDS   180
ESVPDPQPLG EPPAAPSGVG PNTMAAGGGA PMADNNEGAD GVGSSSGNWH CDSTWLGDRV   240
ITTSTRTWAL PTYNNHLYKQ ISNGTSGGAT NDNTYFGYST PWGYFDFNRF HCHFSPRDWQ   300
RLINNNWGFR PKRLSFKLFN IQVKEVTQNE GTKTIANNLT STIQVFTDSE YQLPYVLGSA   360
HQGCLPPFPA DVFMIPQYGY LTLNNGSQAV GRSSFYCLEY FPSQMLRTGN NFQFTYTFED   420
VPFHSSYAHS QSLDRLMNPL IDQYLYYLSR TQTTGGTANT QTLGFSQGGP NTMANQAKNW   480
LPGPCYRQQR VSTTTGQNNN SNFAWTAGTK YHLNGRNSLA NPGIAMATHK DDEERFFPSN   540
GILIFGKQNA ARDNADYSDV MLTSEEEIKT TNPVATEEYG IVADNLQQQN TAPQIGTVNS   600
QGALPGMVWQ NRDVYLQGPI WAKIPHTDGN FHPSPLMGGF GLKHPPPQIL IKNTPVPADP   660
PTTFNQSKLN SFITQYSTGQ VSVEIEWELQ KENSKRWNPE IQYTSNYYKS TSVDFAVNTE   720
GVYSEPRPIG TRYLTRNL                                                738
```